United States Patent [19]

Flammer

[11] Patent Number: 5,130,987
[45] Date of Patent: Jul. 14, 1992

[54] METHOD FOR SYNCHRONIZING A WIDE AREA NETWORK WITHOUT GLOBAL SYNCHRONIZING

[75] Inventor: George H. Flammer, Cupertino, Calif.

[73] Assignee: Metricom, Inc., San Jose, Calif.

[21] Appl. No.: 758,193

[22] Filed: Sep. 11, 1991

Related U.S. Application Data

[63] Continuation of Ser. No. 485,976, Mar. 23, 1990, abandoned.

[51] Int. Cl.$^5$ .......................... H04J 3/06; H04K 1/04
[52] U.S. Cl. .................................. 370/103; 370/94.2; 375/1
[58] Field of Search ................. 370/103, 100.1, 94.1, 370/94.2, 11; 375/1, 107; 455/51, 71, 166, 179, 62, 63

[56] References Cited

U.S. PATENT DOCUMENTS

| | | | |
|---|---|---|---|
| 4,442,527 | 4/1984 | Munday | 375/1 |
| 4,479,226 | 10/1984 | Prabhu et al. | 455/63 |
| 4,554,668 | 11/1985 | Deman et al. | 375/1 |
| 4,558,453 | 12/1985 | Mimken | 375/1 |
| 4,601,043 | 7/1986 | Hardt et al. | 375/1 |
| 4,677,617 | 6/1987 | O'Connor et al. | 370/100 |
| 4,752,939 | 6/1988 | Amoroso et al. | 375/1 |
| 4,807,248 | 2/1989 | Pyatt et al. | 375/1 |
| 4,837,823 | 6/1989 | Ham et al. | 380/34 |
| 4,850,036 | 7/1989 | Smith | 455/179 |
| 4,872,205 | 10/1989 | Smith | 455/51 |

Primary Examiner—Benedict V. Safourek
Assistant Examiner—H. Kizou
Attorney, Agent, or Firm—Townsend and Townsend

[57] ABSTRACT

A frequency-hopping packet communication system without a master clock or master control unit is based on use of a receiver's frequency hopping timing and identification to control communication. A frequency-hopping band plan, involving the number of channels and the pseudo-random pattern of frequency change and nominal timing of changes, is universally known to each node in the network. A transmitter acquires synchronization with a target node by use of information previously received from or about a target indicating timing of present idle frequency hop of the target receiver. Each receiving node establishes in each station or node a table of receiver frequency hopping sequence offsets (hop timing offsets) of each other node within its communication range, and each node announces its presence on each frequency in a packet with a hop timing offset indicator. The hop timing offset indicator is a key used to read a table to allow nodes to set themselves in synchronization with one another. A location indicator built into the address of each packet is used to randomize an ordered frequency-hopping table at each node. Frequency-hopping is implemented by the division of communicaton slots and the accumulation of slots into epochs, wherein each epoch equals the total number of available slots (number of channels times the number of time frames per channel). The transmitting node tracks the pre-established frequency-hopping pattern for its target receiver based on previously-acquired information.

7 Claims, 4 Drawing Sheets

METHOD FOR SYNCHRONIZING A WIDE AREA NETWORK WITHOUT GLOBAL SYNCHRONIZING

This is a Continuation of application Ser. No. 07/485,926, filed Mar. 23, 1990, now abandoned.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

This invention relates generally to a method for transmitting data through a communication network at radio frequencies in the presence of interference, and more particularly to a method for synchronizing information in a packet communication format on a plurality of frequencies without use of a central timing source of synchronization.

Packet communications is a form of data communications whereby segments or packets of data are self contained as to target address, source address and information content. Conventionally, packets are routed with error checking and confirmation of receipt directly or relayed via relay stations, or intermediate nodes, between a source node or station and a destination node or station on a frequency which is known at all times to nodes within direct communication. Communication on certain frequencies may be restricted in duration in accordance with frequency allocation and bandwidth utilization rules and requirements. Such restrictions may be imposed by a licensing authority, such as the U.S. Federal Communications Commission (FCC). For example, in the 902-928 MHz frequency band, the FCC has proposed a rule that continuous transmission by a single transmitter of no more than 1 watt rf output power on any one channel be of no more than 400 ms duration each 30 seconds, and that at least some if not all other channels be selected prior to retransmission on the same frequency (FCC Rules, Part 15.247). Communication between any given pair of transceivers on a single frequency is thus restricted to packets of information which can be communicated in less than 400 ms, and means must be provided to accommodate communication on other frequencies.

In order to accommodate the transmission and reception of significant amounts of information in a reasonable period of time, frequency-agile transceivers have been proposed in which each transceiver changes frequency according to a pseudo-random pattern among a plurality of channels. Such systems are called frequency-hopping spread spectrum systems and are not to be confused with direct sequence spread spectrum systems wherein a pseudo-random code is used to modulate an information-bearing carrier over a broad band.

A packet-based frequency-agile system has special difficulty in synchronizing signals, as each transceiver typically would have no knowledge of the other transceivers within communication range. What is therefore needed is a technique for acquisition and maintenance of synchronization of information transmission and reception in a frequency-agile packet communication network.

The following patents were uncovered in a search of the records of the U.S. Patent and Trademark Records:

Smith, U.S. Pat. No. 4,850,036, issued Jul. 18, 1989, for RADIO COMMUNICATION SYSTEM USING SYNCHRONOUS FREQUENCY HOPPING discloses a frequency-hopping radio system in which a master station or control unit transmits a startup message to a plurality of slave stations on a preselected frequency. The startup message indicates to each slave station a frequency-hopping sequence. Therein, all transmissions must be synchronized to the control unit at all times to preclude interference among slaves. Such a system is impractical in a peer to peer network where there is no global master station or global timing.

Ham et al., U.S. Pat. No. 4,837,823, issued Jun. 6, 1989, for COMMUNICATION SYSTEM describes a frequency-hopping communication system wherein synchronization information is transmitted over a spread of frequencies of a type which differs from the type used for data communication, and a counter at each receiver is used to keep track of sequence and synchronization. Such a scheme as therein described requires substantial acquisition time and overhead.

Pyatt et al., U.S. Pat. No. 4,807,248, issued Feb. 21, 1989, for AUTOMATIC RESYNCHRONIZATION TECHNIQUE describes a method for resynchronizing frequency hopping communication systems. Resynchronization frames are transmitted interspersed with data frames following initial synchronization. This technique, which can be adapted to packet communication between two stations, requires additional signals to be sent as well as a master-slave relationship between stations.

O'Connor et al., U.S. Pat. No. 4,677,617, issued Jun. 30, 1987, for RAPID FREQUENCY-HOPPING TIME SYNCHRONIZATION describes a frequency-hopping radio system in which a master station or control unit transmits a unique synchronization code for each time interval relative to a reference startup time. This system also proposes a master-slave relationship among stations.

Hardt et al., U.S. Pat. No. 4,601,043, issued Jul. 15, 1986, for DIGITAL COMMUNICATIONS SOFTWARE CONTROL SYSTEM describes a frequency hopping system with a USART and a bit/sync tracking circuit.

Mimken, U.S. Pat. No. 4,558,453, issued Dec. 10, 1985, for SYNCHRONIZATION METHOD AND FREQUENCY HOPPING SYSTEM describes a frequency hopping system in which keying of a transmitter automatically initiates a multiple cycle sync acquisition signal and wherein a sync maintenance signal is periodically transmitted.

Other commercial or proposed commercial systems which have come to the attention of the applicant as a result of FCC consideration are as follows:

O'Neill Communications "LAWN" system operates a packet communication system based on AX.25 link layer protocols. The system uses four channels at a data rate of 38.4 kbs in the 900 MHz band in a multipoint to multipoint scheme.

LifePoint System operates a multipoint to point event reporting system using unacknowledged packets. The system occupies 800 kHz centered at 908 MHz. The system is used for alarm systems.

Telesytems RadioNet SST is a system which operates at a frequency of 915 MHz at a variety of transmission rates and power levels. The system operates without a link layer protocol.

SUMMARY OF THE INVENTION

In accordance with the invention, a frequency-hopping packet communication system without a master clock or master control unit is based on use of a receiver's frequency hopping timing and identification to control communication. A transmitter acquires synchronization with a target node by use of information previously received from or about a target indicating timing of present idle frequency hop of the target receiver. Each receiving node establishes in each station or node a table of, receiver frequency hopping sequence offsets (hop timing offsets) of each other node within its communication range, and each node announces by transmission of a packet its presence on each frequency in a packet which includes a hop timing offset indicator The hop timing offset indicator is a key used to read a frequency-hopping table to allow nodes to set themselves in synchronization with one another. A location indicator built into the address of each packet is used to randomize an ordered frequency-hopping table at each node. As a consequence, synchronized frequency hopping of two nodes is controlled by information content of the packet. A local clock at each node is maintained to high accuracy by a temperature compensated oscillator. A frequency-hopping band plan is implemented by the division of communication slots, corresponding to a fixed (or controllably variable) duration of time on one of n random frequencies, into partial slots, herein called ticks, and the accumulation of slots into epochs, wherein each epoch equals the total number of available slots (number of channels times the number of time frames per channel). Each pair of nodes can maintain between themselves a different frequency-hopping table based on information exchanged or heard at any time by a node receiver. It is the responsibility of the transmitting node to follow the pre-established frequency-hopping pattern for an immediate target receiver based on information the node has previously acquired. The frequency-hopping band plan, involving the number of channels and the pseudo-random pattern of frequency change and nominal timing of changes, is universally known to each node in the network. The details and operation of the invention will be better understood by reference to the following description of specific embodiments in connection with the accompanying drawings.

DESCRIPTION OF SPECIFIC EMBODIMENTS

Figure 1:
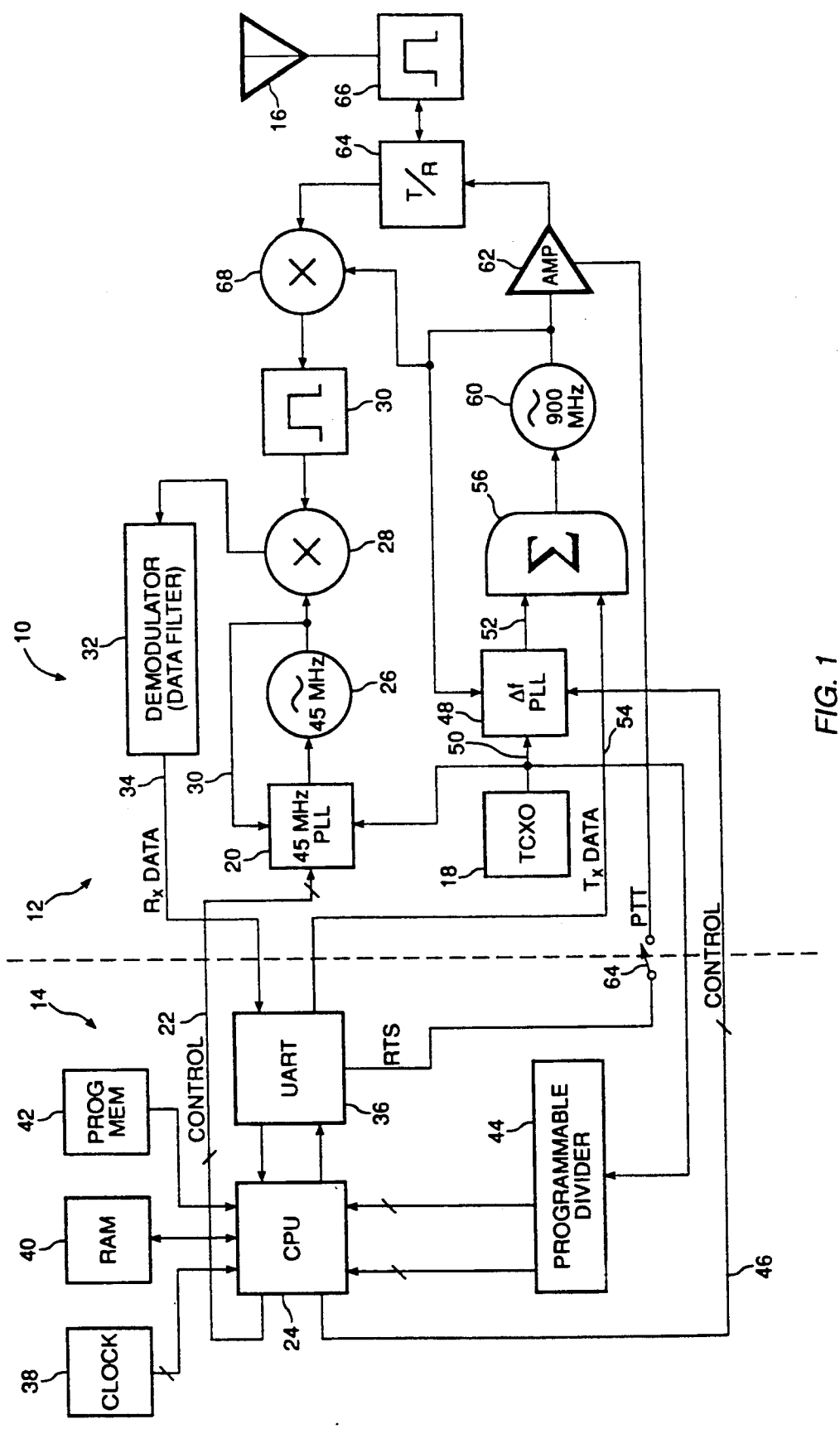
FIG. 1 is a block diagram of a transceiver in accordance with the invention.

FIG. 1 illustrates a packet node 10 in accordance with the invention. A large number of identical nodes having overlapping communications ranges and differing only by location and stored information comprise a communications system or network in accordance with the invention. Each node 10 includes a transceiver 12 and a terminal node controller (TNC) 14. The transceiver 12 has an antenna system 16 and means for changing frequency for receiving and transmitting as hereinafter explained.

The TNC 14 includes packet content and frequency control functions, including means for storing information received and means for analyzing information received through the transceiver 12. The TNC 14 operates in accordance with at least some portions of the multiple-layer protocols established for packet communications, such as X.25 adapted for radio communications (AX.25).

The transceiver 12 comprises a high stability local frequency reference such as a temperature controlled stable oscillator (TCXO) 18 coupled to a first, herein fixed frequency, phase locked loop (PLL) 20 under control of the TNC 14 (via control lines 22 from a CPU 24). The PLL 20 steers a first voltage controlled oscillator 26, which in turn provides a local reference to a mixer 28 and frequency feedback for error correction via line 30 to the first PLL 20. (Alternatively, a highly-stable crystal oscillator may be employed to provide a stable reference signal to the mixer 28.)

The mixer 28 also receives an IF signal from an IF filter 30 producing an output signal containing received data to a demodulator 32. The demodulator 32 acts as a data filter to extract the received data, which in turn is supplied on an Rx DATA line 34 to a conventional Universal Asynchronous Receiver Transmitter (UART) 36 of the TNC 14. The UART 36 supplies the received data in a form suited to the requirements of the CPU 24 for processing.

The CPU 24 of the TNC 14 has coupled to it local clocks 38 for local control, read/write memory (RAM) 40 for storing volatile information, nonvolatile program memory (ROM) 42 for storing the characteristics of the TNC 14 which control operation according to the invention, and a programmable divider means 44, which serves as the source of timing used for synchronization of operation within the communication network. In particular, the programmable divider means 44 provides control interrupts and the like for timing epochs and ticks as hereinafter explained.

The CPU 24 provides a control or steering signal via control lines 46 to a second, frequency-agile, phase-locked loop, and the TCXO 18 provides a timing signal via timing line 50. The control signal specifies the frequency of operation, the pattern of frequencies of operation and the duration of operation at each frequency of operation of the transmitted and of the received signals, or "slots" as hereinafter explained.

The output 52 of the frequency-agile PLL 48 is summed with the transmitted data signal on Tx DATA line 54 from the UART 36 at a summer 56. The summer 56 is the modulator which drives a 900 MHz range voltage controlled oscillator (VCO) 60. In the transmit mode of the UART 36, modulated, frequency-agile data signals are supplied to a radio frequency (rf) amplifier 62, which is enabled by a push-to-talk (PTT) control switch in response to a request to send (RTS) signal from the UART 36. The output of the amplifier 62 is supplied through to a transmit/receive (T/R) switch 64 which feeds the antenna 16 through an rf filter network 66.

In the absence of transmit data signals, the amplifier 62 is disabled and the 900 MHz VCO 60 provides an unmodulated signal to a second intermediate frequency (if) mixer 68 in the receive signal path. The receive-data if signal at the output of the mixer 68 is supplied to the bandpass filter 30 for filtering before subsequent demodulation of the data as explained hereinabove. Since the receiver section and the transmitter section share the same tuning circuitry, synchronization of the transmitted frequency and the received frequency is assured.

Figure 2:
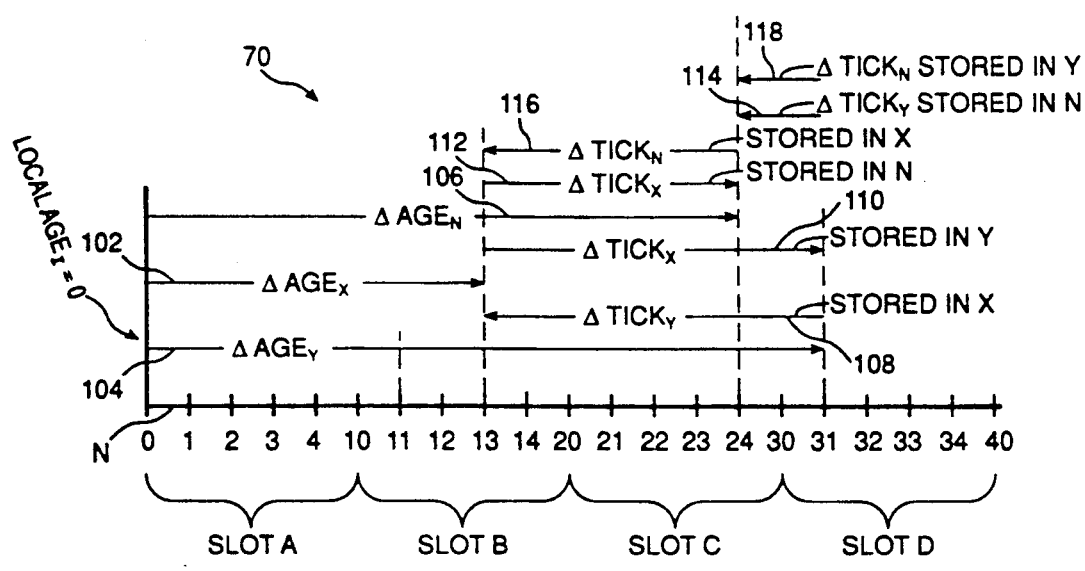
FIG. 2 is a timing diagram of a portion of an epoch according to the invention.
Figure 3:
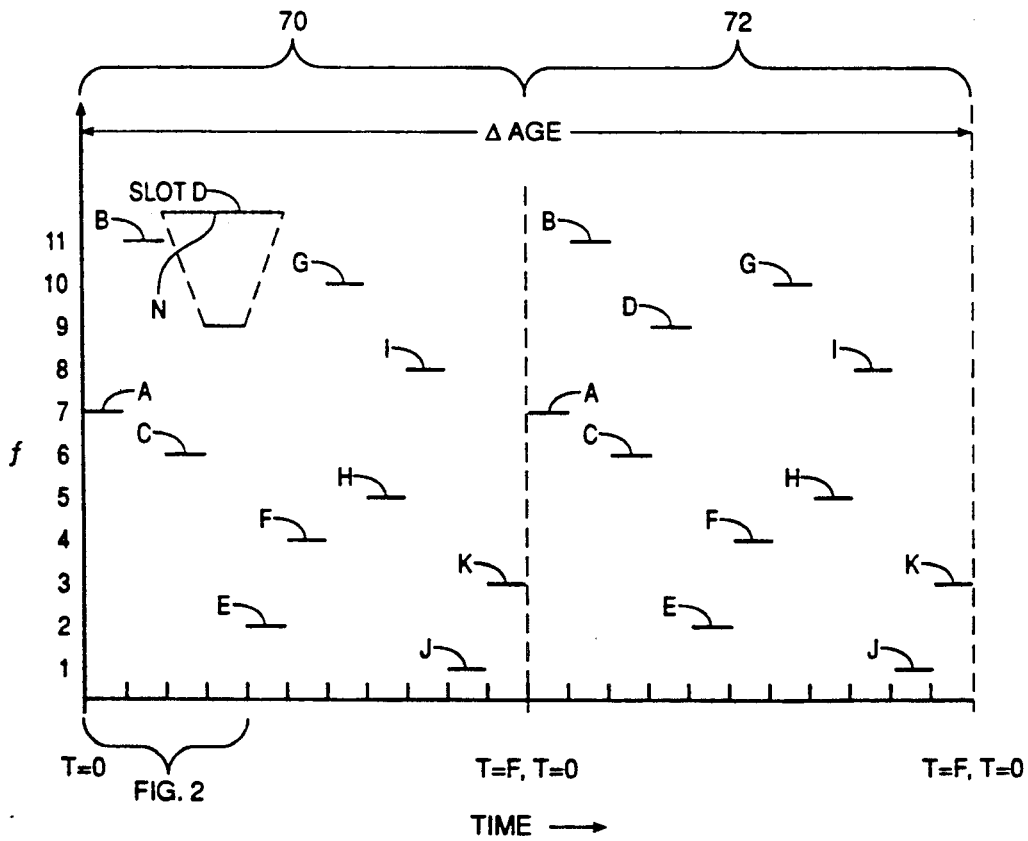
FIG. 3 is a representative frequency versus time graph of a frequency hopping pattern employed by all transceivers in a network according to the invention over a plurality of epochs.

Referring to FIG. 2 and FIG. 3, there is shown a timing diagram of a portion of an "epoch" 70 in accordance with the invention, and a frequency hopping pattern for a plurality of epochs 70, 72. First, however, in order to better understand the invention, it is helpful to understand certain terminology.

A network is a group of nodes capable of communication with one another on selected frequencies at selected times. A complete network is not illustrated. However, FIG. 1 is representative of one of an arbitrary number of nodes in a network. A node 10 is a transceiving station 12 and its associated controlling means 14 within a network. Channels (numbered frequencies 1-11 in FIG. 3) refer to specific frequencies of operation. A channel has an adequate passband for the information rate of interest, and guard bands typically separate channels to minimize interchannel interference. Slots (A-K, FIG. 3) as herein used refer to the momentary frequencies of operation in terms of specific frequencies at specific times for specific durations. A slot (A-K) is allocated to each available channel (1-11) in a network. Ticks N (FIG. 2) are markers or subdivisions of time within slots (A-K). A frequency hopping pattern (Frequency sequence 7,11,6,9,2,4,10,5,8,1,3 of FIG. 3) is a known pseudo-random sequence of slots (A-K). An epoch 70 or 72 is one complete cycle of all slots A-K) in a frequency-hopping pattern. FIG. 3 illustrates eleven slots of eleven channels for eleven frequencies over two epochs in which time is counted in ticks from T=0 to T=F. FIG. 2 illustrates four slots A,B,C,D of an epoch 70 without showing channel allocation, each slot A-D being five ticks N in duration. The significance of age of a node in terms of ticks will be apparent hereinafter.

Figure 4:
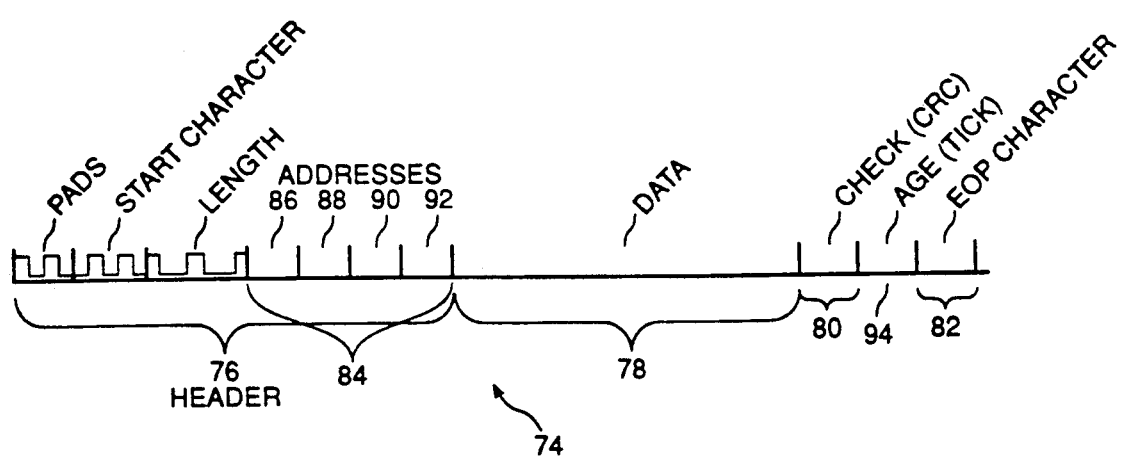
FIG. 4 is a diagram of a standard data packet for use in accordance with the invention.
Figure 5:
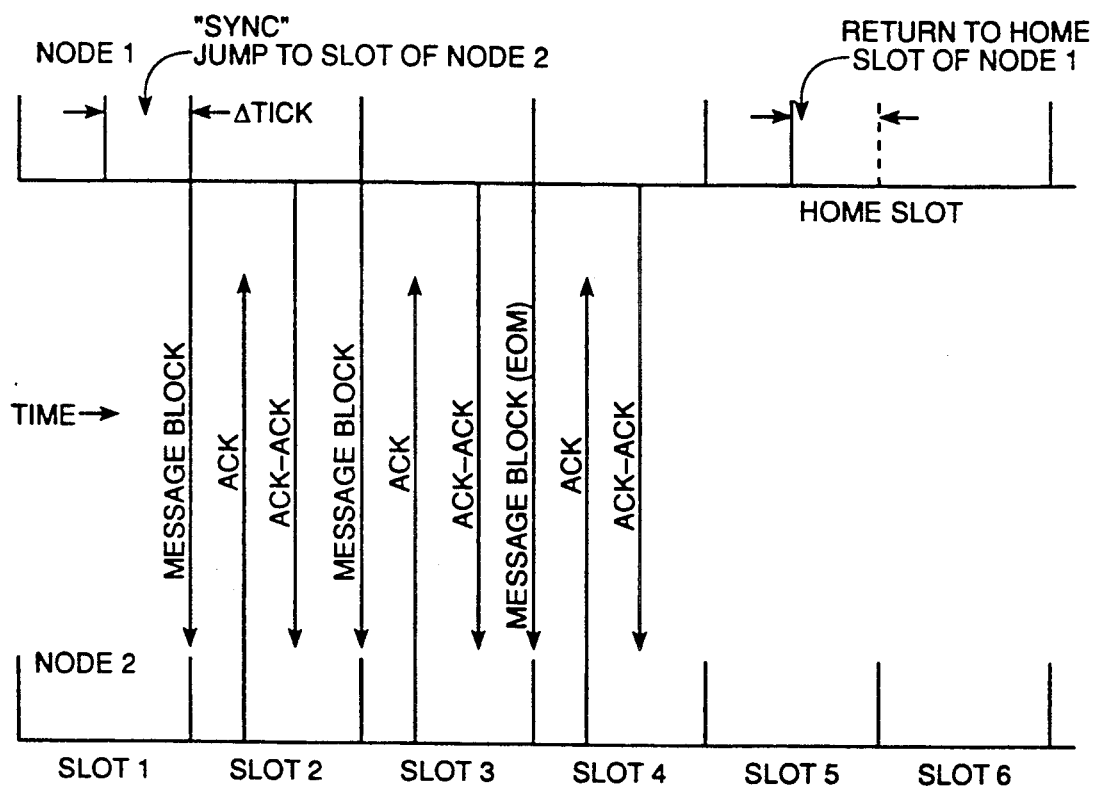
FIG. 5 is a timing diagram of a typical exchange between two nodes in a network according to the invention.

Referring to FIG. 4, a packet 74 is a self-contained addressed burst of relatively short, verifiably correct data. It is typically serial binary data modulated and encoded in digital code, such as gray code according to the USASCII character set. It contains a header portion 76 with address and certain control information, a data 78 portion and typically also a data check portion 80. As needed, it has an end of packet character (EOP) 82. The header 76 may also or alternatively contain a length designator. An address portion 84 includes information in definable portions about the originating station 86, the final destination station 88, the sending station 90 and the target station 92. The originating station information 86 and the target station information 88 remain unchanged for the life of the packet. The sending station information 90 and the receiving station information 92 are changed with each relay of a packet 74.

The data check portion 80 is a calculated value, such as a Cyclic Redundancy Check (CRC) number, for each packet. It is calculated at the sending station and appended to the packet before transmission. The receiving station compares the transmitted data check portion 80 with a value calculated at the receiving station from the received data. Identity of the transmitted value and the calculated value indicates that the packet 74 has been correctly received. Error correction can be effected if the errors fall within defined parameters allowing correction by use of the check value.

In accordance with the invention, each packet 74 has associated with it and embedded in it an age value 94, which is a tick count beginning with the anniversary of the last epoch of the sending station, as hereinafter explained. The age value 94 is used to interpret and propagate timing information, independent of any global clock. The age value is produced from a local recirculating counter embedded in the function of each TNC 14 (FIG. 1) of each node 10 and driven by a stable oscillator 18. Each of the oscillators 18 of each node 10 operates at nominally exactly the same frequency. The differences in age values between the received tick and the tick at the receiving station allow the receiving station to resynchronize to the sending station with every tick. Note that the sending station and the receiving station switch with every exchange of packets, including any of the various types of packets employed in the system. The present invention employs a polling (SYNC) packet, an acknowledgement (ACK) packet, an ACK_acknowledgement (ACK_ACK) packet and an information (DATA) packet, and it may include specialized types of information packets.

The packet information is typically sent in the form of characters or bytes of 10 bits each. The packet sizes in a specific embodiment are as follows:

DATA packet—variable up to 256 bytes maximum
SYNC packet—21 bytes
ACK packet—21 bytes
ACK_ACK packet—21 bytes.

The header of a DATA packet may require 53 bytes, whereas the header of the ACK and ACK_ACK packets may require only 20 bytes. This is because the DATA packet must carry original source and ultimate destination information, in addition to personality information.

Routing within a packet network is the process of using packet address information to select a path throughout the network. Addressing a packet is the placement of the header information in the packet to enable proper delivery and error recovery through the network. It is the purpose of this network to facilitate the transmission of data over a multiple-channel network in such a manner that use of any one channel of the network is limited to a duration of less than 1 second and wherein all channels are considered for utilization by a single transmitter before repeat use of a channel by the transmitter. The intended use is short distance point-to-point addressed transmissions or short distance point-to-multipoint addressed transmissions.

A key feature of the invention is that each packet contains information on the slot timing relative to the immediate originator of the packet (whether a SYNC packet, an ACK packet or a DATA packet) to allow the local receiver to transmit a next packet at the proper synchronization in reference to slot and ticks relative to the age of the originator. It is thus the role of the node attempting to transmit a data packet to track the frequency hopping pattern and internal synchronization of the node targeted to receive the data packet.

A specific example follows to explain the operation of the invention. Consider a network of nodes configured to use 205 channels of 25 kHz width spaced at 100 kHz within the 902-928 MHz frequency spectrum. Each slot is allocated 1 second, and there may be 100 ticks per slot. Thus, each tick is a timing mark of 10 ms such that an epoch has a duration of 20,500 ticks, 205,000 ms or 205 seconds. During any communication, there is the transmission of a DATA packet by a data originating station, an ACK packet by a data receiving station, and an ACK_ACK packet by the originating station. As the maximum duration of a DATA packet is 256 ms, an ACK packet is 22 ms and an ACK_ACK packet is 22 ms, the maximum total occupancy time of a slot for one exchange is no more than 300 ms or about 30 percent occupancy per slot for each data packet. There is adequate time for one, two or three exchanges of long packets during the same slot, as well as a greater number of shorter packets.

At power-up of any node in a network, a "home" slot is established. The home slot is the slot selected by a random offset from the first slot in terms of age of the current node (in ticks). The random offset "seed" may be a value derived from the node address. Any other random value can be chosen. The offset thus establishes a tick offset in terms of age. Age of each node is stored at the node as a modulo of the epoch length. Age is advanced by the local stable oscillator such that over the course of many epochs, the rate of change of age does not drift significantly as between nodes. (It should be understood that the use of a stable oscillator is merely convenient in order to minimize overly-frequent synchronization updating).

After startup, each node broadcasts an announcement of its presence in the network by sending a sync packet during each slot of the network, beginning with its home slot. The sync packet contains its age for reception by each other node in the network. Whenever a node hears another packet from another node in the network, it notes the source and the age in its storage means for future reference. In accordance with the invention the age of the heard node is stored as an age differential relative to the receiving node. Similarly, each other node, hearing the sync packet of the startup node notes its source and age and stores that age as an age differential. Moreover, each time any packet is heard, the age is examined and stored as needed so that, when the receiving station subsequently becomes a sending station, it can use the age differential to identify the slot in which it should next transmit to that other node. Thus, it is the responsibility of the ORIGINATING station to synchronize to the receiving station.

An example will illustrate. Referring to FIG. 2, there is shown ages of three nodes normalized to the age of the node as it measures itself. Thus, all nodes have an age beginning at the origin. Consider a node x having a first age from its startup of 13 ticks ($\Delta AGE_x$) time 102, as measured by the local clock at that node (Node X). Next, consider a node y having a second age from its startup of 31 ticks ($\Delta AGE_y$) time 104, as measured by the local clock at that node. Those two ages 102 and 104 are respectively loaded in the next packet transmitted by the two respective nodes as an age identifier of the transmitting node. The age of the packet received at the targeted receiving node is thus made known to the receiving node. Similarly, a node N is characterized by an age from startup as ($\Delta AGE_N$) 106. The age differential between a transmitting node and a receiving node is calculated at the receiving node and stored locally in a local node table (Table I) as a DELTA tick value relative to the other node. There will be a DELTA tick value for each other node heard from by a local node. The value $\Delta TICK_y$ 108 is stored in the node table of node x, and the value $\Delta TICK_x$ 110 is stored in the node table of node y. There is also a $\Delta TICK_x$ 112 stored in the node table of node N and a $\Delta TICK_y$ 114 stored in the node table of node N. Similarly, there is also a $\Delta TICK_N$ 116 stored in the node table of node x and a $\Delta TICK_N$ 118 stored in the node table of node y.

In each transmitting node, the last stored $\Delta TICK$ value for the addressed node is used by the transmitting node to determine the exact slot and tick within the slot for the current packet transmission. The transmitting node, which in conventional transmission is the node attempting to pass on a data packet, follows the receiving node as it hops through the spectrum of the network. Each receipt of a packet containing a $\Delta AGE$ value is used to update the $\Delta TICK$ value for the addressed node.

The $\Delta TICK$ values are absolute, signed values. Therefore, it is possible for one node to report the age of another node to a third node, thereby furnishing synchronization information indirectly and minimizing the need for each node to communicate frequently with all other nodes in its broadcast range.

Time bases, as established by local clocks can be expected to vary over time and thus the $\Delta TICK$ values between two nodes will tend to change over time. Since the rate and direction of change is substantially constant, it is also possible to predict timing misalignment. This further minimizes the requirement of frequent direct resynchronization. A requirement of frequent direct synchronization may also be used as a diagnostic index. An indication that a node requires frequent direct synchronization due to loss of synchronization indicates that the node is drifting in frequency and in need of maintenance.

During any interchange between two node, the node which is currently transmitting data synchronizes first to the receiving station. Since both stations follow the same slot/frequency hopping pattern, they remain in sync until the interchange is completed. Thereupon both stations become idle return to their "home" slot in an idle pattern. Any other node within its range knows which slot to use to reach a particular slot.

Each node collects information about all other nodes within its range in order to facilitate communication and make a local decision about which way to direct a packet being relayed through the network. Table I illustrates the contents of a typical node table.

TABLE I

| NODE NAME | Must be unique in a network |
|---|---|
| $\Delta TICK$ | (Hop Timing offset in ticks) Calculated each time a packet is received |
| LRA | ("Last Reported Age" in slots) Optional: Used to determine whether update information is needed |
| CUMULATIVE VALUES: | |
| TX# | Transmitted Number of Packets |
| RX# | Received Number of Packets |
| RETRY | Retries required Values used to determine level of activity between nodes and quality of the link |
| RSS | Received Signal Strength Signal Strength of received signal |

TABLE I-continued

| | |
|---|---|
| RSD | Received Signal Discriminator<br>(+ 0 −)<br>Checks whether propagation is improving or degrading |
| RPSS | Reported Signal Strength as reported back by the receiving station |

Key software modules employed by the TNC 14 perform the acquisition, synchronization and analysis functions of the node.

Attached hereto as Appendixes A, B, C, D, E and F are detailed technical descriptions of aspects of the invention. Specifically there are source code listings of several software modules which are employed to configure and operate each TNC and a description of a database employed in connection with the invention. Appendix A discloses one embodiment of a node definition NODE.H, a database kept by each node. Appendix B is a source code listing describing one embodiment of the "heartbeat" tracking feature TICKER.C employed to keep track of the home slot ("home.slot") and the home tick ("home.tick"). The age of any node is reported by this module as:

$$age = (slot\ value) \times 100 + (tick).$$

Appendix C is a source code list describing software routines for generating and processing various types of maintenance packets, such as the synchronization packets, called synch frames. The module is designated L2MAINT.C, for level 2 maintenance processing.

Appendix D is a source code listing describing the processing employed to calculate the $\Delta TICK$ value at each node. It is designated L2NODE.C for level 2 node processing. It generates the value $\Delta TICK$ which is used by TICKER.C above.

Appendix E is a source code listing of a module designated L2SCAN.C used to target a next node in a message relay process in order to select the best node through which to relay a packet. It incorporates a tickle routine which performs a frequency change to a target receiver frequency, waits for the targeted receiver to come onto the frequency and then reports that the receiver is on frequency.

Appendix F is a source code listing of a module designated L2WAN.C. This module is used indirectly to call the tickle procedure by invoking a scan for a node. It then picks the highest priority node to which the packets are to be sent. It then facilitates transmission of a string of packets to the selected receiver.

The invention has now been explained with reference to specific embodiments. Other embodiments will be apparent to those of ordinary skill in the art. It is therefore not intended that the invention be limited except as indicated by the appended claims.

Appendix A
Listing NODE H

*Copyright (unpublished work) Metricom, Inc.
All rights reserved.

```
/* N O D E   D E F I N I T I O N  ************************************ */

NODE
(
    QUE         head ;

/* LAN or WAN address */
    LINK_ADDR   address ;

#define     NodeLinkAddressPtr(np)              (&((np)->address))

/* Timer value set when the link was Init'ed;
       used by RecvSync/RecvInfo to determine if this is a 'new' link */
    MCLOCK_TIMER    delta_age ;

#define     SECONDS_REQUIRED_TO_REBOOT          (20)
#define     NodeDeltaAge(np)                    ((np)->delta_age)
#define     NodeDeltaAgePtr(np)                 (&((np)->delta_age))
#define     SetNodeDeltaAge(np,val)             ((np)->delta_age = (val))

/* distance, bearing, and octant */
    DISTANCE    distance ;
    ANGLE       bearing ;

#define     NodeDistance(np)                    ((np)->distance)
#define     NodeDistancePtr(np)                 (&((np)->distance))

#define     NodeBearing(np)                     ((np)->bearing)
#define     NodeBearingPtr(np)                  (&((np)->bearing))
#define     NodeOctant(np)                      ((OCTANT)(((np)->bearing) >> (ANGLE_BIT
- OCTANT_BIT)))
```

```c
/* signal strength issues */
    BYTES       rssi_smoothed, rssi_max, rssi_min, rssi_last, discriminator ;
    UTINY       tx_power ;
    BYTES       last_reported_rssi, max_reported_rssi, min_reported_rssi,
smoothed_reported_rssi ;

#define     NodeRssiSmoothed_M(np)              ((np)->rssi_smoothed)
#define     SetNodeRssiSmoothed_M(np,val)       ((np)->rssi_smoothed = (val))
#define     NodeRssiMax_M(np)                   ((np)->rssi_max)
#define     SetNodeRssiMax_M(np,val)            ((np)->rssi_max = (val))
#define     NodeRssiMin_M(np)                   ((np)->rssi_min)
#define     SetNodeRssiMin_M(np,val)            ((np)->rssi_min = (val))
#define     NodeRssiLast_M(np)                  ((np)->rssi_last)
#define     SetNodeRssiLast_M(np,val)           ((np)->rssi_last = (val))
#define     NodeDiscriminator_M(np)             ((np)->discriminator)
#define     SetNodeDiscriminator_M(np,val)      ((np)->discriminator = (val))

#define     NodeTxPower_M(np)                   ((np)->tx_power)
#define     SetNodeTxPower_M(np,val)            ((np)->tx_power = (val))

#define     NodeLastReportedRssi_M(np)                  (NodeLastReportedRssi_M(np)
>last_reported_rssi)
#define     SetNodeLastReportedRssi_M(np,val)   ((np)->max_reported_rssi =
(val))
#define     NodeMaxReportedRssi_M(np)                   (NodeMaxReportedRssi_M(np) =
#define     SetNodeMaxReportedRssi_M(np,val)    ((np)->min_reported_rssi =
(val))
#define     NodeMinReportedRssi_M(np)                   (NodeMinReportedRssi_M(np) =
#define     SetNodeMinReportedRssi_M(np,val)    ((np)-
(val))
#define     NodeSmoothedReportedRssi_M(np)              (NodeSmoothedReportedRssi_M(np
>smoothed_reported_rssi)
#define     SetNodeSmoothedReportedRssi_M(np,val)       ) = (val))
```

```
#define     L2_FID        fid ;
#define     NodeFid(np)                ((np)->fid)

union
{
    struct
    {
        /* Node status Bit Field(s) */
        unsigned    status          : 3 ;
        unsigned    ack_state       : 1 ;
        unsigned    to_state        : 1 ;
        unsigned        net         : 1 ;
        unsigned    last_data_good  : 1 ;
        unsigned    last_ack_good   : 1 ;
        unsigned    last_tickle_good : 1 ;

unsigned    dummy1          : 7 ;

} bf1 ;
    BYTES status_bytes ;

} status_union ;

#define NodeDoomed(np)               ((np)->status_union.bf1.status == DOOMED)
#define SetNodeDoomed(np)            ((np)->status_union.bf1.status = DOOMED)

#define NodeTwoWay(np)               ((np)->status_union.bf1.status == ACTIVE)
#define SetNodeTwoWay(np)            ((np)->status_union.bf1.status = ACTIVE)
#define ResetNodeTwoWay(np)          ((np)->status_union.bf1.status = NO_WAY)

#define NodeLastDataGood_M(np)       ((np)->status_union.bf1.last_data_good)
#define SetNodeLastDataGood_M(np,val) ((np)->status_union.bf1.last_data_good = (val))
#define NodeLastAckGood_M(np)        ((np)->status_union.bf1.last_ack_good)
```

```
#define  SetNodeLastAckGood_M(np,val)    ((np)->status_union.bf1.last_ack_good = (val))

#define  NodeLastTickleGood_M(np)        ((np)->status_union.bf1.last_tickle_good)
#define  SetNodeLastTickleGood_M(np,val) ((np)->status_union.bf1.last_tickle_good = (val))

#define  WaitingForAckAck(np)            ((np)->status_union.bf1.ack_state)
#define  StopWaitingForAckAck(np)        ((np)->status_union.bf1.ack_state = FALSE)
#define  WaitForAckAck(np)               ((np)->status_union.bf1.ack_state = TRUE)
#define  WaitingForAck(np)               ((np)->status_union.bf1.to_state)
#define  StopWaitingForAck(np)           ((np)->status_union.bf1.to_state = FALSE)
#define  WaitForAck(np)                  ((np)->status_union.bf1.to_state = TRUE)

#define  EMPTY      0
#define  NAPPING    1
#define  NO_WAY     2
#define  ACTIVE     3
#define  DOOMED     4
#define  NodeStatus(np)             ((np)->status_union.bf1.status)
#define  SetNodeStatus(np, val)     ((np)->status_union.bf1.status = val)
#define  NodeNet(np)                ((np)->status_union.bf1.net)      /* redundant #definition */
#define  SetNodeNet(np, val)        ((np)->status_union.bf1.net = val)

#define  NodeStatusBytes_M(np)      ((np)->status_union.status_bytes)

PLATFORM  *rx_dp ;

#define  NodeRcvdPacket(np)             ((np)->rx_dp)
#define  SetNodeRcvdPacket(np,pp)       ((np)->rx_dp = pp)
```

```
        UTINY         ack_tries ;

#define   NodeAckTries(np)                  ((np)->ack_tries)
#define   IncrementNodeAckTries(np)         ((np)->ack_tries++)
#define   ClearNodeAckTries(np)             ((np)->ack_tries = 0)

MCLOCK_TIMER  ack_timer ;     /* when to retry ACK */ define   NodeAckTimer_M(np)                ((np)->ack_timer)
define   NodeAckTimerPtr(np)               (&((np)->ack_timer))

PLATFORM      *to_dp ;

#define   NodeTxPacket(np)                  ((np)->to_dp)
#define   SetNodeTxPacket(np,pp)            ((np)->to_dp = pp)

UTINY         to_tries ;

#define   NodeToTries(np)                   ((np)->to_tries)
#define   IncrementNodeToTries(np)          ((np)->to_tries++)
#define   SetNodeToTries(np,val)            ((np)->to_tries = (val))
#define   ClearNodeToTries(np)              ((np)->to_tries = 0)

MCLOCK_TIMER  retry_timer ;   /* when to retry DATA */ define   NodeDataRetryTimer_M(np)          ((np)->retry_timer)
define   NodeDataRetryTimerPtr(np)         (&((np)->retry_timer))

/* the 'sequence num' sent */
        UCOUNT        sent_seq_num ;

#define   NodeSeqNum_M(np)                  ((np)->sent_seq_num)
#define   SetNodeSeqNum_M(np,val)           ((np)->sent_seq_num = (val))

/* Tickers delta */
        ARG           delta_tick ;    /* the major number for synchronization */ define   NodeDeltaTick_M(np)               ((np)->delta_tick)
define   SetNodeDeltaTick_M(np,val)        ((np)->delta_tick = (val))
```

```c
/* this is the scanner alarm to signal the 'rotating' of the
   'current_data_[re]tries' into 'last_data_[re]tries' bins */
        MCLOCK_TIMER    scanner_alarm ;
#define     NodeScannerAlarm_M(np)              ((np)->scanner_alarm)
#define     NodeScannerAlarmPtr_M(np)           (&(np)->scanner_alarm)

/* we keep two buckets... 'last' and 'current'. These are separated by
"RamScannerInterval_M". Total == 'last' + 'current'. */
        ULONG           last_data_sent, current_data_sent ;

#define     NodeLastDataSent_M(np)              ((np)->last_data_sent)
#define     NodeCurrentDataSent_M(np)           ((np)->current_data_sent)
#define     ResetNodeCurrentDataSent_M(np)      ((np)->current_data_sent = 0)
#define     SetNodeLastDataSent_M(np,val)       ((np)->last_data_sent = (val))
#define     NodeTotalDataSent(np)               ((np)->last_data_sent + (np)->current_data_sent)
#define     IncrementTotalDataSent(np)          ((np)->current_data_sent++)

/* we keep two buckets... 'last' and 'current'. Total == 'last' + 'current'. These are separated by
"RamScannerInterval_M". */
        ULONG           last_data_retries, current_data_retries ;

#define     NodeLastDataRetries_M(np)           ((np)->last_data_retries)
#define     NodeCurrentDataRetries_M(np)        ((np)->current_data_retries)
#define     ResetNodeCurrentDataRetries_M(np)   ((np)->current_data_retries = 0)
#define     SetNodeLastDataRetries_M(np,val)    ((np)->last_data_retries = (val))
#define     NodeTotalRetries(np)                ((np)->last_data_retries + (np)->current_data_retries)
#define     IncrementTotalRetries(np)           ((np)->current_data_retries++)

ULONG           data_rcvd ;     /* DATA packets received */ define     NodeTotalDataRcvd(np)               ((np)->data_rcvd)
define     IncrementTotalDataRcvd(np)          ((np)->data_rcvd++)
#define     SetNodeTotalDataRcvd(np,val)        ((np)->data_rcvd = (val))

#define     TEN_MINUTES                 (600)
#define     ONE_HOUR                    (3600)
#define     MIN_INTERVAL                ONE_HOUR
#define     MAX_INTEREXCHANGE_INTERVAL  (UINT_MAX)
```

```
#define  NODE_MAINT_INTERVAL_FUZZ  (15)
#define  MaintPeriodFuzz(x)             (rand() & NODE_MAINT_INTERVAL_FUZZ)
#define  ContactPeriodFuzz(x)           (rand() & NODE_MAINT_INTERVAL_FUZZ)

#define  WAIT_BEFORE_LINKING   (10)
         /* for timestamps and linkinfo packets */
    MCLOCK_TIMER  maint_alarm ;     /* reminder for LinkInfo */
    MCLOCK_TIMER  last_exchange ;   /* last time ACK for us from NODE */
    MCLOCK_TIMER  last_contact ;    /* last time we heard them - alarm */
    MCLOCK_TIMER  last_heard ;      /* last time we heard them - time */ define  NodeMaintAlarm(np)              ((np)->maint_alarm)
define  NodeMaintAlarmPtr(np)           (&(NodeMaintAlarm(np)))
#define  NodeLastExchange(np)            ((np)->last_exchange)
#define  NodeLastExchangeTimerPtr(np)    (&((np)->last_exchange))
#define  NodeContactAlarm(np)            ((np)->last_contact)
#define  NodeContactAlarmPtr(np)         (&((np)->last_contact))
#define  NodeLastHeardTimer_M(np)        ((np)->last_heard)
#define  NodeLastHeardTimerPtr_M(np)     (&((np)->last_heard))

#define  NODE_MAINT_STATUS_INIT       (0)  /* try link_info first */
#define  NODE_MAINT_STATUS_TIMESTAMP  (1)  /* then try timestamp */
define  NODE_MAINT_STATUS_LINK_INFO  (2)  /* until link_info rcvd */ union
{
    struct
    {
        /* link maintenance status of node (one of MAINT_STATUS) */
        unsigned  maint_status      : 2 ;
        unsigned  maintain          : 1 ;
        unsigned  on_fast_maint_list : 1 ;
        unsigned  on_slow_maint_list : 1 ;
        unsigned  maint_protocol    : L2_PROTOCOL_BIT ;  /* six bits */
    } bf2 ;

BYTE maint_byte ;

} maint_union ;
```

```
#define    NodeMaintStatus(np)                  ((np)-
          >maint_union.bf2.maint_status)
#define    SetNodeMaintStatus(np,st)            ((np)->maint_union.bf2.maint_status
          = (st))

#define    NodeMaintain_M(np)                   ((np)->maint_union.bf2.maintain)
#define    SetNodeMaintain_M(np,val)            ((np)->maint_union.bf2.maintain =
          (val))

#define    NodeOnFastList(np)                   ((np)-
          >maint_union.bf2.on_fast_maint_list)
#define    SetNodeOnFastList(np,val)            ((np)->maint_union.bf2.on_fast_maint_list = (val))
#define    NodeOnSlowList(np)                   ((np)-
          >maint_union.bf2.on_slow_maint_list)
#define    SetNodeOnSlowList(np,val)            ((np)->maint_union.bf2.on_slow_maint_list = (val))

#define    NodeMaintProtocol(np)                ((L2_PROTOCOL)((np)-
          >maint_union.bf2.maint_protocol))
#define    SetNodeMaintProtocol(np,val)         ((np)->maint_union.bf2.maint_protocol
          = (val))

#define    NodeMaintByte_M(np)                  ((np)->maint_union.maint_byte)

/* information sent by the other node */
    struct
    {
        ULONG      age ;
        UCOUNT     status ;
        UCOUNT     seq_num ;
        DEV_ADDR   dev_addr ;          /* if status is routable */

UTINY      octant[OCTANT_COUNT] ;

} info ;

#define    NodeInfoAge(np)                      ((np)->info.age)
#define    NodeInfoStatus(np)                   ((np)->info.status)
#define    NodeInfoSeqNum_M(np)                 ((np)->info.seq_num)
#define    NodeInfoDevAddrPtr_M(np)             (&((np)->info.dev_addr))
```

```
#define    NodeBatteryBacked_M(np)              ((np)->info.status &
L2_LINK_INFO_STATUS_PERSISTENT)
#define    NodeRouteable_M(np)                  ((np)->info.status &
L2_LINK_INFO_STATUS_ROUTABLE)

#define    NodeInfoSeqNum_M(np)                 ((np)->info.seq_num)
#define    NodeInfoDevAddrPtr(np)               (&((np)->info.dev_addr))

#define    NodeOctantCount(np,x)                ((np)->info.octant[(x)])

/* how many naps */
    UTINY    naps ;

#define    MAX_NODE_NAPS                (24)
#define    NodeNaps(np)                 ((np)->naps)
#define    IncrementNodeNaps(np)        ((np)->naps++)
#define    ClearNodeNaps(np)            ((np)->naps = 0)

/* maintenance linked list storage */
    NODE *next_to_maintain ;

#define    NodeNextToMaintain_M(np)             ((np)->next_to_maintain)
#define    SetNodeNextToMaintain_M(np,val)      ((np)->next_to_maintain =
(val))

ULONG    test_packets ;

#define    NodeTestPackets_M(np)                ((np)->test_packets)
#define    SetNodeTestPackets_M(np, val)        ((np)->test_packets = (val))
#define    IncrementNodeTestPackets_M(np)       ((np)->test_packets++)

ULONG    tickle_tries, tickle_successes ;

#define    NodeTickleTries_M(np)                ((np)->tickle_tries)
#define    SetNodeTickleTries_M(np,val)         ((np)->tickle_tries = (val))
#define    IncrementNodeTickleTries_M(np)       ((np)->tickle_tries++)
#define    NodeTickleSuccesses_M(np)            ((np)->tickle_successes)
#define    SetNodeTickleSuccesses_M(np,val)     ((np)->tickle_successes = (val))
#define    IncrementNodeTickleSuccesses_M(np)   ((np)->tickle_successes++)
```

```
#define     NUM_NODES         200
#define     MIN_FREE_NODES    (OCTANT_COUNT + 4)

/* ***************** end of  N O D E   D E F I N I T I O N  ***************** */

IMPORT    VOID    FailNode( NODE *dead_np ) ;
IMPORT    VOID    DeleteDoomedNodes( MSUBNET net ) ;
IMPORT    NODE    *FindNodeGivenLinkPtr( LINK_ADDR *lp, MSUBNET net ) ;
IMPORT    NODE    *MakeNodeGivenLinkPtr( LINK_ADDR *lp, MSUBNET net ) ;
IMPORT    UCOUNT   smooth( ARG current, ARG new ) ;

IMPORT    VOID    UpdateNode( NODE *np, ARG delta_tick, BYTES rssi, BYTES discriminator,
UTINY rx_signal ) ;

IMPORT    VOID    AddAllOctantInfo( UTINY octants[] ) ;
IMPORT    BOOL    CloserThan( LINK_ADDR *link_ptr, WAN_ADDR *dest_wan, DISTANCE distance
) ;
IMPORT    UCOUNT   LinksPerSubnet( MSUBNET subnet ) ;
IMPORT    UCOUNT   SequenceNumber( NODE *input_np ) ;

IMPORT    BOOL    DeleteStalestLANnode(VOID) ;
IMPORT    VOID    MakeNodeRoom( VOID ) ;

IMPORT    VOID    NapNode( NODE *np ) ;
IMPORT    VOID    SetNodeActiveState( NODE *np ) ;
```

Appendix B

Listing TICKER C

●Copyright (unpublished work) Metricom, Inc. All rights reserved.

```c
#include <dos.h>
include <stdio.h>
include <stdlib.h> include "std.h"
include "kernel.h"
#include "net.h"

#include "mclock.h"
#include "mtime.h"
#include "addr.h"

#include "l0.h"
#include "l1.h"
#include "l2.h"
#include "l2lanwan.h"
#include "node.h"
#include "l3.h"
#include "l3lanwan.h"
#include "platform.h"
#include "config.h"

/****************************************************************
**
**      ticker.c
**
**      VOID SetsingleFreq( BOOL yes_no )
**      BOOL singleFreq(VOID)
**
**      Set and test for 'single freq' (frequency == start_divisor) operation.
**      When set, the PLL will be set to the 'start divisor' at the next
**      'slot edge'.
```

```
*   UCOUNT  target_tick( ARG delta_tick )
*
*   Calculates the 'epoch tick' that a remote radio is on given its
*   'delta_tick'.  The 'delta tick' is calculated at receipt of packet time
*   from the 'tick' that the sender puts into the packet and the
*   Home.slot/Home.tick at time of receipt of StartFlag sequence.
*
*   VOID SetTraveling( ARG delta_tick )
*
*   Sets the 'Current.tick/Current.slot' to values which are time coincident
*   with a remote radios HomeSlot/Home.tick. Current.slot/Current.tick are used
*   to set our PLL, so when we are 'traveling', our PLL and slotting timing
*   is synchronized with the remote node.
*
*   LOCAL VOID     send_octet( ARG octet )
*   LOCAL BOOL     SetPll( UCOUNT sda_n, UCOUNT divisor, UCOUNT cb1, UCOUNT cb2 )
*
*   Set the PLL divisor, and control bytes. SetPll calls 'send_octet' to
*   send a stream of bits out to the PLL using parallel port lines. Consult
*   chip documentation for the meanings of the PLL control bytes. 'divisor'
*   should be between MIN_PLL_DIVISOR and MAX_PLL_DIVISOR for operation
*   within the ISM band.  SetPll returns TRUE iff the PLL responded with
*   an acknowledgement of the programming sequence.
*
*   [TASK]
*   VOID Ticker(VOID)
*
*   Started up every 'tick', this task keeps track of the 'slots', 'ticks',
*   'seconds', and performs 'traveling' arithmetic.
*
********************************************************************/

LOCAL     UCOUNT    clock_tick_counter ;
```

```
UCOUNT      NumChannels ;
UCOUNT      singleFreqChannel = 100 ;

LOCAL       BOOL  traveling ;

TICKSLOT    Home, Current ;

LOCAL BOOL      set_pll = FALSE ;

LOCAL BOOL      single_freq = FALSE ;
BOOL            singleFreq(VOID) { return single_freq ; }
VOID            setsingleFreq( BOOL yes_no ) { single_freq = yes_no ; }

UCOUNT          Countdown1 = 0 ;
VOID            SetCountdown1( UCOUNT val )
(
        Countdown1 = val ;
)

/*  we got 'delta_tick' by subtracting remote epoch from our epoch

DeltaTick = RemoteTick - OurTick ;

to get back, we add OurTick to DeltaTick

Remote_Tick = DeltaTick + OurTick ;

*/
UCOUNT target_tick( ARG delta_tick )
(
    FAST LONG remote_tick ;

remote_tick = (LONG)delta_tick + (LONG) (Home.tick + (Home.slot *
TICKS_PER_SLOT)) ;

if( remote_tick < 0 )
    (
        remote_tick += (NUM_SLOTS * TICKS_PER_SLOT) ;
    )
    else if( remote_tick >= (NUM_SLOTS * TICKS_PER_SLOT) )
    (
        remote_tick -= (NUM_SLOTS * TICKS_PER_SLOT) ;
```

```c
        return( (UCOUNT)remote_tick ) ;
}
/*
VOID test_target_tick(VOID)
{
        ARG     i, j ;
        for( i = -20500; i < 20500; i++ )
        {
                if( abs( (j = target_tick(i))) > 20500U )
                {
                        printf( "target_tick returns %d\n", j ) ;
                }
        }
}
*/
VOID SetTraveling( ARG delta_tick )
{
        FAST UCOUNT     t_tick ;

/* make sure we are not interrupted */
        disable() ;

if( delta_tick )
        {
                /* calculate the remote slot and tick to assume */
                t_tick          = target_tick( delta_tick ) ;
                current.slot    = t_tick / TICKS_PER_SLOT ;

Current.tick    = t_tick % TICKS_PER_SLOT ;
                traveling       = TRUE ;
        }
        else
        {
                traveling       = FALSE ;
        }
```

```
        /* since this routine is used to 'return' from a remote slot,
           we ask that the PLL be set in all cases */
        set_pll         = TRUE ;
        enable() ;

printf( "SetTraveling-> Current.slot to:%d, t_tick:%u delta_tick:%d\n",
                Current.slot, t_tick, delta_tick ) ;

printf( "Home.tick:%u Home.slot:%u\n", Home.tick, Home.slot ) ;

/* allow the VCO to settle */
        sys_pend(0,FIRST_ACTIVITY_TICK) ;

if( Current.slot > NUM_CHANNELS )
    {
    }
}

ULONG       start = 1L ;

/* From "Seminumerical Algorithms, Vol 2, Knuth". Pages 1 through 177 with
   special interest in pages 11 through 17 */
UCOUNT mrand( VOID )
{
    return( (UCOUNT)((start = start * 214013UL + 2531011UL) >> 16) & 0x7fff ) ;
}

UCOUNT      channel[NUM_CHANNELS] ;

LOCAL VOID init_channel_table(VOID)
{
    ARG     i, slot ;

/* convert slots to channels */
    for( slot = 0; slot < NUM_SLOTS; )
    {
        UCOUNT      try ;

try = ((mrand() % NUM_SLOTS) + START_CHANNEL) ;

/* see if we are already using this channel */
```

```c
        for( i = 0; i < slot; i++ )
        {
            if( channel[i] == try ) ( break ; )
        } if( i >= slot )    ( channel[slot] = try ; slot++ ; )
    )

#ifdef DEBUG
    /* detect if there are any dups */
    for( i = 0; i < NUM_SLOTS; i++ )
    {
        ARG j ;

for( j = i + 1; j < NUM_SLOTS; j++ )
        {
            if( channel[i] == channel[j] )
            (
                printf( "channel[%d] and channel[%d] match:%d\n",
                        i, j, channel[i] ) ;
            )
        }
    }

/* detect possible omissions */
    for( i = START_CHANNEL; i < (NUM_SLOTS + START_CHANNEL); i++ )
    {
        ARG j ;

for( j = 0; j < NUM_SLOTS; j++ )
        {
            if( channel[j] == i )    ( break ; )
        } if( j >= NUM_SLOTS )    ( printf( "didn't find a %u\n", i ) ; )
    }

/* print the winners */
    for( i = 0; i < NUM_SLOTS; i++ )
    {
        if( !(i % 5) ) printf( "\n" ) ;
```

```c
        printf( "s[%-3u]:%-3u ", i, channel[i] ) ;
        }
#endif
    }

BOOL GoToSlot( BOOL receive )
{
    UCOUNT  ch ;
    ARG     tries ;

if( single_freq )   { ch = singleFreqChannel ; }
    else                { ch = channel[Current.slot] ; } for( tries = NUM_PLL_PROGS_PER_TICK; tries; tries-- )
    {
        if( sys_wan_freq(ch, receive) == TRUE )
        {
            ARG     locked_tries = 2 ;

while( locked_tries-- )
            {
                /* wait for a bit in any case (sigh) */
                sys_pend(0,1) ;

if( sys_locked_pll() == TRUE )
                {
                    /* everything is OK */
                    return TRUE ;
                }
            }
        }
        else
        {
            /* PLL didn't respond to the programming sequence
               OR 'freq' was NOT ok */
        }
    } if(Gabby() == 0 ) printf("GoToSlot %u, Current.slot:%u -- loses\n",
```

```
            ch, Current.slot ) ;

return FALSE ;
}

/* [TASK] */
VOID Ticker(VOID)
(
    Home.slot              = rand() % NUM_SLOTS ;
    Home.tick              = (rand() % TICKS_PER_SLOT) ;
    Home.ticks_per_slot    = TICKS_PER_SLOT ;
    Current.ticks_per_slot = TICKS_PER_SLOT ;

#ifdef TICKER_VISIBILITY
printf( "Home.slot:%u Home.tick:%u Home.ticks_per_slot:%u\n",
    Home.slot, Home.tick, Home.ticks_per_slot ) ;

TICKS_PER_SLOT, (NUM_SLOTS * TICKS_PER_SLOT), MS_PER_TICK,
MICROSEC_PER_TICK ) ;

printf( "TicksPerSec:%u usPerSlot:%lu\n",
        TICKS_PER_SEC, MICROSEC_PER_SLOT ) ;

printf( "NumPllProgsPerTick:%u VCOSettlingTime:%u\n",
        NUM_PLL_PROGS_PER_TICK, VCO_SETTLING_TICK ) ;

printf( "PiggybackDataTick:%u FirstDataTick:%u RefractoryPeriod:%u
TickDataDuration:%u\n",
        PIGGYBACK_DATA_TICK, FIRST_DATA_TICK, REFRACTORY_PERIOD, TICK_DATA_DURATION
) ;

printf( "FirstAckTick:%u SecondAckTick:%u\n",
        FIRST_ACK_TICK, SECOND_ACK_TICK ) ;

#endif
    traveling          = FALSE ;
    clock_tick_counter = 0 ;

/* perform slot to channel conversion ONCE */
    init_channel_table() ;
```

```
/* enable the WAN receiver */
sys_wan_clear() ;

/* inform tasks that the Nodelists are ready */
sys_post( WAN_NODELIST_FREE_EVENT ) ;
sys_post( LAN_NODELIST_FREE_EVENT ) ;
sys_post( LAN_MAINT_LIST_EVENT ) ;
sys_post( WAN_MAINT_LIST_EVENT ) ;

while(TRUE)
{
    /* await next sys tick */
    sys_wait() ;

/* count down the Countdown counter(s) */
if( Countdown1 )   ( Countdown1-- ; )

/* perform the "Real Time" functions */
if( ++clock_tick_counter >= TICKS_PER_SEC )
{
    TickMclock(1,TIMEBASE_ERROR) ;
    clock_tick_counter = 0 ;
}

/* If at a 'Slot Edge' */
if( ++Home.tick >= TICKS_PER_SLOT )
{
    Home.tick = 0 ;
    if( ++Home.slot >= NUM_SLOTS )    Home.slot = 0 ;
}

/* traveling == TRUE iff we are NOT on our home slot...
     i.e., we are 'traveling' to the home slot of another
     radio in order to transmit data */
if( traveling )
{
    if( ++Current.tick >= TICKS_PER_SLOT )   /* end of slot */
    {
        Current.tick = 0 ;
        if( ++Current.slot >= NUM_SLOTS )
        (
            Current.slot = 0 ;
        )
    }
```

```
        }
    else
        {
        Current.slot = Home.slot ;
        Current.tick = Home.tick ;
        }
    /* set PLL on the Slot Edge */
    if( Current.tick == 0 )   { set_pll = TRUE ; )
            if( (set_pll == TRUE) && (!single_freq) )
                {
                if( sys_wan_freq(channel[Current.slot], RECEIVE) == TRUE )
                    {
                    set_pll = !sys_locked_pll() ;
                    }
                }

/* routines used in l2wan for calculating delays between packets */
UCOUNT    CalcEndSlot( ARG start_slot, ARG slots )
    {
    UCOUNT   end_slot ;

end_slot = start_slot + slots ;

if( end_slot >= NUM_SLOTS )
        {
        end_slot -= NUM_SLOTS ;
        } return end_slot ;
    }

/* use Home.slot/tick because we are NOT traveling */
UCOUNT   TicksTillNextAck( ARG quit_slot, ARG listen_slot )
    {
```

```
FAST UCOUNT    now_slot, now_tick ;
UCOUNT         ticks_till ;

now_slot = Home.slot ;
now_tick = Home.tick ;

if( now_slot == quit_slot )
{
        /* if already at the 'quiting slot'... wait no longer */
        ticks_till = MINIMUM_PEND_TIME ;
}
else if( now_slot == listen_slot )
{
        /* if in the 'listen_slot' wait till the 'quitting slot' */
        ticks_till = (TICKS_PER_SLOT - now_tick) ;
}
/* too fast
else if( now_tick < FIRST_ACK_TICK )
{
        ticks_till = (FIRST_ACK_TICK - now_tick) ;
}
end of too fast */
else if( now_tick < SECOND_ACK_TICK )
{
        ticks_till = (SECOND_ACK_TICK - now_tick) ;
}
else
{
        ticks_till = (TICKS_PER_SLOT - now_tick + FIRST_ACK_TICK) ;
} if( ticks_till == 0 )
{
        return MINIMUM_PEND_TIME ;
}
else
{
        return ticks_till ;
}
}
```

```
/* routine used in LAN/WAN_schedule_and_sweep() */
UCOUNT   TicksToAlarm( MCLOCK_TIMER *timer, MCLOCK_TIMER *expire )
{
    UCOUNT   return_val ;

if( IsExpiredMclockTimer(timer, expire) )
    {
        return_val = 0 ;
    }
    else
    {
        ULONG    ticks_till_expiration ;

ticks_till_expiration = DeltaMclockTimer(expire, timer) * TICKS_PER_SEC ;

if( ticks_till_expiration > UCOUNT_MAX )
        {
            return_val = UCOUNT_MAX ;
        }
        else
        {
            return_val = (UCOUNT)ticks_till_expiration ;
        }
    } if( return_val == 0 )  { return MINIMUM_PEND_TIME ; }
    else                   { return return_val ; }
}

UCOUNT   TicksTillSlot( UCOUNT slot )
{
    UCOUNT   now_slot, now_tick, return_val ;

now_slot = Current.slot ;
    now_tick = Current.tick ;

if( now_slot == slot )
    {
        /* return Minimum we can pend */
        return_val = 0 ;
    }
```

```
    else if( now_slot < slot )
    {
        return_val = (((slot - 1) - now_slot) * TICKS_PER_SLOT) + (TICKS_PER_SLOT - now_tick) ;
    }
    else
    {
        return_val = (TICKS_PER_SLOT - now_tick) + ((NUM_SLOTS - 1 - now_slot) *
TICKS_PER_SLOT) + (slot * TICKS_PER_SLOT) ;
    }
    if( return_val == 0 )
    {
        return MINIMUM_PEND_TIME ;
    }
    else
    {
        return return_val ;
    }
}

VOID WaitTillRightTick( UCOUNT tick )
{
    UCOUNT   current, pend_ticks ;

/* integer assignments are atomic */
    current = Current.tick ;

pend_ticks = current <= tick
                 ? tick - current
                 : TICKS_PER_SLOT - current + tick ;

if( pend_ticks == 0 )
    {
        sys_pend( 0, MINIMUM_PEND_TIME ) ;
    }
    else
    {
        sys_pend( 0, pend_ticks ) ;
    }
}
```

Appendix C
Listing L2MAINT C

©Copyright (unpublished work) Metricom, Inc.
All rights reserved.

```c
#include <dos.h>
include <stdio.h> include "std.h"
include "kernel.h"
#include "net.h"

#include "mtime.h"
#include "mclock.h"
#include "addr.h"
#include "angle.h"

#include "l0.h"
#include "l1.h"
#include "l2.h"
#include "l2lanwan.h"
#include "node.h"
#include "l3.h"
#include "l3lanwan.h"
#include "scan.h"
#include "platform.h"
#include "config.h"

#include "netutil.h"

/****************************************************************
 *
 *    l2maint.c
 *
 *    This source file contains routines to process and generate
 *    maintenance frames -- NULL, TEST, SYNC, TIMESTAMP, TIMESTAMP_INQUIRY,
 *    LINK_INFO, and LINK_INFO_INQUIRY.
 *
 *    NODE *LANStartOfFastMaintList
 *    NODE *LANStartOfSlowMaintList
 *    NODE *WANStartOfFastMaintList
```

```
*       NODE *WANStartofSlowMaintList
*
*       These NODE pointers contain the first (next to be maintained) NODE in
*       the node maintenance linked list. If set to NULLNP, there are no nodes
*       in the list to be maintained.
*
*
*       MCLOCK_TIMER    LAN_maintenance_timer
*       MCLOCK_TIMER    WAN_maintenance_timer
*
*       ARG     NumInMaintList( MSUBNET net )
*
*       Returns the number of NODEs in the maintenance list for MSUBNET 'net'.
*
*
*       NODE *GetMaint( MSUBNET net )
*
*       Deletes the next NODE to be maintained on MSUBNET 'net' from the
*       appropriate Maintainence linked list and returns it. If the maintenance
*       is aborted for some reason, the 'np' returned may be put back on the
*       maintenance list.
*
*       VOID del_maint( NODE *np )
*       VOID DelEvenIfNotonMaintList( NODE *np )
*
*       Deletes the NODE 'np' from the appropriate maintenance list if it is
*       on the list. There is no return value.
*
*       DelEvenIfNotonMaintList(np) is the Exported version.
*
*
*       VOID AddMaint( NODE *np, BOOL fast, L2_PROTOCOL protocol )
*
*       Adds the NODE 'np' to the appropriate maintenance list. 'Fast' maintenance
*       is for acquisition related maintenance, while 'slow' maintenance is for
*       timer expirations. The Maintenance packet is sent out with every effort
```

```
 *      to set L2_PROTOCOL to protocol.
 *
 *   This provides the import/export routines for the L2_LINK_INFO
 *   object.  This provides the following functions:
 *
 *      unsigned char   *ExportL2LinkInfo(buf,link_info,msubnet)
 *      unsigned char   *buf ;
 *      L2_LINK_INFO    *link_info ;
 *      MSUBNET         msubnet ;
 *
 *      Export the L2_LINK_INFO object into *buf, returning a pointer
 *      into buf[] just past the exported L2_LINK_INFO object.  Msubnet
 *      is the subnet code.
 *
 *      unsigned char   *ImportL2LinkInfo(link_info,buf,msubnet)
 *      L2_LINK_INFO    *link_info ;
 *      unsigned char   *buf ;
 *      MSUBNET         msubnet ;
 *
 *      Import a L2_LINK_INFO object from *buf, returning a pointer
 *      into buf[] just past the imported L2_LINK_INFO object.  Msubnet
 *      is the subnet code.
 *
 *      BOOLEAN      SendMaint( np, link_src_ptr, protocol, ftype )
 *      NODE         *np ;
 *      LINK_ADDR    *link_src_ptr ;
 *      L2_PROTOCOL  protocol ;
 *      L2_FTYPE     ftype ;
 *
 *      Called to send a maintenance frame to the node *np from the source
 *      LINK_ADDR *link_src_ptr.  It sends a maintenance frame of the given
 *      protocol and the given frame type (DATA_ACK or DATA_NOACK).
 *
 *      This returns TRUE iff the maintenance frame was scheduled.
 *
 *      VOID       UpdateMaint( pp )
 *      PLATFORM   *pp ;
```

```
 *      Called to update the value (at the "last moment") before sending a
 *      maintenance frame.
 *
 *      VOID    RecvMaint( pp )
 *      PLATFORM *pp ;
 *
 *      Processes a received maintenance frame.  This always frees the
 *      platform pp.
 *
 **********************************************************************/

/* accelerate the Acquisition Phase for the WAN */
#define     ACQUISITION_MAINT_GATE          (15)

/* the 'anchors' for the maintenance linked lists - start of search */
NODE   *LANStartofFastMaintList = NULLNP ;
NODE   *LANStartofSlowMaintList = NULLNP ;
NODE   *WANStartofFastMaintList = NULLNP ;
NODE   *WANStartofSlowMaintList = NULLNP ;

LOCAL VOID     pend_for_maint_list( MSUBNET net )
{
    /* acquire the Maint List for ourselves */
    if( net == MSUBNET_LAN )  ( sys_pend( LAN_MAINT_LIST_EVENT, 0 ) ; )
    else                      ( sys_pend( WAN_MAINT_LIST_EVENT, 0 ) ; )
}

LOCAL VOID     release_maint_list_ownership( MSUBNET net )
{
    /* free the Maint List for others */
    if( net == MSUBNET_LAN )  ( sys_post( LAN_MAINT_LIST_EVENT ) ; )
    else                      ( sys_post( WAN_MAINT_LIST_EVENT ) ; )
}

MCLOCK_TIMER    LAN_maintenance_timer = 0 ;
MCLOCK_TIMER    WAN_maintenance_timer = 0 ;
```

```
ARG      NumInMaintList( MSUBNET net )
(
    ARG     count ;
    NODE *start ;

/* get the list for ourselves */
    pend_for_maint_list(net) ;

if( net == MSUBNET_LAN )  { start = LANStartOfFastMaintList ; }
    else                      { start = WANStartOfFastMaintList ; }

/* initialize the count */
    for( count = 0; start != NULLNP; count++ )
    (
        start = start->next_to_maintain ;
    )

if( net == MSUBNET_LAN )  { start = LANStartOfSlowMaintList ; }
    else                      { start = WANStartOfSlowMaintList ; } for( /* save the count */ ; start != NULLNP; count++ )
    (
        start = start->next_to_maintain ;
    )

release_maint_list_ownership(net) ;
    return count ;
}

NODE *GetMaint( MSUBNET net )
(
    NODE **start_ptr, *found ;
    BOOL fast = TRUE ;

pend_for_maint_list(net) ;

if( net == MSUBNET_LAN )
    (
        if( *(start_ptr = &LANStartOfFastMaintList) == NULLNP )
        (
            start_ptr = &LANStartOfSlowMaintList ;
            fast = FALSE ;
        )
    )
```

```c
    }
    else /* MSUBNET == WAN */
    {
        if( *(start_ptr = &WANStartofFastMaintList) == NULLNP )
        {
            start_ptr = &WANStartofSlowMaintList ;
            fast = FALSE ;
        }
    }

/* get the first Node on the list */
    if( *start_ptr != NULLNP )
    {
        /* save the first one that we found */
        found = *start_ptr ;

/* move the pointers 'around' the NODE we're returning */
        *start_ptr = (*start_ptr)->next_to_maintain ;

/* reset 'list state' bits in 'found' NODE */
        if( fast )  ( SetNodeOnFastList(found,FALSE) ; )
        else        ( SetNodeOnSlowList(found,FALSE) ; )

SetNodeNextToMaintain_M(found,NULLNP) ;
    }
    else
    {
        found = NULLNP ;
    } if( Gabby() == GABBY_MAINT) printf( "GetMaint exit... *start_ptr:%p found:%p fast:%u\n", *start_ptr, found, fast ) ;

release_maint_list_ownership( net ) ;
    return found ;
}

/* NOTE... this routine is NOT protected... it MUST be protected otherwise */
LOCAL VOID   del_maint( NODE *np )
{
    NODE **start_ptr ;

if( Gabby() == GABBY_MAINT) printf( "del_maint( %p )entry\n", np ) ;
```

```c
if( np == NULLNP )  { return ; } if( NodeOnFastList(np) )
{
    if( NodeNet(np) == MSUBNET_LAN )    ( start_ptr = &LANStartOfFastMaintList ;
    else                                ( start_ptr =
&WANStartOfFastMaintList ; )
}
else if( NodeOnSlowList(np) )
{
    if( NodeNet(np) == MSUBNET_LAN )    ( start_ptr = &LANStartOfSlowMaintList ;
    else                                ( start_ptr =
&WANStartOfSlowMaintList ; )
}
else
{
    if(Gabby() == GABBY_MAINT) sys_puts( "del_maint... np not on any list\n" ) ;
    return ;
}

/* look till we find the target NODE */
while( *start_ptr != np )
{
    start_ptr = &((*start_ptr)->next_to_maintain) ;
}

/* commit suicide in this undefined state */
if( *start_ptr == NULLNP )    ( Die(MAINT_START_POINTER_INVALID) ; )

/* now, delete the NP */
if( NodeOnFastList(np) )   ( SetNodeOnFastList(np,FALSE) ; )
else                       ( SetNodeOnSlowList(np,FALSE) ; )

/* move the pointers 'around' the deleted NODE... */
*start_ptr = np->next_to_maintain ;
SetNodeNextToMaintain_M(np, NULLNP) ;
}

VOID DelEvenIfNotOnMaintList( NODE *np )
{
```

```
        pend_for_maint_list(NodeNet(np)) ;
        del_maint(np) ;
        release_maint_list_ownership( NodeNet(np) ) ;
}

VOID AddMaint( NODE *np, BOOL fast, L2_PROTOCOL protocol )
{
    NODE **start_ptr, *current ;

if( Gabby() == GABBY_MAINT) printf( "AddMaint( %p %u )entry\n", np, fast ) ;

/* acquire the Maint List for ourselves */
    pend_for_maint_list( NodeNet(np) ) ;

/* If already on the fastest maintenance list... */
    if( NodeOnFastList(np) )
    {
        release_maint_list_ownership( NodeNet(np) ) ;
        return ;
    }

/* ...else, already on the slow. */
    if( NodeOnSlowList(np) )
    {
        if( fast )    ( del_maint(np) ; )
        else
        {
            release_maint_list_ownership( NodeNet(np) ) ;
            return ;
        }
    } if( NodeNet(np) == MSUBNET_LAN )
    {
        if( fast )   ( start_ptr = &LANStartOfFastMaintList ; )
        else         ( start_ptr = &LANStartOfSlowMaintList ; )
    }
    else
    {
        if( fast )   ( start_ptr = &WANStartOfFastMaintList ; )
        else         ( start_ptr = &WANStartOfSlowMaintList ; )
    }
```

```
        if( (current = *start_ptr) == NULLNP ) ( *start_ptr = np ; )
        else
        (
                /* look for the LAST maintained node */
                while( current->next_to_maintain != NULLNP )
                (
                        current = current->next_to_maintain ;
                )
                /* now at end of list */
                current->next_to_maintain      = np ;

/* set 'list state' bits in NODE */
                if( fast )      ( SetNodeOnFastList(np,TRUE) ; )
                else            ( SetNodeOnSlowList(np,TRUE) ; )

SetNodeMaintProtocol( np, protocol ) ;
                SetNodeNextToMaintain_M( np, NULLNP ) ;

/* free the Maint List for others */
                release_maint_list_ownership( NodeNet(np) ) ;

if( Gabby() == GABBY_MAINT) printf( "AddMaint: *start_ptr:%p current:%p, np:%p\n",
        *start_ptr, current, np) ) ;
        )

/* end of linked list code */

/* start of 'netman' maintenance code */

/*      Export a L2_LINK_INFO struct    */

UTEXT   *ExportL2LinkInfo( UTEXT buf[], L2_LINK_INFO *link_info )
        (
                FAST UCOUNT     i ;

buf = ExportMtime(buf,(&(link_info->time))) ;
                buf = ExportMtimeError(buf,(&(link_info->time_error))) ;
```

```
    buf = ExportMulong(buf,link_info->age) ;
    buf = ExportMushort(buf,link_info->status) ;
    buf = ExportMushort(buf,link_info->seq_num) ;

buf = ExportDevAddr(buf,(&(link_info->dev_addr))) ;
    buf = ExportMushort(buf,link_info->wan_links) ;
    buf = ExportMushort(buf,link_info->lan_links) ;

for(i = 0; i != OCTANT_COUNT; i++)
    (
        *buf++ = link_info->octant[i] ;
    )

return(buf) ;
}

/*  Import a L2_LINK_INFO struct  */

UTEXT   *ImportL2LinkInfo( L2_LINK_INFO *link_info, UTEXT buf[] )
(
    FAST UCOUNT   i ;

buf = ImportMtime(&(link_info->time),buf) ;
    buf = ImportMtimeError(&(link_info->time_error),buf) ;

buf = ImportMulong((&(link_info->age)),buf) ;
    buf = ImportMushort((&(link_info->status)),buf) ;
    buf = ImportMushort((&(link_info->seq_num)),buf) ;

buf = ImportDevAddr(&(link_info->dev_addr),buf) ;

buf = ImportMushort((&(link_info->wan_links)),buf) ;
    buf = ImportMushort((&(link_info->lan_links)),buf) ;

for(i = 0; i != OCTANT_COUNT; i++)
    (
        link_info->octant[i] = *buf++ ;
    )

return(buf) ;
}
```

```
/*
        Manifest constants
*/ undef      VOLATILE_AGE        /* define to treat age as a volatile field */ ifdef      VOLATILE_AGE
define     VOLATILE_AGE_SLOP   (16)
#endif

/*
        Make and send a maintenance frame.
*/ ifdef  PROTOTYPE
BOOLEAN     SendMaint(
NODE        *np,
LINK_ADDR   *link_src_ptr,
L2_PROTOCOL protocol,
L2_FTYPE    ftype)
#else
BOOLEAN     SendMaint( np, link_src_ptr, protocol, ftype )
NODE        *np ;
LINK_ADDR   *link_src_ptr ;
L2_PROTOCOL protocol ;
L2_FTYPE    ftype ;
#endif
{
    FAST    PLATFORM    *pp ;
    FAST    UTEXT       *bp ;
    union
    (
            L2_SYNC         sync ;
            L2_TIMESTAMP    timestamp ;
            L2_LINK_INFO    link_info ;
    ) frame ;

UCOUNT      frame_len ;
    ARG         j ;
    LAN_ADDR    lan ;
    WAN_ADDR    wan ;
```

```
if(Gabby() == GABBY_MAINT)
    printf( "SendMaint( %p, %p %u %u ) entry\n",
        np, link_src_ptr, protocol, ftype ) ;

/* if no platform to put frame into, don't go any further */
if( FreePlatform_Q->audit < (sys_task_id() + MINIMUM_PLATFORMS)
    || ((pp = (PLATFORM *)sys_get_queue(FreePlatform_Q)) == NULLPP) )
{
    return FALSE ;
}

/* send the remembered protocol */
protocol = NodeMaintProtocol(np) ;

/* ... else, can we not send LINK_INFO's to this node? */
if(NodeMaintStatus(np) == NODE_MAINT_STATUS_TIMESTAMP)
{
    if(protocol == L2_PROTOCOL_LINK_INFO_INQUIRY)
    {
        protocol = L2_PROTOCOL_TIMESTAMP_INQUIRY ;
    }
    else if(protocol == L2_PROTOCOL_LINK_INFO)
    {
        protocol = L2_PROTOCOL_TIMESTAMP ;
    }
}

/* do we not send TIMESTAMP_INQUIRY's to this node? --
   because it is an incompatible Meter.... */
if( (protocol == L2_PROTOCOL_TIMESTAMP_INQUIRY)
    && (!RamAcceptLANtime_M || !RamTruthfulLANtime_M) )
{
    protocol = L2_PROTOCOL_TIMESTAMP ;
}

/* fill appropriate frame structure */
switch(protocol)
{
    case(L2_PROTOCOL_NULL):

/* NULL frame has no data */
```

```
        frame_len = 0 ;
        break ;

case(L2_PROTOCOL_TEST):

/* we pad TEST frame to full length */
        frame_len = (MAX_PACKET_LEN - L1_HEADER_LEN - L2_HEADER_LEN) ;
        break ;

case(L2_PROTOCOL_SYNC):

GetMclockTimer(&frame.sync.age) ;
        frame_len = LengthL2Sync(&frame.sync,NodeNet(np)) ;
        break ;

case(L2_PROTOCOL_TIMESTAMP):
    case(L2_PROTOCOL_TIMESTAMP_INQUIRY):

/* get our current clock */
        GetMclockWithError(
                &frame.timestamp.time,
                &frame.timestamp.time_error ) ;

/* fixup LAN time iff required */
        if( (NodeNet(np) == MSUBNET_LAN) && !RamTruthfulLANTime_M )
        {
            CopyMtimeError( &frame.timestamp.time_error, ZeroMt ;
        }
/*
        printf( "SendMaint:net:%u truth:%u time:%lu error:%lu\n",
            (UCOUNT)NodeNet(np), (UCOUNT)RamTruthfulLANTime_M,
                frame.timestamp.time,
                frame.timestamp.time_error ) ;
*/ frame_len = LengthL2Timestamp(&frame.timestamp,NodeNet(np)) ;
        break ;

case(L2_PROTOCOL_LINK_INFO):
    case(L2_PROTOCOL_LINK_INFO_INQUIRY):
```

```c
/* get our current clock */
GetMclockWithError(
    &frame.link_info.time,
    &frame.link_info.time_error ) ;

/* get current timer (to compute age) */
GetMclockTimer(&frame.link_info.age) ;

/* assign status for Interseted Nodes */
frame.link_info.status = RamBatteryBacked_M ?
    L2_LINK_INFO_STATUS_PERSISTENT : L2_LINK_INFO_STATUS_NULL ;
frame.link_info.status |= RamUseForRouting_M ? L2_LINK_INFO_STATUS_ROUTABLE
    : L2_LINK_INFO_STATUS_NULL ;

/* what is the sequence number of this link? */
j = SequenceNumber(np) ;

/* assign the other node a sequence number */
if( NodeSeqNum_M(np) == 0 )
{
    SetNodeSeqNum_M(np, SequenceNumber(np) ) ;
}
else
{
    SetNodeSeqNum_M( np, MIN( NodeSeqNum_M(np), j ) ) ;
}
frame.link_info.seq_num = NodeSeqNum_M(np) ;

/* infer our device address */
if( NodeNet(np) == MSUBNET_LAN )
{
    LinkToLan( &lan, link_src_ptr ) ;
    BuildDevAddr( &frame.link_info.dev_addr, &OurGlobalWanAddr, &lan) ;
}
else
{
    CopyDevAddr( &frame.link_info.dev_addr, RamDevSrcPtr_M ) ;
} frame.link_info.wan_links = LinksPerSubnet( MSUBNET_WAN ) ;
frame.link_info.lan_links = LinksPerSubnet( MSUBNET_LAN ) ;
```

```
                    /* get the WAN connectivity */
                    AddAlloctantInfo( frame.link_info.octant ) ;

/* we pad LINK_INFO frame to full length */
                    frame_len = (MAX_PACKET_LEN - L1_HEADER_LEN - L2_HEADER_LEN) ;

break ;

default:
                    FreePlatform(pp) ;
                    return FALSE ;
            }

/* At this point the Frame is full and the length is Known */

/* make frame header */
            bp = MkL2Pkt( pp,
                    frame_len,
                    protocol,
                    ftype,
                    GetNewFid(np),
                    NodeLinkAddressPtr(np),
                    link_src_ptr,
                    NodeNet(np) ) ;

/* error making frame header? */
            if(bp == NULLUCHAR) { FreePlatform( pp ) ;    return FALSE ; )

/* Export theFrame structure into the data field */
            switch(protocol)
            {
            case(L2_PROTOCOL_NULL):

/* no data in a NULL frame */
                    break ;

case(L2_PROTOCOL_TEST):

/* we pad a TEST frame to full length */
                    MemSet( bp, 0x55, (MAX_PACKET_LEN - L1_HEADER_LEN - L2_HEADER_LEN ) ) ;
                    break ;
```

```c
    case(L2_PROTOCOL_SYNC):
        /* fill data field with SYNC */
        (VOID) ExportL2Sync( bp, &frame.sync, NodeNet(np) ) ;
        break ;

case(L2_PROTOCOL_TIMESTAMP):
    case(L2_PROTOCOL_TIMESTAMP_INQUIRY):
        /* fill data field with TIMESTAMP */
        (VOID) ExportL2Timestamp( bp, &frame.timestamp, NodeNet(np) ) ;
        break ;

case(L2_PROTOCOL_LINK_INFO):
    case(L2_PROTOCOL_LINK_INFO_INQUIRY):
#if (MAX_PACKET_LEN - L1_HEADER_LEN - L2_HEADER_LEN) < L2_LINK_INFO_LEN
#error          /* sorry, but link_info won't fit */
#endif
        /* stuff the LINK_INFO into the PLATFORM */
        frame_len = (ExportL2LinkInfo(bp,&frame.link_info) - bp ) ;

/* pad rest of LINK_INFO with 0x55 */
        MemSet( ( bp + frame_len ), 0x55,
            (MAX_PACKET_LEN - L1_HEADER_LEN - L2_HEADER_LEN -
            frame_len) ) ;

break ;
    }

/* the packet is ready to go */
    if( NodeNet(np) == MSUBNET_LAN )
    {
        SetOutputNode(pp,np) ;
        AddToTxQueue(pp) ;
    }
    else
    {
        L2_PROTOCOL       protocol ;
```

```
        /* save the protocol...
           a Failed WANLinkMaint packet deletes the platform */
        protocol = L2Protocol(pp) ;

/* if the WANLinkMaint didn't work, re-queue */
        if( WANLinkMaintenanceSend( np, pp ) != TRUE )
        {
            /* add to SLOW maint list if the Node is failing... */
            AddMaint( np, FALSE, protocol ) ;
        }

/* perform final accounting */
        switch(protocol)
        {
            case(L2_PROTOCOL_LINK_INFO_INQUIRY):

/* if LAN, should we move from INIT status? */
                if( (NodeNet(np) == MSUBNET_LAN)
                  && (NodeMaintStatus(np) == NODE_MAINT_STATUS_INIT) )
                {
                    /* move to TIMESTAMP maintenance status */
                    SetNodeMaintStatus( np, NODE_MAINT_STATUS_TIMESTAMP) ;
                }

/*FALLTHROUGH*/ case(L2_PROTOCOL_LINK_INFO):
            case(L2_PROTOCOL_TIMESTAMP_INQUIRY):
            case(L2_PROTOCOL_TIMESTAMP):

/* advance the maintenance timer */
                GetSynchExpiredMclockTimer(
                    NodeMaintAlarmPtr(np),
                    ((NodeNet(np) == MSUBNET_LAN) ? RamLANMaintInterval_M :
                        RamWANMaintInterval_M)
                    + MaintPeriodFuzz(NodeNet(np)) ) ;

break ;
        }

/* maintenance frame successfully scheduled */
        return TRUE ;
```

```c
/*
 *      Updates the volatiles fields in a maintenance packet
 */ ifdef   PROTOTYPE
VOID     UpdateMaint(
PLATFORM  *pp)
#else
VOID     UpdateMaint( pp )
PLATFORM *pp ;
#endif
{
    MTIME         clock ;
    MTIME_ERROR   clock_error ;
    MCLOCK_TIMER  timer ;

switch( L2Protocol(pp) )
    { case(L2_PROTOCOL_SYNC):

GetMclockTimer(&timer) ;

/* Radio ALWAYS diddles... make sure that AGE is current */
        DiddleExportedL2SyncAge( L2DataPtr(pp), timer ) ;

break ;

case(L2_PROTOCOL_TIMESTAMP):
    case(L2_PROTOCOL_TIMESTAMP_INQUIRY):

/* get current clock and clock error */
        GetMclockWithError(&clock,&clock_error) ;

/* fixup WAN error time iff required */
        if( (Subnet(pp) == MSUBNET_WAN) || RamTruthfulLANTime_M )
        {
            /* and add a gratuitous 1 second of error on top of that */
            AddOffsetMtimeError(&clock_error,&clock_error,CLOCK_GRANULARITY) ;
```

```
        }
    else
        {
        CopyMtimeError( &clock_error, ZeroMtimeError() ) ;
        }
        /* update the time and time error */
        DiddleExportedL2TimestampTime( L2DataPtr(pp),
            &clock, &clock_error) ;

break ;

case(L2_PROTOCOL_LINK_INFO):
    case(L2_PROTOCOL_LINK_INFO_INQUIRY):

/* get current clock and clock error */
        GetMclockWithError(&clock,&clock_error) ;

/* and add a gratuitous 1 second of error on top of that */
        AddOffsetMtimeError(&clock_error,&clock_error,CLOCK_GRANULARITY) ;

#ifdef VOLATILE_AGE
        /* get timer to compute current age */
        GetMclockTimer(&timer) ;

/* update the time, time error, and age */
        DiddleExportedL2LinkInfoTimeAge( L2DataPtr(pp),
            &clock, &clock_error,timer ) ;
#else
        /* update the time and time error */
        DiddleExportedL2LinkInfoTime( L2DataPtr(pp),
            &clock, &clock_error ) ;
endif break ;

}

/*  Local function to process received age.  This returns TRUE iff
    the caller might want to schedule a new link maintenance frame back
    to him.
```

```
*/
#ifdef    PROTOTYPE
LOCAL     BOOLEAN     ProcessRecvAge(
PLATFORM  *pp,
MULONG    age)
#else
LOCAL     BOOLEAN     ProcessRecvAge(pp,age)
PLATFORM  *pp ;
MULONG    age ;
#endif
{
    MCLOCK_TIMER  now, new_delta ;
    NODE          *np ;
    BOOLEAN       reborn ;

/* get current timer */
    GetMclockTimer(&now) ;

/* use platform arrival timer delta to correct age */
    age += DeltaMclockTimer( &now, PPTimerPtr(pp) ) ;

np = InputNode(pp) ;

/* if the node says it has recently re-booted... */
    new_delta = now - age ;                    /* determine the delta */ reborn = (labs(new_delta - NodeDeltaAge(np))) >= SECONDS_REQUIRED_TO_REBOOT ;
    if( reborn && !WaitingForAck(np) )
    {
        /* discovery of a new reborn NODE */
        ClearNodeToTries(np) ;
        ClearNodeAckTries(np) ;
        SetNodeMaintStatus(np,NODE_MAINT_STATUS_INIT) ;
    }

/* in any case, start again with this guy */
    SetNodeDeltaAge(np,new_delta) ;
    np->info.age = age ;

/* trace new info? */
    if(Gabby() == GABBY_MAINT)
    {
```

```
        UTEXT   buf[DEV_STR_LEN] ;

printf("%s received from ",
            protype_str( buf, L2Protocol(pp), L2FType(pp)) ) ;

printf("%s %s-- ",
            link_str(buf, LinkSrcPtr(pp), Subnet(pp)),
            (ISTRUE(reborn) ? "(node reset) " : "")) ;
    } return reborn ;
}

/*
    Local function to process received time.  This returns TRUE iff
    we might want to consider responding with time of our own
*/ ifdef     PROTOTYPE
LOCAL      BOOLEAN   ProcessRecvTime(
PLATFORM   *pp,
MTIME      *time,
MTIME      *time_error)
#else
LOCAL      BOOLEAN   ProcessRecvTime(pp,time,time_error)
PLATFORM   *pp ;
MTIME      *time ;
MTIME      *time_error ;
#endif
{
    /* correct received time? */
    if(ISFALSE(IsSpecialMtime(time)))
    {
        MCLOCK_TIMER   us ;

/* get current timer */
        GetMclockTimer(&us) ;

/* use platform arrival timer delta to correct time */
        AddOffsetMtime( time, time,
            DeltaMclockTimer(&us, PPTimerPtr(pp)) ) ;
```

```
    }
    /* can we receive timestamps? */
    if( (RamAcceptLANTime_M) || (Subnet(pp) == MSUBNET_WAN) )
    {
        if( Gabby() == GABBY_MAINT )
        {
            UTEXT    buf[DEV_STR_LEN] ;

printf( "%s received from ",
                    protype_str(buf,L2Protocol(pp),L2FType(pp)) ) ;

printf( "%s -- ", link_str(buf, LinkSrcPtr(pp), Subnet(pp)) ) ;
        }

/* try to set clock -- is their time not good? */
        if(ISFALSE(SetMclockWithError(time,time_error)))
        {
            if( Gabby() == GABBY_MAINT )
            {
                printf("clock not set\n") ;
            } return TRUE ;
        }

/* our clock was set! */
        else
        {
            if( Gabby() == GABBY_MAINT )
            {
                printf("%s %s\n",
                        PrintMtime(time), PrintMtimeError(time_error)
                      ) ;
            } return FALSE ;
        }
    }

/* can we not receive timestamps but should still respond? */
    else
```

```
        MTIME       clock ;
        MTIME_ERROR clock_error ;

/* get the local time */
        GetMclockWithError( &clock, &clock_error ) ;

/* is our time better? */
        if(ISFALSE(IsSpecialMtime(&clock)) &&
           ISTRUE(IsWorseMtimeError(time_error,&clock_error)))
        (
            return TRUE ;
        )
        else
        (
            return FALSE ;
        )
    )

/*
    Process a received maintenance frame.
*/ ifdef   PROTOTYPE
VOID     RecvMaint(
PLATFORM *pp)
#else
VOID     RecvMaint( pp )
PLATFORM *pp ;
#endif
(
    NODE *np ;

union
    (
        L2_SYNC      sync ;
        L2_TIMESTAMP timestamp ;
        L2_LINK_INFO link_info ;

) frame ;
```

```c
if( (np = InputNode(pp)) == NULLNP )
{
    sys_puts( "Received Maint from NULLNP!\n" ) ;
    return ;
} if(Gabby() == GABBY_MAINT)
    printf( "RecvMaint protocol:%u\n", L2Protocol(pp) ) ;

switch(L2Protocol(pp))
{
                    /* NULL frames convey no information */
    case(L2_PROTOCOL_NULL):
        break ;

/* just count the TEST packets */
    case(L2_PROTOCOL_TEST):
        IncrementRxTestPackets_M() ;
        IncrementNodeTestPackets_M(np) ;
        break ;

case(L2_PROTOCOL_SYNC):
#if !CONSTLengthL2Sync()
#error
#endif
                    /* SYNC all here? */
        if(L2DataLen(pp) >= L2_SYNC_LEN)
        {
                    /* import SYNC */
            (VOID) ImportL2Sync( &frame.sync, L2DataPtr(pp) ) ;

/* process SYNC */
            if( ProcessRecvAge(pp, frame.sync.age) == TRUE )
            {
                /* if node is reborn, maintain him as fast as possible... */
                AddMaint( np, TRUE, L2_PROTOCOL_LINK_INFO_INQUIRY ) ;
                GetSynchExpiredMclockTimer(
                    NodeMaintAlarmPtr(np),
                    MaintPeriodFuzz(NodeNet(np)) )
```

```
            ) ;
        break ;

case(L2_PROTOCOL_TIMESTAMP):
    case(L2_PROTOCOL_TIMESTAMP_INQUIRY):
#if !CONSTLengthL2Timestamp()
#error          /* sorry, but we can't do this otherwise */
#endif
        /* TIMESTAMP all here? */
        if( L2DataLen(pp) >= L2_TIMESTAMP_LEN)
        (
            /* import timestamp */
            (VOID) ImportL2Timestamp(
                &frame.timestamp,
                L2DataPtr(pp),
                NodeNet(np) ) ;

/* process received time -- should we send time back? */
            if(ISTRUE(ProcessRecvTime(
                pp,
                &frame.timestamp.time,
                &frame.timestamp.time_error)) &&
                (L2Protocol(pp) ==
                    L2_PROTOCOL_TIMESTAMP_INQUIRY))
            (
                /* try to send time back */
                AddMaint( np, TRUE, L2_PROTOCOL_TIMESTAMP ) ;
            )
        )
        break ;

case(L2_PROTOCOL_LINK_INFO):
    case(L2_PROTOCOL_LINK_INFO_INQUIRY):
#if !CONSTLengthL2LinkInfo()
#error          /* sorry, but we can't do this otherwise */
#endif
```

```c
            /* LINK_INFO all here? */
            if( L2DataLen(pp) >= L2_LINK_INFO_LEN)
            {
                /* import LINK_INFO */
                (VOID) ImportL2LinkInfo( &frame.link_info, L2DataPtr(pp) ) ;

/* remember that node can handle LINK_INFO's */
                SetNodeMaintStatus( np, NODE_MAINT_STATUS_LINK_INFO ) ;

/* remember select LINK_INFO fields */
                np->info.status = frame.link_info.status ;
                CopyDevAddr(
                    &(np->info.dev_addr),
                    &frame.link_info.dev_addr) ;

/* process received age */
                (VOID) ProcessRecvAge( pp, frame.link_info.age ) ;

/* process received time */
                (VOID) ProcessRecvTime(
                    pp,
                    &frame.link_info.time,
                    &frame.link_info.time_error) ;

/* schedule a LINK_INFO response? */
                if(L2Protocol(pp) == L2_PROTOCOL_LINK_INFO_INQUIRY)
                {
                    /* try to send LINK_INFO back */
                    AddMaint(np,TRUE, L2_PROTOCOL_LINK_INFO ) ;
                }
            }
            break ;

}
        /* and free the platform */
        FreePlatform(pp) ;
    }

/* end of 'netman' maintenance code */
```

```
                                            l2maint.c - Metricom Proprietary - 891212 - page:29 define     MAX_LOOP_TIME       (15)          /* Guessed time of max latency */

LOCAL VOID    fill_maint_list( MSUBNET net )
(
    NODE           *np ;
    QUE            *head ;
    MCLOCK_TIMER   now ;

if( net == MSUBNET_LAN )
    (
        head = LAN_ActiveNodes_Q ;
        LockLAN() ;
    )
    else
    (
        head = WAN_ActiveNodes_Q ;
        LockWAN() ;
    )

/* initialize 'np' for the search */
    np = (NODE *)head ;
    while( (np = (NODE *)sys_next_queue((QUE *)np, head)) != NULLNP )
    (
        /* what timer is it now */
        GetMclockTimer(&now) ;

/* if we have not heard from the Node for a Great While */
        if( (NodeNet(np) == MSUBNET_WAN)
            && ((now + MAX_LOOP_TIME) - NodeLastHeardTimer_M(np) >
RamWANFailoutInterval_M )
        (
            FailNode(np) ;
            continue ;
        )

else if( NodeDoomed(np) ) ( continue ; )

/* Service the scanner alarm. */
        if( IsExpiredMclockTimer(&now, NodeScannerAlarmPtr_M(np)) )
        (
```

```
            SetNodeLastDataSent_M(np, NodeCurrentDataSent_M(np)) ;
            ResetNodeCurrentDataSent_M(np) ;

SetNodeLastDataRetries_M(np, NodeCurrentDataRetries_M(np)) ;
            ResetNodeCurrentDataRetries_M(np) ;

GetExpiredMclockTimer( NodeScannerAlarmPtr_M(np),
  RamWANScannerInterval_M ) ;
        } l2maint.c - Metricom Proprietary - 891212 - page:30

/* if we are Maintaining OR Maintaining this Node
           AND if node is not napping */
        if( (RamMaintainLANLinks_M || NodeMaintain_M(np))
         && IsExpiredMclockTimer( &now, NodeDataRetryTimerPtr(np)) )
        (
            /* if Not waiting for ACK and one of the Timers has Expired... */
            if( !WaitingForAck(np)
             && (IsExpiredMclockTimer(&now, NodeMaintAlarmPtr(np))
              || IsExpiredMclockTimer(&now, NodeContactAlarmPtr(np)))
              )
            (
                AddMaint( np, FALSE, L2_PROTOCOL_LINK_INFO_INQUIRY ) ;
            )
        )

/* pause for Watchdog */
        sys_pend(0,MINIMUM_PEND_TIME) ;

if( net == MSUBNET_LAN ) ( UnlockLAN() ; )
        else                     ( UnlockWAN() ; )
    )
)

/* returns BOOL TRUE/FALSE if the MSUBNETs maintenance timer has expired */
BOOL TimeToMaintain( MSUBNET net )
(
    MCLOCK_TIMER    now ;

GetMclockTimer( &now ) ;
    if( net == MSUBNET_LAN )
``` l2maint.c - Metricom Proprietary - 891212 - page:31

```
        return( IsExpiredMclockTimer(&now, &LAN_maintenance_timer) ) ;
   }
   else
   {
        return( IsExpiredMclockTimer(&now, &WAN_maintenance_timer) ) ;
   }
}

UCOUNT   TicksTillNextMaintenance( MSUBNET net )
{
   MCLOCK_TIMER    now ;

GetMclockTimer(&now) ;
   if( net == MSUBNET_LAN )
   {
        return( TicksToAlarm(&now, &LAN_maintenance_timer) ) ;
   }
   else
   {
        return( TicksToAlarm(&now, &WAN_maintenance_timer) ) ;
   }
}

UCOUNT  PerformMaintenance( MSUBNET net )
{
   NODE            *np ;
   MCLOCK_TIMER    now ;
   BOOL            sent_something ;

GetMclockTimer( &now ) ;

if( net == MSUBNET_LAN )
   {
        /* reset the LAN MaintAlarm */
        GetExpiredMclockTimer(&LAN_maintenance_timer,
                   RamLANMaintGateInterval_M + MaintPeriodFuzz(net) ) ;
```

```c
        /* fill the maint list */
        fill_maint_list(MSUBNET_LAN) ;

/* if we have found one... send the Maint Packet */
        if( (np = GetMaint(MSUBNET_LAN)) != NULLNP )
        {
            SendMaint( np, GetPrimeSourceLinkAddr(MSUBNET_LAN),
                L2_PROTOCOL_LINK_INFO_INQUIRY, L2_FTYPE_DATA_ACK ) ;
        }
        else
        {
            if( RamSolicitLANLinks_M )      ( SendLANBroadcastSync() ;   )
        }

/* always return TRUE iff LAN.. */
        sent_something = TRUE ;
    }

/* if the WAN Maint Timer has expired */
    if( IsExpiredMclockTimer(&now, &WAN_maintenance_timer) )
    {
        /* reset the WAN MaintAlarm... accelerate Acquisition Phase */
        if( now <= (NUM_SLOTS * ACQUISITION_ACCELERATION) )
        {
            GetExpiredMclockTimer( &WAN_maintenance_timer,
                (ACQUISITION_MAINT_GATE + MaintPeriodFuzz(net)) ) ;
        }
        else
        {
            GetExpiredMclockTimer(&WAN_maintenance_timer,
                RamWANMaintGateInterval_M + MaintPeriodFuzz(net)) ;
        }
    }

/* update the IdlePeriod machinery */
    UpdateIdle(0,0) ;

/* perform our Synch Packet sending */
    MaybeSendSync(now) ;
``` l2maint.c - Metricom Proprietary - 891212 - page:32

```
                              l2maint.c - Metricom Proprietary - 891212 - page:33

/* fill the maint list */
        fill_maint_list(MSUBNET_WAN) ;

/* if we have found one.... send the Maint Packet */
        if( (np = GetMaint(MSUBNET_WAN)) != NULLNP )
        {
            SendMaint( np, GetPrimeSourceLinkAddr(MSUBNET_WAN),
                L2_PROTOCOL_LINK_INFO_INQUIRY, L2_FTYPE_DATA_ACK ) ;

sent_something = TRUE ;
        }
        else
        {
            sent_something = FALSE ;
        } return sent_something ;
}

LOCAL PLATFORM *make_sync( MSUBNET net, LINK_ADDR *link_dest, BOOL ack_noack )
{
    PLATFORM *pp ;

if( (pp = (PLATFORM *)sys_get_queue(FreePlatform_Q)) != NULLPP )
    {
        if( MkL2Pkt( pp, sizeof(L2_SYNC), L2_PROTOCOL_SYNC,
            ack_noack ? L2_FTYPE_DATA_ACK : L2_FTYPE_DATA_NOACK,
                (L2_FID)0, link_dest, GetPrimeSourceLinkAddr(net), net)
                    == NULLUCHAR )
        {
            FreePlatform(pp);
            pp = NULLPP ;
        }
```

```
    else
    {
        SetOutputNode(pp,NULLNP);
    } return pp ;
}

PLATFORM *MakeAcquisitionSync( MSUBNET net )
{
    BOOL        ack_noack ;
    LINK_ADDR   link_dest ;
    PLATFORM    *pp ;
    L2_SYNC     syncinfo ;

/* build the link destination field for the SYNC */
    if( net == MSUBNET_WAN )
    {
        DISTANCE    dist = DISTANCE_INFINITY ;
        OCTANT_MASK     om   = OCTANT_MASK_ALL ;
        WAN_ADDR    wan ;

BuildBroadcastWanAddr( &wan, dist, om, WAN_ADDR_COLOR_MIN, DEFAULT_WANNET )

WanToLink( &link_dest, &wan ) ;
        ack_noack = FALSE ;
    }
    else
    {
        LAN_ADDR    lan ;

CopyLanAddr( &lan, BroadcastLanAddr() ) ;
        LanToLink( &link_dest, &lan ) ;
        ack_noack = TRUE ;
    }

GetMclockTimer( &syncinfo.age ) ;
```

```c
    if( (pp = make_sync( net, &link_dest, ack_noack )) != NULLPP )
    (
        ExportMulong( L2DataPtr(pp), syncinfo.age ) ;
    )

l2maint.c - Metricom Proprietary - 891212 - page:35 return pp ;
} define SLOT_TICK_INCREMENT (TICKS_PER_SLOT / 2)
LOCAL UCOUNT SyncTick(VOID)
{
    LOCAL   UCOUNT    last_tick = 0 ;

if( (last_tick += SLOT_TICK_INCREMENT) >= (NUM_SLOTS * TICKS_PER_SLOT) )
    (
        last_tick = 0 ;
    )
    return last_tick ;
}

LOCAL VOID   SendAcquisitionSyncs( UCOUNT num_syncs, UTINY power_level, PLATFORM
*pp )
{
    sys_suspend( WAN_RX_TASK ) ;
    sys_wan_gain( power_level, power_level ) ;    /* adjust power for these syncs */
    while( num_syncs-- )
    (
        SetTraveling( SyncTick() ) ;
        UpdateMaint(pp) ;
        if(Gabby() == GABBY_WAN) sys_puts("S") ;

/* don't get our Transmit aborted by the Ticker */
        while( (TICKS_PER_SLOT - Current.tick) < (SYNC_DURATION +
REFRACTORY_PERIOD) ) ;
        WAN_Output(pp,0) ;
    )
}
```

```c
        SetTraveling(0) ;
        sys_wan_gain( PowerLevel, PowerLevel ) ;     /* return to previous power */
        sys_resume(WAN_RX_TASK ) ;
}

LOCAL UCOUNT    next_syncs = 0 ;
VOID SetNextSyncs( UCOUNT num )         ( next_syncs = num ; )

VOID MaybeSendSync( MCLOCK_TIMER now )
{
        UCOUNT          num_syncs ;
        PLATFORM        *pp ;
        UTINY           power_level = 0xff ;

if( now == 0 ) /* first time */
        {
                num_syncs = (NUM_CHANNELS * 2) ;    /* cover every slot */
                power_level = 0 ;
        }
        else if( now < (NUM_CHANNELS * ACQUISITION_ACCELERATION) )
        {
                num_syncs       = 20 ;
                power_level     = 0x15 ;            /* -10 dB according to Mike W. */
        }
        else
        {
                /* scale along with the number of neighbors extant */
                if( (next_syncs == 0) && (rand() % WAN_ActiveNodes_Q->audit) != 0 ) (
                        return ; )

/* else, get the number of syncs we are syupposed to send
                        and the power level that we are supposed to send it out at */
                num_syncs = next_syncs + 1 ;
                next_syncs = 0 ;
                power_level = PowerLevel ;
        }

/* this is a SYNC packet */
        if( (pp = MakeAcquisitionSync( MSUBNET_WAN )) != NULLPP )
        {
```

```
        sendAcquisitionSyncs( num_syncs, power_level, pp ) ;
        FreePlatform(pp) ;
    }

VOID SendLANBroadcastTimestamp(VOID)
{
    MTIME           now ;
    MTIME_ERROR     err ;

GetMclockWithError( &now, &err ) ;
    if( !IsSpecialMtime(&now) )
    {
        PLATFORM    *pp ;

if( (pp = (PLATFORM *)sys_get_queue(FreePlatform_Q)) != NULLPP )
        {
            LINK_ADDR link ;

LanToLink( &link, BroadcastLanAddr() ) ;

MkL2Pkt(pp, LengthMtime(&now) + LengthMtimeError(&our_err),
                L2_PROTOCOL_TIMESTAMP, L2_FTYPE_DATA_ACK, 1 /* FID */,
                    &link, GetPrimeSourceLinkAddr(MSUBNET_LAN),
                        MSUBNET_LAN ) ;

/* send this packet on its way */
            SetOutputNode(pp,NULLNP) ;
            LAN_Output(pp) ;
        }
    }
}

/* used for 'probing' the LAN for any devices */
VOID SendLANBroadcastSync(VOID)
{
    PLATFORM    *pp ;

if( (pp = MakeAcquisitionSync( MSUBNET_LAN )) != NULLPP )
    {
```

```
        SetOutputNode(pp,NULLNP) ;

LAN_Output(pp) ;

/*  if(Gabby() == GABBY_LAN) sys_puts("Sending LANBroadcastSync\n") ; */

)

/* end of file */
*
```

Appendix D
Listing L2NODE C

*Copyright (unpublished work) Metricom, Inc.
All rights reserved.

```c
#include <dos.h>
include <stdio.h> include "std.h"
include "kernel.h"
#include "net.h"

#include "mtime.h"
#include "mclock.h"
#include "addr.h"

#include "l0.h"
#include "l1.h"
#include "l2.h"
#include "l2lanwan.h"
#include "node.h"
#include "l3.h"
#include "l3lanwan.h"
#include "scan.h"
#include "platform.h"
#include "config.h"

/*   include if printing DEV_ADDRs and other such..
#include "netutil.h"
*/

/***********************************************************************
 *
 *   l2node.c
 *
 *   VOID FreeAllDataToGo( NODE *np, QUE *data_to_go_Q )
 *
 *   Free all PLATFORMs that have been queued for transmission 'to_go'
 *   on this link.
 *
```

```
 *      NODE *FindNodeGivenLinkPtr( LINK_ADDR *lp, MSUBNET net )
 *
 *              l2node.c - Metricom Proprietary - 891212 - page:1
 *
 *      Searches the ACTIVE_LINK_QUEUE for the MSUBNET 'net' for a match
 *      on the LINK_ADDR 'lp'. If found, it returns a pointer to the NODE.
 *
 *
 *      NODE *MakeNodeGivenLinkPtr( LINK_ADDR *lp, MSUBNET net )
 *
 *      If a NODE is available, gets a NODE * from the FREE_NODE_QUEUE,
 *      else NULLNP.
 *
 *      UCOUNT   ticks_to_alarm( MCLOCK_TIMER *timer, MCLOCK_TIMER *expire)
 *
 *      Returns the number of 'ticks' till the alarm 'expire' is due.
 *
 **********************************************************************/ define    OUTGOING          (TRUE)
define    INCOMING          (!OUTGOING)

LOCAL VOID  free_node( NODE *np )
{
    if( np != NULLNP )
    {
        sys_add_queue( (QUE *)np, FreeNodes_Q, FIFO ) ;
        sys_post( FREE_NODE_EVENT ) ;
    }
}

LOCAL VOID   free_all_data( NODE *np, QUE *data_Q, BOOL direction )
{
    PLATFORM *pp, *last_good_pp ;

if( np == NULLNP ) return ;

last_good_pp = pp = (PLATFORM *)data_Q ;
    while( (pp = (PLATFORM *)sys_next_queue((QUE *)pp,data_Q)) != NULLPP )
    { l2node.c - Metricom Proprietary - 891212 - page:2
```

```
    if( (direction == INCOMING) && (np == InputNode(pp)) )
    {
        sys_delete_queue( (QUE *)pp, data_Q ) ;
        FreePlatform(pp);

/* have to start at the last one that wasn't deleted ... */
        pp = last_good_pp ;
    }
    else if( (direction == OUTGOING) && (np == OutputNode(pp)) )
    {
        sys_delete_queue( (QUE *)pp, data_Q ) ;
        FreePlatform(pp);

/* have to start at the last one that wasn't deleted ... */
        pp = last_good_pp ;
    }
    else
    {
        last_good_pp = pp ;
    }
}

VOID FailNode( NODE *dead_np )
{
    if( (dead_np != NULLNP) && (!NodeDoomed(dead_np)) )
    {
        SetNodeDoomed(dead_np) ;

if( NodeNet(dead_np) == MSUBNET_LAN )
        {
            IncrementLANFailNodes_M() ;
            LAN_FailedNode = TRUE ;
            sys_post( LAN_MGR_EVENT ) ;
        }
        else
        {
            IncrementWANFailNodes_M() ;
``` l2node.c - Metricom Proprietary - 891212 - page:3

```
          WAN_FailedNode = TRUE ;
          sys_post( WAN_MGR_EVENT ) ;
     }

}

LOCAL VOID    free_or_reroute_packets( NODE *dead_np )
{
     /* remove 'dead_np' from XAN ActiveNodes_Q */
     if( NodeNet(dead_np) == MSUBNET_LAN )
     {
          /* free PLATFORM that we have been transmitting... */
          if( WaitingForAck(dead_np)
              && !on_output_queue( NodeTxPacket(dead_np)) )
          {
               FreePlatform( NodeTxPacket(dead_np) ) ;
          }
          /* free PLATFORM we have received */
          if( WaitingForAckAck(dead_np) )
          {
               FreePlatform( NodeRcvdPacket(dead_np) ) ;
          } free_all_data( dead_np, LAN_DataToGo_Q, OUTGOING ) ;
          free_all_data( dead_np, LAN_Tx_Q, OUTGOING ) ;
          free_all_data( dead_np, LAN_Output_Q, OUTGOING ) ;
     }
     else
     {
          /* get rid of all packets possibly received from DOOMED np */
          free_all_data( dead_np, WAN_DeferredRx_Q, INCOMING );
          free_all_data( dead_np, WAN_Rx_Q, INCOMING );
          free_all_data( dead_np, WAN_Mgr_Rx_Q, INCOMING );
     }
}
```

```c
/* 'DeleteDoomedNodes(net)' called when the ActiveNodeList for the
   MSUBNET 'net' is locked out from all other tasks and routines
   - through the use of the 'sys_pend( NODELIST_FREE_EVENT )' semaphore */

VOID    DeleteDoomedNodes( MSUBNET net )
{
        QUE     *anchor ;
        NODE    *np, *last_good_np ;

if( net == MSUBNET_LAN ) ( anchor = LAN_ActiveNodes_Q ; )
        else                     ( anchor = WAN_ActiveNodes_Q ; )

np = last_good_np = (NODE *)anchor ;
        while( (np = (NODE *)sys_next_queue((QUE *)np, anchor)) != NULLNP )
        {
                if( NodeDoomed(np) )
                {
                        /* if it is on a Maint List */
                        DelEvenIfNotOnMaintList(np) ;

/* scatter its packets */
                        free_or_reroute_packets( np ) ;

/* torch it */
                        sys_delete_queue( (QUE *)np, anchor ) ;

/* and return it to the free list */
                        free_node(np) ;

/* remember where we were */
                        np = last_good_np ;
                }
                else
                {
                        last_good_np = np ;
                }
        }
}
```

```
/* pause for watchdog */
sys_pend(0,MINIMUM_PEND_TIME) ;
}

NODE *FindNodeGivenLinkPtr( LINK_ADDR *lp, MSUBNET net )
{
    FAST NODE *np ;
    QUE       *head ;

if( net == MSUBNET_LAN )
    {
        head = LAN_ActiveNodes_Q ;
        LockLAN() ;
    }
    else
    {
        head = WAN_ActiveNodes_Q ;
        LockWAN() ;
    }

/* initialize 'np' for the search */
    np = (NODE *)head ;
    while( (np = (NODE *)sys_next_queue((QUE *)np, head)) != NULLNP )
    {
        if( CmpEqualLinkAddr(lp, NodeLinkAddressPtr(np), NodeNet(np)) )
        {
            break ;
        }
    } if( net == MSUBNET_LAN ) ( UnlockLAN() ; )
    else                     ( UnlockWAN() ; )

return np ;
}

NODE *FindNewbornNodeGivenLinkPtr( LINK_ADDR *lp, MSUBNET net )
``` l2node.c - Metricom Proprietary - 891212 - page:6

```c
    FAST NODE *np ; *head ;
    QUE if( net == MSUBNET_LAN )   ( head = LAN_NewbornNodes_Q ; )
    else                       ( head = WAN_NewbornNodes_Q ; )

/* initialize 'np' for the search */
    np = (NODE *)head ;
    while( (np = (NODE *)sys_next_queue((QUE *)np, head)) != NULLNP )
    (
        if( CmpEqualLinkAddr(lp, NodeLinkAddressPtr(np), NodeNet(np)) )
        (
            break ;
        )
    )

return np ;
}

/* ************** DX Node ******************* */

LOCAL WAN_ADDR dx_wan ;
LOCAL DISTANCE dx_distance = DISTANCE_ZERO ;

WAN_ADDR *DxNode( VOID )       ( return &dx_wan ; )

LOCAL VOID update_dx_node( WAN_ADDR *wan, DISTANCE dist )
(
    if( IsStationWanAddr(wan) && dist >= dx_distance )
    (
        CopyWanAddr( &dx_wan, wan ) ;
        dx_distance = dist ;
    )
)
/* ************** end DX Node ******************* */
```

```
NODE *MakeNodeGivenLinkPtr( LINK_ADDR *lp, MSUBNET net )
{
    FAST NODE *np ;

/* do not create again */
    if( (np = FindNewbornNodeGivenLinkPtr(lp, net)) != NULLNP ) { return np ; }

/* check this link address for validity */
    if( !ValidateSourceLinkAddr(lp,net) )
    {
        sys_puts( "Invalid Link Source Addr!\n" ) ;
        return NULLNP ;
    }
    if( Gabby() == GABBY_LAN || Gabby() == GABBY_WAN )

if( net == MSUBNET_LAN )
    {
        if( (LAN_ActiveNodes_Q->audit < RamMaxLANNodes_M) )
        {
            LAN_ADDR lan ;

LinkToLan( &lan, lp ) ;
            if( IsBroadcastLanAddr(&lan) ) { return NULLNP ; }
        }
        else /* we are out of LAN nodes */
        {
            return NULLNP ;
        }
    }
    else
    {
        WAN_ADDR wan ;

LinkToWan( &wan, lp ) ;
```

```c
        /* if it is not a legit WAN address */
        if( IsBroadcastWanAddr(&wan) || IsLocalWanAddr(&wan) )
        {
                return NULLNP ;
        }
} if( (np = (NODE *)sys_get_queue(FreeNodes_Q)) != NULLNP )
{
        setNodeNet(np,net) ;
        ResetNodeTwoWay(np) ;
        CopyLinkAddr( NodeLinkAddressPtr(np), lp, net ) ;

/* initialize as required - WANs we DO, LAN, not necessarily... */
        SetNodeMaintain_M(np, (net == MSUBNET_WAN) ) ;

/* start at the beginning */
        StopWaitingForAck(np) ;
        StopWaitingForAckAck(np) ;

SetNodeLastDataGood_M(np,FALSE) ;
        SetNodeLastAckGood_M(np,FALSE) ;

np->fid                         = 0 ;
        np->data_rcvd                   = 0 ;
        np->sent_seq_num                = 0 ;
        np->delta_tick                  = 0 ;
        np->naps                        = 0 ;

np->to_tries                    = 0 ;
        np->ack_tries                   = 0 ;

np->current_data_sent           = 0 ;
        np->current_data_retries = 0 ;
        SetNodeLastDataSent_M(np,0) ;
        SetNodeLastDataRetries_M(np,0) ;
        SetNodeTestPackets_M(np,0) ;
        SetNodeTickleTries_M(np,0) ;
        SetNodeTickleSuccesses_M(np,0) ;
```

```c
    /* initialize the received Info data */
    np->info.seq_num        = 0 ;

/* initialize some timers */
    SetNodeDeltaAge(np, MCLOCK_TIMER_INFINITY) ;

/* start the timers *NOW* -- if WAN OR maintaining LAN links */
    if( net == MSUBNET_WAN || RamMaintainLANLinks_M )
    (
        GetExpiredMclockTimer( NodeMaintAlarmPtr(np), WAIT_BEFORE_LINKING ) ;
        GetExpiredMclockTimer( NodeScannerAlarmPtr_M(np),
RamWANScannerInterval_M ) ;
    }
    else
    (
        GetExpiredMclockTimer( NodeMaintAlarmPtr(np), MCLOCK_TIMER_INFINITY )
    )

GetMclockTimer( NodeLastExchangeTimerPtr(np) ) ;
    GetMclockTimer( NodeLastHeardTimerPtr_M(np) ) ;

/* initialize Received Signal Strength Indicator, discriminator */
    np->rssi_smoothed           = 0 ;
    np->rssi_min                = 255 ;
    np->rssi_max                = 0 ;
    np->rssi_last               = 0 ;
    np->discriminator           = 0 ;
    np->last_reported_rssi      = 0 ;
    np->max_reported_rssi       = 0 ;
    np->min_reported_rssi       = 0 ;
    np->smoothed_reported_rssi  = 0 ;

/* and start out OFF of any link maintenance list */
    SetNodeOnFastList(np,FALSE) ;
    SetNodeOnSlowList(np,FALSE) ;
    SetNodeMaintStatus(np,NODE_MAINT_STATUS_INIT) ;
    SetNodeNextToMaintain_M(np,NULLNP) ;
```

```
#ifdef DEBUG
printf( "MakeNodeGivenLinkPtr: " ) ;
if( net == MSUBNET_WAN )
{
        UTEXT       wbuf[WAN_STR_LEN] ;
        WAN_ADDR    wan ;

LinkToWan( &wan, lp ) ;
        printf( "adding wan dest address %s\n", wan_str(wbuf, &wan) ) ;
}
else
{
        UTEXT       lbuf[LAN_STR_LEN] ;
        LAN_ADDR    lan ;

LinkToLan( &lan, lp ) ;
        printf( "adding lan dest address %s\n", lan_str(lbuf, &lan) ) ;
}
endif /*DEBUG */ if( net == MSUBNET_LAN )
        {
                /* store distance to node, bearing, and octant */
                sys_add_queue( (QUE *)np, LAN_NewbornNodes_Q, FIFO ) ;
                sys_post( LAN_MGR_EVENT ) ;
        }
        else
        {
                LAN_ADDR    lan ;
                WAN_ADDR    new_wan ;

/* get WAN_ADDR from 'NodeLinkAddressPtr' */
                LinkToWan( &new_wan, NodeLinkAddressPtr(np) ) ;

/* get distance and bearing from Us to Hop */
                DeltaStationWanAddr( NodeBearingPtr(np), NodeDistancePtr(np),
                        &new_wan, &OurGlobalWanAddr ) ;
``` l2node.c - Metricom Proprietary - 891212 - page:11

```
        /* remember if this is the New DX Node */
        update_dx_node( &new_wan, NodeDistance(np) ) ;

sys_add_queue( (QUE *)np, WAN_NewbornNodes_Q, FIFO ) ;
        sys_post( WAN_MGR_EVENT ) ;
    } return np ;
}

/*  Get NODE's next FID */ ifdef    L2_FID
PROTOTYPE    GetNewFid( NODE *np )
#else
L2_FID       GetNewFid( np )
NODE         *np ;
#endif
{
    if( ISTRUE( IsBroadcastLinkAddr( NodeLinkAddressPtr( np ),
        MSUBNET_LAN ) ) )
    {
        return L2_FID_MAX ;
    }
    else
    {
        FAST L2_FID    fid ;

if((fid = (np->fid)++) == (L2_FID_MAX - (L2_FID)1))
        {
            np->fid = L2_FID_MIN ;
        } return fid ;
    }
}
```

```
/*
    We use a "smoothed round trip time" estimation routine to attempt
    to adapt the retransmission timers to the 'real world' conditions.

This algorithm is used by the TCP community. We use the same
    acronyms and constants.

This is a general purpose routine for the smoothing of any variable
    over several "readings". Note that it has a "fast attack/slow decay"
    characteristic.
*/ define     ALPHA1      7       /* "fast attack" */
define     ALPHA2      15      /* "slow decay" */

UCOUNT   smooth( ARG current, ARG new )
{
    if( new > current )
    {
        /* new value is increasing, use fast attack */
        return( (ALPHA1 * current + new) / (ALPHA1 + 1) ) ;
    }
    else
    {
        /* new value decreasing, use slow decay */
        return( (ALPHA2 * current + new) / (ALPHA2 + 1) ) ;
    }
}

/*    'UpdateNode(...)' updates all information
      in node table entry that DOES change from packet to packet
*/
VOID UpdateNode( NODE *np, ARG delta_tick, BYTES rssi, BYTES discriminator, UTINY rx_signal )
{
    /* update the contact alarm */
    GetSynchExpiredMclockTimer( NodeContactAlarmPtr(np),
```

```
        (RamLANContactInterval_M + ContactPeriodFuzz(MSUBNET_LAN) ) ) ;

/* remember the last time we heard this node */
    GetMclockTimer( NodeLastHeardTimerPtr_M(np) ) ;

/* Process signal strength we received this Packet at... */
    SetNodeRssiLast_M(np, rssi) ;
    SetNodeRssiMin_M(np, min( NodeRssiMin_M(np), rssi) ) ;
    SetNodeRssiMax_M(np, max( NodeRssiMax_M(np), rssi) ) ;

/* ...come up with a valid value fast. */
    if( NodeRssiSmoothed_M(np) < NodeRssiMin_M(np) )
    (
        SetNodeRssiSmoothed_M(np,rssi) ;
    )
    else
    (
        SetNodeRssiSmoothed_M(np, (BYTES)smooth( (ARG)NodeRssiSmoothed_M(np),
(ARG)rssi) ) ;
    )

/* Process the Reported RSSI (our strength (SN) at the other end).... */
    SetNodeLastReportedRssi_M(np, rx_signal) ;
    SetNodeMinReportedRssi_M(np, min( NodeMinReportedRssi_M(np), rx_signal) ) ;
    SetNodeMaxReportedRssi_M(np, max( NodeMaxReportedRssi_M(np), rx_signal) ) ;

/* ...come up with a valid value fast. */
    if( NodeSmoothedReportedRssi_M(np) < NodeMinReportedRssi_M(np) )
    (
        SetNodeSmoothedReportedRssi_M(np,rx_signal) ;
    )
    else
    (
        SetNodeSmoothedReportedRssi_M(np, (BYTES)smooth(
(ARG)NodeSmoothedReportedRssi_M(np), (ARG)rx_signal) ) ;
    )

/* Just come up with a valid value fast for the discriminator. */
    if( NodeDiscriminator_M(np) == 0 )
``` l2node.c - Metricom Proprietary - 891212 - page:14

```c
        (
            SetNodeDiscriminator_M( np, discriminator ) ;
        }
        else
        (
            SetNodeDiscriminator_M( np, (BYTES)smooth( (ARG)NodeDiscriminator_M(np),
                    (ARG)discriminator) ) ;
        }

/* and, oh, don't forget to set the DeltaTick! */
        SetNodeDeltaTick_M(np, delta_tick ) ;
    }

VOID AddAllOctantInfo( UTINY octants[] )
(
    FAST ARG   i ;
    FAST NODE  *np ;
    ARG        arg_array[OCTANT_COUNT] ;

/* Start with nothing, nowhere. */
    for( i = 0; i < OCTANT_COUNT; i++ )  ( arg_array[i] = 0 ; )

/* initialize 'np' for the search */
    LockWAN() ;
    np = (NODE *)WAN_ActiveNodes_Q ;
    while( (np = (NODE *)sys_next_queue((QUE *)np, WAN_ActiveNodes_Q)) != NULLNP )
    (
        if( NodeOctant(np) < OCTANT_COUNT )      ( arg_array[NodeOctant(np)]++ ; )
    }
    UnlockWAN() ;

/* Fill passed UTINY array */
    for( i = 0; i < OCTANT_COUNT; i++ )
    (
        octants[i] = (arg_array[i] > UCHAR_MAX) ? UCHAR_MAX : arg_array[i] ;
    }
}
```

```
UCOUNT    MostCrowdedOctant( VOID )
{
    FAST ARG  i, max_count, mostest ;
    UTINY         octants[OCTANT_COUNT] ;

/* start with nothing */
    for( i = 0; i < OCTANT_COUNT; i++ ) ( ( octants[i] = 0 ; )

/* add em up */
    AddAllOctantInfo(octants) ;

for( i = mostest = max_count = 0; i < OCTANT_COUNT; i++ )
    {
        if( octants[i] >= max_count )
        {
            mostest = i ;
            max_count = octants[i] ;
        }
    } return mostest ;
}

BOOL CloserThan( LINK_ADDR *link_ptr, WAN_ADDR *dest_wan, DISTANCE distance )
{
    ANGLE        bearing ;
    DISTANCE     their_distance ;
    LAN_ADDR     lan ;
    WAN_ADDR     wan ;

LinkToWan( &wan, link_ptr ) ;
    DeltaStationWanAddr( &bearing, &their_distance, dest_wan, &wan ) ;

return( CmpLessThanDistance(their_distance, distance) ) ;
}
```

```
UCOUNT    LinksPerSubnet( MSUBNET net )
(
    if( net == MSUBNET_LAN ) ( return LAN_ActiveNodes_Q->audit ; )
    else                     ( return WAN_ActiveNodes_Q->audit ; )
)

UCOUNT    SequenceNumber( NODE *input_np )
(
    FAST ARG  sequence_num ;

if( NodeTwoWay(input_np) )
    (
        sequence_num = NodeSeqNum_M(input_np) ;
    )
    else
    (
        NODE *np ;
        QUE  *anchor ;

if( NodeNet(input_np) == MSUBNET_LAN )
        (
            anchor = LAN_ActiveNodes_Q ;
            np     = (NODE *)anchor ;
            LockLAN() ;
        )
        else
        (
            anchor = WAN_ActiveNodes_Q ;
            np     = (NODE *)anchor ;
            LockWAN() ;
        )

sequence_num = 1 ;
        while( (np = (NODE *)sys_next_queue( (QUE *)np, anchor )) != NULLNP )
        (
            if( NodeTwoWay(np) )   ( sequence_num++ ; )
        )
``` l2node.c - Metricom Proprietary - 891212 - page:17

```
        if( NodeNet(input_np) == MSUBNET_LAN )    ( UnlockLAN() ; )
        else                                      ( UnlockWAN() ; )
        )

return sequence_num ;
)

BOOL DeleteStalestLANnode(VOID)
(
        FAST NODE       *np ;
        NODE            *deleter = NULLNP ;
        MCLOCK_TIMER    oldest_time = MCLOCK_TIMER_INFINITY ;

/* initialize 'np' for the search */
        np = (NODE *)LAN_ActiveNodes_Q ;

LockLAN() ;
        while( (np = (NODE *)sys_next_queue((QUE *)np, LAN_ActiveNodes_Q)) != NULLNP )
        (
                /* if the Node is Not in the process of transfering Data,
                   latch the one with the Completed Exchange
                   furthest in the past */
                if( (!NodeMaintain_M(np))
                     && (NodeLastExchange(np) < oldest_time) )
                (
                        oldest_time = NodeLastExchange(np) ;
                        deleter = np ;
                )
        )
        UnlockLAN() ;

if( deleter != NULLNP )
        (
                FailNode(deleter) ;
                return TRUE ;
        )
        else
```

```
            )
            return FALSE ;
      }

LOCAL VOID   delete_furthest_WANnode(VOID)
{
      FAST NODE      *np ;
      NODE           *desperado ;         /* the NODE most probable to die */
      UCOUNT         most_crowded_octant ;
      DISTANCE       worst_distance ;
      MCLOCK_TIMER   now ;

/* determine Most Crowded Octant */
      most_crowded_octant = MostCrowdedOctant() ;

/* pause for watchdog */
      sys_pend(0,MINIMUM_PEND_TIME) ;

/* initialize search space */
      desperado        = NULLNP ;
      worst_distance   = 0 ;

/* initialize 'np' for search */
      LockWAN() ;

/* what timer is it NOW */
      GetMclockTimer(&now) ;

np = (NODE *)WAN_ActiveNodes_Q ;
      while( (np = (NODE *)sys_next_queue((QUE *)np, WAN_ActiveNodes_Q)) != NULLNP )
      {
            if( (NodeOctant(np) == most_crowded_octant) )
            {
                  ANGLE       bearing ;
                  DISTANCE    their_distance ;
                  WAN_ADDR    wan ;
```

```
            LinkToWan( &wan, NodeLinkAdddressPtr(np) ) ;
            DeltaStationWanAddr( &bearing, &their_distance, &OurGlobalWanAddr,
&wan ) ;

/* if they are the furthest */
            if( their_distance > worst_distance )
            (
                desperado     = np ;
                worst_distance = their_distance ;
            )
        )

UnlockWAN() ;

/* pause (again) for watchdog */
    sys_pend(0,MINIMUM_PEND_TIME) ;

if( desperado != NULLNP )        ( FailNode(desperado) ; )
)

VOID MakeNodeRoom( VOID )
(
    if( FreeNodes_Q->audit < MIN_FREE_NODES )
    (

/* if not Too Many LAN nodes OR we couldn't delete a LAN node
           because they are all Static, Delete 'flakiest' WAN node */
        if( (LAN_ActiveNodes_Q->audit < RamMaxLANNodes_M)
            || (DeletestalestLANnode() == FALSE) )
        (
            delete_furthest_WANnode() ;
        )
    )
)

VOID NapNode( NODE *np )
```

```c
    ULONG       nap_time ;

if(Gabby() == GABBY_WAN) sys_puts( "(nap) " );
        if( np == NULLNP ) return ;

if( NodeNaps(np) < MAX_NODE_NAPS ) ( IncrementNodeNaps(np) ; )

nap_time = NodeNaps(np) * RamNapStartDelay_M ;
    GetExpiredMclockTimer( NodeDataRetryTimerPtr(np), nap_time ) ;

}

VOID    SetNodeActiveState( NODE *np )
{
    if( np == NULLNP ) return ;

/* set the status to ACTIVE if the NODE has earned it */
    if( (NodeTotalDataSent(np) && NodeTotalDataRcvd(np)) )
    {
        SetNodeTwoWay(np) ;
    }
    else
    {
        ResetNodeTwoWay(np) ;
    }
}

UTEXT   *ExportNodeTableEntry( UTEXT *bp, NODE *np )
{
    MCLOCK_TIMER    now ;

bp      = ExportLinkAddr( bp, NodeLinkAddressPtr(np), NodeNet(np) ) ;
    bp      = ExportMulong( bp, NodeDeltaAge(np) ) ;
    bp      = ExportMulong( bp, NodeDistance(np) ) ;
    bp      = ExportMulong( bp, NodeBearing(np) ) ;
```

```
*bp++    = NodeRssiSmoothed_M(np) ;
*bp++    = NodeRssiMax_M(np) ;
*bp++    = NodeRssiMin_M(np) ;
*bp++    = NodeRssiLast_M(np) ;
*bp++    = NodeDiscriminator_M(np) ;
*bp++    = NodeTxPower_M(np) ;
*bp++    = NodeLastReportedRssi_M(np) ;
*bp++    = NodeMaxReportedRssi_M(np) ;
*bp++    = NodeMinReportedRssi_M(np) ;
*bp++    = NodeSmoothedReportedRssi_M(np) ;
*bp++    = NodeFid(np) ;

/* status fields */
bp       = ExportMuint( bp, NodeStatusBytes_M(np) ) ;

*bp++    = NodeAckTries(np) ;
bp       = ExportMulong( bp, NodeAckTimer_M(np) ) ;

*bp++    = NodeToTries(np) ;
bp       = ExportMulong( bp, NodeDataRetryTimer_M(np) ) ;

bp       = ExportMuint( bp, NodeSeqNum_M(np) ) ;
bp       = ExportMuint( bp, NodeDeltaTick_M(np) ) ;

bp       = ExportMulong( bp, NodeScannerAlarm_M(np) ) ;

bp       = ExportMulong( bp, NodeLastDataSent_M(np) ) ;
bp       = ExportMulong( bp, NodeCurrentDataSent_M(np) ) ;

bp       = ExportMulong( bp, NodeLastDataRetries_M(np) ) ;
bp       = ExportMulong( bp, NodeCurrentDataRetries_M(np) ) ;

bp       = ExportMulong( bp, NodeTotalDataRcvd(np) ) ;

bp       = ExportMulong( bp, NodeMaintAlarm(np) ) ;
bp       = ExportMulong( bp, NodeLastExchange(np) ) ;
bp       = ExportMulong( bp, NodeContactAlarm(np) ) ;
bp       = ExportMulong( bp, NodeLastHeardTimer_M(np) ) ;
```

```c
/* maintenance status */
*bp++     = NodeMaintByte_M(np) ;

bp        = ExportMulong( bp, NodeInfoAge(np) ) ;
bp        = ExportMuint(  bp, NodeInfoStatus(np) ) ;
bp        = ExportMuint(  bp, NodeInfoSeqNum_M(np) ) ;
bp        = ExportDevAddr( bp, NodeInfoDevAddrPtr_M(np) ) ;

*bp++     = NodeNaps(np) ;

bp        = ExportMulong( bp, NodeTestPackets_M(np) ) ;

bp        = ExportMulong( bp, NodeTickleTries_M(np) ) ;
bp        = ExportMulong( bp, NodeTickleSuccesses_M(np) ) ;

/* and return the AGE of this NODE table read */
GetMclockTimer( &now ) ;
bp        = ExportMulong( bp, now ) ;

return bp ;
```

Appendix E

Listing L2SCAN C

•Copyright (unpublished work) Metricom, Inc.
All rights reserved.

```c
#include <stdio.h>
include <stdarg.h> include "std.h"
include "kernel.h"
#include "net.h"

#include "mtime.h"
#include "mclock.h"
#include "addr.h"
#include "angle.h"

#include "l0.h"
#include "l1.h"
#include "l2.h"
#include "l2lanwan.h"
#include "node.h"
#include "l3.h"
#include "l3lanwan.h"
#include "platform.h"
#include "config.h"
#include "scan.h"

/* l2scan.c ************************************************** l2scan.c */
/*
 *
 *
 ****************************************************************** l2scan.c */

LOCAL BOOL   poll_list_insert(
    POLL_LIST table[],
    NODE      *np,
``` l2scan.c - Metricom Proprietary - 891212 - page:1

```
      ULONG     progress,
      ARG       index,
      ARG       length_of_table,
      ARG       num_entries )
(
      ARG       i ;

/* zero referenced; don't write beyond table */
      if( (index >= length_of_table) || (num_entries > length_of_table) )
      (
#define DEBUG
#ifdef DEBUG
      printf( "poll_list_insert ERROR: index:%d length:%d num_entries:%d\n",
            index, length_of_table, num_entries ) ;
#endif
#undef DEBUG
            return FALSE ;
      }

/* when we're full, spill the 'last' entry */
      if( num_entries == length_of_table )       ( num_entries-- ; )

/* move everyone 'down' one index */
      for( i = num_entries; i > index; i-- )
      (
            table[i].np       = table[i - 1].np ;
            table[i].progress = table[i - 1].progress ;
      )

table[index].np       = np ;
      table[index].progress = progress ;

#ifdef DEBUG
if(Gabby() == GABBY_SCANNER)
(
      ARG j ;
      printf( "poll_list_insert entries:%d index:%d np:%p progress:%lu\n",
            num_entries, index, np, progress ) ;
      for( j = 0; j < num_entries + 1; j++ )
      (
```

```
            printf( "table[%d].np = %p progress:%lu\n",
                    j, table[j].np, table[j].progress ) ;
        }
#endif
        return TRUE ;
}

ULONG   ProbableProgress( ULONG tries, ULONG retries, ULONG parameter )
(
        ULONG   progress ;

/*
if( Gabby() == 7) printf( "ProbableProgress( %lu %lu %lu ) returning: ",
tries, retries, parameter ) ;
*/

/* scale 'tries' and 'retries' if needed */
        if( (tries > (ULONG_MAX >> 4)) || (retries > (ULONG_MAX >> 4)) )
        (
                tries   >>= 4 ;
                retries >>= 4 ;
        )

/* scale 'parameter' if needed; protect division */
        if( parameter > (ULONG_MAX >> 8) ) ( parameter >>= 8 ; )
        else if( parameter == 0 )         ( parameter++ ; )

if( (tries + retries) > 0 )
        (
                progress = ((tries << 4) / (tries + retries)) * parameter ;
        )
        else
        (
                progress = 1 ;
        )

/* if( Gabby() == 7) printf( "%lu\n", progress ) ; */ return progress ;
```

```
LOCAL BOOL    insert_in_poll_list(
    POLL_LIST   table[],
    NODE        *np,
    ULONG       qualification,
    ARG         length_of_table,
    ARG         num_entries )
(
    ARG    i ;
    ULONG  progress ;

progress = ProbableProgress(
                    NodeTotalDataSent(np),
                    NodeTotalRetries(np),
                    qualification ) ;

for( i = 0; i < length_of_table && i <= num_entries; i++ )
    {
        if( progress > table[i].progress )
        {
if(Gabby() == GABBY_SCANNER) printf( "Inserting %p.%lu from [%lu] into poll_table at %u\n",
            np, progress, qualification, i ) ;
            return( poll_list_insert( table, np, progress, i, length_of_table,
num_entries) ) ;
        }
    } return FALSE ;
}

/*
        returns     NOTOK       if the node doesn't respond
        returns     OK          if the Node "NACKs" us
        returns     <val>       if the node responds with a positive 'num_platforms' l2scan.c - Metricom Proprietary - 891212 - page:4
```

```
*/
ARG     Tickle( NODE *np, L3_PRIORITY priority )
(
        PLATFORM *data ;
        ARG             return_code = NOTOK ;

if( (data = (PLATFORM *)sys_get_queue(FreePlatform_Q)) != NULLPP )
        (
                L2_FID  fid ;

if(Gabby() == GABBY_WAN)
printf( "\nTickle( %p %u )", np, priority ) ;

/* one byte of DATA, zero platform delta_tick */
                MkL2Pkt( data, 1, L2_PROTOCOL_TICKLE, L2_FTYPE_DATA_ACK, GetNewFid(np),
                        NodeLinkAddressPtr(np), GetPrimeSourceLinkAddr(MSUBNET_WAN),
                                MSUBNET_WAN ) ;

*L2DataPtr(data) = (UTEXT)priority ;
                SetTraveling( NodeDeltaTick_M(np) ) ;
                IncrementNodeTickleTries_M(np) ;

/* wait for tickle tick */
                WaitTillRightTick( TICKLE_TICK ) ;

WAN_Output( data,NodeRssiLast_M(np) ) ;
                fid = Fid(data) ;
                FreePlatform(data) ;

/* wait for one packet only */
                if( sys_pend(WAN_MGR_RX_EVENT, TICKLE_WAIT) )
                (
                        PLATFORM *rx ;

/* get packet */
                        rx = (PLATFORM *)sys_get_queue(WAN_Mgr_Rx_Q) ;

if( (Fid(rx) == fid)
                                && (L2FType(rx) == L2_FTYPE_ACK)
``` l2scan.c - Metricom Proprietary - 891212 - page:5

```
            && (L2Protocol(rx) == L2_PROTOCOL_TICKLE) )
        (
            if( L2DataLen(rx) != 0 )
            (
                return_code = (ARG)(*L2DataPtr(rx)) ;
            )
            else
            (
                return_code = (ARG)(UCHAR_MAX) ;
            )
            IncrementNodeTickleSuccesses_M(np) ;

if(Gabby() == GABBY_WAN) printf("(got tickle Ack(%d,%d @ %u) ",
                Fid(rx), return_code, Current.tick ) ;

/* free the platform received */
            FreePlatform(rx) ;
        )
        if( return_code <= 0 )
        (
            /* timed out or NACKed... return to HomeSlot */
            SetTraveling(0) ;
        )
    )
    if( return_code <= 0 )
    (
        SetNodeLastTickleGood_M(np,FALSE) ;
        NapNode(np) ;
    )
    else
    (
        SetNodeLastTickleGood_M(np, TRUE ) ;
    )
    return return_code ;
``` l2scan.c - Metricom Proprietary - 891212 - page:6

```
LOCAL ARG tickle_poll_list( POLL_LIST table[], ARG table_entries, L3_PRIORITY
priority, NODE *np, MCLOCK_TIMER *pp_nap_ptr )
(
    FAST NODE       *fnp ;
    ARG             i ;
    MCLOCK_TIMER    now ;           failure_count = 0 ;
    ARG
    MCLOCK_TIMER    first_nap_alarm = MCLOCK_TIMER_INFINITY ;

if( Gabby() == GABBY_SCANNER) printf( "tickle_poll_list: entries:%u\n", table_entries
) ;

GetMclockTimer(&now) ;
for( i = 0; i < table_entries; i++ )
(
    /* get FAST NODE * */
    fnp = table[i].np ;

/* nip 'ping_pong' in the bud */
    if( (table_entries > 1) && (np == fnp) )        ( continue ; )

else /* tickle the Node */
    (
        ARG     val ;

if( (val = Tickle(fnp,priority)) > 0 )
        (
            if(Gabby() == GABBY_SCANNER) printf("Got(%d)\n", i ) ;
            UpdateIdle( 1, failure_count ) ;
            return i ;
        )
        else if( val < 0 )              /* only if we did not get anything */
        (
            failure_count++ ;
        )
)
``` l2scan.c - Metricom Proprietary - 891212 - page:7

```
        if(Gabby() == GABBY_SCANNER)
            printf( "tickle_poll_list: fnp data retry alarm:%lu\n",
                NodeDataRetryTimer_M(fnp) ) ;

/* latch the Minimum Napping alarm of the Node in the Table */
        if( NodeDataRetryTimer_M(fnp) < first_nap_alarm )
        {
            first_nap_alarm = NodeDataRetryTimer_M(fnp) ;
            if( Gabby() == GABBY_SCANNER) printf( "tickle_poll_list setting 'first_nap_alarm' to:
%lu\n",
                first_nap_alarm ) ;
        }

/* if we failed and there has been a Node that got Napped */
        if( first_nap_alarm != MCLOCK_TIMER_INFINITY )
        {
            *pp_nap_ptr = first_nap_alarm ;
            if( Gabby() == GABBY_SCANNER )
                printf( "tickle_poll_list setting pp_nap_alarm to %lu\n",
                    *pp_nap_ptr ) ;
        }

UpdateIdle( 0, failure_count ) ;

return NOTOK ;
    }

/* Passed the destination DEV_ADDR and a pointer to a BOOL.
   and a priority (for Tickle)

Upon entry, the BOOL contains the backtrack status of the packet
   BEFORE this scan has tried to *route* this packet.
``` l2scan.c - Metricom Proprietary - 891212 - page:8

```
Upon exit, this BOOL contains the backtrack status of the packet
AFTER this scan has tried to *route* this packet.

The BOOL is used to indicate to the calling routine(s) if that the
NODE * returned this time is the FIRST backtrack -- even if the NODE *
returned is NULLNP (see below).

If this BOOL has changed during this scan the calling routine is
obliged to update the 'backtracking bit' of the L3Header and re-export
it into the Exported version of the packet.

Returns the NODE * of a link that has been sucessfully 'tickled' or
NULLNP if none.
*/

LOCAL ARG fill_scan_table(
    WAN_ADDR        *dest_wan,
    BOOL            *backtrack,
    POLL_LIST       table[],
    L3_MOOD         mood )

ARG             i, table_entries ;
    ANGLE           our_bearing ;
    DISTANCE        our_distance ;
    NODE            *np ;
    LAN_ADDR        dest_lan ;
    MCLOCK_TIMER    now ;
    BOOL            possibly_cds = TRUE ;

{
if(Gabby() == GABBY_SCANNER ) sys_puts( "scan..." ) ;

/* we need an unchanging WAN Active Node Queue */
LockWAN() ;

if( IsMobileWanAddr(&OurGlobalWanAddr) )
{
    our_distance = 20000 ;
    if(Gabby() ==GABBY_SCANNER ) sys_puts( "we are mobile WAN address\n" ) ;
```

```c
        }
        else
        {
            /* get *our* bearing and distance from the destination Node */
            DeltaStationWanAddr( &our_bearing, &our_distance, dest_wan,
&OurGlobalWanAddr ) ;
        } if( Gabby() == GABBY_SCANNER) printf( "SFL: OB:%lu OD:%lu\n", our_bearing,
our_distance ) ;

/* initialize table/variables */
        table_entries = 0 ;
        for( i = 0; i < POLL_LIST_LEN; i++ )    ( table[i].progress = 0 ; )

GetMclockTimer(&now) ;
        np = (NODE *)WAN_ActiveNodes_Q ;
        while( (np = (NODE *)sys_next_queue((QUE *)np, WAN_ActiveNodes_Q)) != NULLNP )
        {
            BOOL        put_in_scan_table ;
            WAN_ADDR    their_wan ;
            ANGLE       their_bearing ;
            DISTANCE    their_distance ;
            ULONG       progress = 0 ;

/* if the NODE is TWO WAY AND it is not NAPPING OR there
               is not a lot of "Naps" (== retries) ... out in the list */
            if( NodeTwoWay(np)
            && ((IsExpiredMclockTimer(&now,NodeDataRetryTimerPtr(np))
                || (NodeNaps(np) <= RamTriesBeforeCDS_M)))

)

/* check for Battery Backed (PERSISTENT) node requests */
            if( (mood & L3_MOOD_PERSISTENT) && !NodeBatteryBacked_M(np) )
            {
                continue ;
            }

/* get their WAN_ADDR for distance calculations */
            LinkToWan( &their_wan, NodeLinkAddressPtr(np) ) ;
``` l2scan.c - Metricom Proprietary - 891212 - page:10

```c
        /* if the Node doesn't want to be routed to,
           ONLY include it in the scan Table if it is the destination */
        if( !NodeRouteable_M(np) && !CmpEqualWanAddr(&their_wan, dest_wan) )
        (
            continue ;
        )

DeltaStationWanAddr( &their_bearing, &their_distance, dest_wan,
            &their_wan ) ;

/* put in scan table if we are NOT closer than they are */
        put_in_scan_table = !(CmpLessThanDistance(our_distance,
            their_distance)) ;

/* when we discover a 'forward scan entry' */
        if( possibly_cds && put_in_scan_table )
        (
            /* if a 'hop' is found that is closer to the DEST than we are
               this is NOT a CDS packet */
            possibly_cds = FALSE ;
            table_entries = 0 ;
            for( i = 0; i < POLL_LIST_LEN; i++ ) ( table[i].progress = 0 ; )
        )

if( put_in_scan_table )
        (
if( Gabby() == GABBY_SCANNER) printf( "SFL(pist): TD:%lu forward_progress:%lu
entries:%u\n",
            their_distance, (ULONG)(our_distance - their_distance), table_entries ) ;
            /* if this is THE dest */
            if( CmpEqualWanAddr(&their_wan, dest_wan) )
if( Gabby() == GABBY_SCANNER ) sys_puts( "can hit destination\n" ) ;
                progress = DISTANCE_INFINITY ;
            )
            else
            (
                progress = (ULONG)(our_distance - their_distance) + 1 ;
            )
``` l2scan.c - Metricom Proprietary - 891212 - page:11

```
                }
            else if( possibly_cds )    /* put delta bearing into POLL_LIST table */
                {
                if( Gabby() == GABBY_SCANNER) printf( "SFL(pict): TB:%lu delta_bearing:%lu entries:%u\n",
                    their_bearing, (ULONG)labs( (LONG)(their_bearing - our_bearing) ),
                    table_entries ) ;

progress = (ULONG)labs( (LONG)(their_bearing - our_bearing) ) ;

if( (progress != 0) && insert_in_poll_list( table, np, progress,
POLL_LIST_LEN, table_entries) )
                    {
                    /* latch at size of table */
                    if( table_entries < POLL_LIST_LEN )        ( table_entries++ ; )
                    }
                }

)   /* end of while ActiveNodes */

/* we are done with the NodeList */
        UnlockWAN() ;

if( possibly_cds )
            {
            *backtrack = TRUE ;
            IncrementCulDeSacs_M() ;
            } return table_entries ;
    }

NODE *scanForLink( DEV_ADDR *dev_dest_ptr, BOOL *backtrack, L3_PRIORITY priority,
NODE *np, MCLOCK_TIMER *pp_nap_ptr, L3_MOOD mood )

l2scan.c - Metricom Proprietary - 891212 - page:12

{
    ARG             scan, entries ;
    LAN_ADDR        lan ;
    WAN_ADDR        dest_wan ;
```

```
    POLL_LIST table[POLL_LIST_LEN] ;

/* hit directly iff Mobile WAN address */
    DevToWanLan( &dest_wan, &lan, dev_dest_ptr ) ;
    if( IsMobileWanAddr(&dest_wan) )
    {
         LINK_ADDR link ;
         NODE      *np ;

if(Gabby() == GABBY_SCANNER) printf( "Direct to a Mobile WAN address\n" ) ;
         WanToLink(&link, &dest_wan) ;
         if( (np = FindNodeGivenLinkPtr(&link, MSUBNET_WAN)) != NULLNP )
         {
              /* if the Tickle failed */
              if( Tickle(np, priority) <= 0 )
              {
                   /* return the Nap Time and NULLNP.. failure indication */
                   *pp_nap_ptr = NodeDataRetryTimer_M(np) ;
              }
         }
         return np ;
    }
    else if( (entries = fill_scan_table( &dest_wan, backtrack, table, mood )) != NOTOK )
    {
         if( (scan = tickle_poll_list(
                             table,
                             entries,
                             priority,
                             np,
                             pp_nap_ptr)) != NOTOK )
         {
              return table[scan].np ;
         }
    }
    return NULLNP ;
} l2scan.c - Metricom Proprietary - 891212 - page:13
```

```
VOID ScanForShow( DEV_ADDR *dev_dest_ptr, BOOL *backtrack, POLL_LIST table[], L3_MOOD
mood )
{
    LAN_ADDR    lan ;
    WAN_ADDR    dest_wan ;

DevToWanLan( &dest_wan, &lan, dev_dest_ptr ) ;
    if( !IsMobileWanAddr(&dest_wan) )
    {
        fill_scan_table( &dest_wan, backtrack, table, mood ) ;
    }
}

/* ****************** IdleInterval ********************** */ define     NUM_IDLE_BUCKETS         (8)

struct
{
    UCOUNT      successes, failures ;
} idle_history[NUM_IDLE_BUCKETS] ;

LOCAL UCOUNT        past_successes, past_failures ;
LOCAL UCOUNT        current_index ;
LOCAL MCLOCK_TIMER  idle_interval_timer ;

VOID InitIdle(VOID)
{
    ARG i ;

past_successes      = 0 ;
    past_failures       = 0 ;
    current_index       = 0 ;
    idle_interval_timer = 0 ;

for( i = 0; i < NUM_IDLE_BUCKETS; i++ )
    {
``` l2scan.c - Metricom Proprietary - 891212 - page:14

```
            idle_history[i].successes   = 0 ;
            idle_history[i].failures = 0 ;
        }
    }

VOID UpdateIdle( UCOUNT successes, UCOUNT failures )
{
    MCLOCK_TIMER    now ;

GetMclockTimer( &now ) ;

if( IsExpiredMclockTimer(&now, &idle_interval_timer) )
    {
        ARG     i ;

GetExpiredMclockTimer( &idle_interval_timer, RamWANIdleInterval_M ) ;

if( ++current_index == NUM_IDLE_BUCKETS ) { current_index = 0 ; } idle_history[current_index].successes = 0 ;
        idle_history[current_index].failures = 0 ;

for( past_successes = past_failures = i = 0; i < NUM_IDLE_BUCKETS; i++ )
        {
            past_successes += idle_history[i].successes ;
            past_failures  += idle_history[i].failures ;
        }
    } idle_history[current_index].successes  += successes ;
    idle_history[current_index].failures   += failures ;
}

VOID pr_idle(VOID)
{
    ARG             i ;
    MCLOCK_TIMER    now ;

printf( "Current:%u IdleBuckets->\n", current_index ) ;
```

```
for( i = 0; i < NUM_IDLE_BUCKETS; i++ )
{
    printf( "%d:%u ",
        i, idle_history[i].successes, idle_history[i].failures ) ;
}
printf( "\nPastSuccesses:%u PastFailures:%u\n",
    past_successes, past_failures ) ;

GetMclockTimer(&now) ;
printf( "IdleIntervalTimer:%lu Now:%lu -- IdlePeriod:%u\n",
    idle_interval_timer, now, IdlePeriod() ) ;
}

UTEXT    *ExportIdleData( UTEXT *bp )
{
    ARG                 i ;
    MCLOCK_TIMER    now ;

bp = ExportMuint( bp, current_index ) ;

for( i = 0; i < NUM_IDLE_BUCKETS; i++ )
    {
        bp  = ExportMuint( bp, idle_history[i].successes ) ;
        bp  = ExportMuint( bp, idle_history[i].failures ) ;
    } bp  = ExportMuint( bp, past_successes ) ;
    bp  = ExportMuint( bp, past_failures ) ;

bp  = ExportMulong( bp, idle_interval_timer ) ;
    GetMclockTimer( &now ) ;
    bp  = ExportMulong( bp, now ) ;

/* report the 'answer' too! */
    bp  = ExportMuint( bp, IdlePeriod() ) ;
    bp  = ExportMuint( bp, NumInMaintList(MSUBNET_LAN) ) ;
    bp  = ExportMuint( bp, NumInMaintList(MSUBNET_WAN) ) ;

return bp ;
```

```
)

/*
 in a nutshell........

(TotalFailures + TotalSuccesses + IdleBias)
    TotalFailures + MaxIdlePeriod + ---------------------------------------
                                                     2
    ------------------------------------------------------------------------
                  TotalFailures + TotalSuccesses + IdleBias Returns the number of 'transmit opportunities' (e.g., slots) to wait before
    transmitting again.
*/
UCOUNT    IdlePeriod(VOID)
(
    UCOUNT   val, total_successes, total_failures, fbs ;

total_failures = past_failures + idle_history[current_index].failures ;
    total_successes = past_successes + idle_history[current_index].successes ;

/* try to follow this... */
    val = total_failures * RamWANIdlePeriod_M ;
    fbs = total_failures + RamWANIdleBias_M + total_successes ;
    val += (fbs / 2) ;

val /= fbs ;

if( Gabby() == GABBY_CONGESTION )
(
    printf( "IdlePeriod returning:%u\n", val ) ;
)
    return val ;
)■
```

128
Appendix F
Listing L2WAN C

\*Copyright (unpublished work) Metricom, Inc.
All rights reserved.

```c
#include <stdio.h>
include <stdlib.h> include "std.h"
include "kernel.h"
#include "net.h"

#include "mtime.h"
#include "mclock.h"
#include "addr.h"

#include "l0.h"
#include "l1.h"
#include "l2.h"
#include "l2lanwan.h"
#include "node.h"
#include "l3.h"
#include "l3lanwan.h"
#include "scan.h"
#include "platform.h"
#include "config.h"

#include "netutil.h"

/****************************************************************
 *
 *  l2wan.c
 *
 *  Routines necessary to complete exchanges over MSUBNET_WAN
 *
 *  VOID WAN_ack_ack_send( PLATFORM *data, PLATFORM *ack_ack )
 *
 *  Passed the ACK packet just received, this routine creates
 *  the ACK_ACK (in the passed buffer, 'ack_ack), and calls
 *  'sys_wan_send()'.
 *
 */

VOID WAN_ack_send( PLATFORM *data, UTINY num_platforms )
``` l2wan.c - Metricom Proprietary - 891212 - page:1

```
 *      Passed a DATA packet, this routine makes an ACK and send it out
 *      using 'sys_wan_send()' and BLOCKS awaiting the ACK to be sent.
 *
 ****************************************************************/

[TASK]
    VOID WAN_rx(VOID)

/****************************************************************/

LOCAL UCOUNT       data_send_quit_slot ;
LOCAL BOOL                 data_cycling = FALSE ;

LOCAL VOID      Tx_Q_to_WAN_data_to_go_Q( PLATFORM *pp )
(
    if( outputNode(pp) == NULLNP )
    {
        FreePlatform(pp) ;
    }
    else
    {
        /* start with no naps in this Packet */
        GetExpiredMclockTimer( PacketNapAlarmPtr(pp), 0 ) ;
        sys_add_queue( (QUE *)pp, WAN_DataToGo_Q, FIFO ) ;
    }
)

VOID WAN_output( PLATFORM *pp, UTINY rx_signal )
(
    if( GoToSlot( TRANSMIT ) == TRUE )
    {
        /* send the data out */
        if( !sys_wan_send(L1DataPtr(pp), L1DataLen(pp), rx_signal) )
        {
            if( Gabby() == GABBY_WAN ) sys_puts("^") ;
```

```c
        }
        /* in any case, go back to the receive channel */
        GoToSlot( RECEIVE ) ;
}

LOCAL UTINY    pseudo_sig2noise( UTINY last_rx )
{
        if( last_rx > WanRssiMin_M )  ( return( last_rx - WanRssiMin_M ) ; )
        return 0 ;
}

LOCAL VOID    WAN_ack_ack_send( PLATFORM *ack )
{
        PLATFORM *ack_ack ;

/* pre-allocate the 'spare' platform used for ACKs and ACK ACKs */
        if( (ack_ack = (PLATFORM *)sys_get_queue(FreePlatform_Q)) != NULLPP )
        (
                MkL2Pkt(ack_ack, 0, L2Protocol(ack), L2_FTYPE_ACK_ACK,
                        Fid(ack), LinkSrcPtr(ack), GetPrimeSourceLinkAddr(MSUBNET_WAN),
                        MSUBNET_WAN ) ;

WAN_Output( ack_ack, pseudo_sig2noise(NodeRssiLast_M(InputNode(ack))) ) ;
                FreePlatform(ack_ack) ;

if(Gabby() == GABBY_WAN) printf( "TAA(%u) @ CT:%u\n",  (UCOUNT)Fid(ack_ack),
Current.tick ) ;
        )
}

LOCAL VOID    WAN_ack_send( PLATFORM *data, UTINY num_platforms )
{
        PLATFORM *ack ;
```

```c
        /* pre-allocate the 'spare' platform used for ACKs and ACK_ACKs */
        if( (ack = (PLATFORM *)sys_get_queue(FreePlatform_Q)) != NULLPP )
        {
            /* One byte of length and NO delta_tick */
            MkL2Pkt( ack, 1, L2Protocol(data), L2_FTYPE_ACK, Fid(data),
                    LinksrcPtr(data), GetPrimeSourceLinkAddr(MSUBNET_WAN),
                    MSUBNET_WAN ) ;

/* if we can reasonably expect an ACK_ACK */
            if( num_platforms )     SetNodeLastAckGood_M( InputNode(data), FALSE ) ;

*(L2DataPtr(ack)) = (UTEXT)num_platforms ;
            WAN_Output( ack, pseudo_sig2noise(NodeRssiLast_M(InputNode(data))) ) ;
            FreePlatform(ack) ;
        } if(Gabby() == GABBY_WAN) printf( "TA(%u,%u) @ HT:%u ",
    (UCOUNT)Fid(data), (UCOUNT)num_platforms, Home.tick ) ;
}

/* Lonely code *********************************************************/
/* Note: the algorithm as implemented will take two times
        LONELY_TIME (less 15 seconds) to commit suicide....
*/
#define     LONELY_TIME         1800        /* thirty minutes */
LOCAL MCLOCK_TIMER  lonely_alarm = LONELY_TIME ;
LOCAL ARG           lonely_count = 0 ;

LOCAL VOID    not_lonely( NODE *np )
{
    if( np != NULLNP )
    {
        /* this node is NO LONGER napping */
        ClearNodeNaps(np) ;
        GetMclockTimer( NodeDataRetryTimerPtr(np) ) ;
```

```
        GetExpiredMclockTimer( &lonely_alarm, LONELY_TIME ) ;
        lonely_count = 0 ;
}
/* ******************************************** Lonely code */

VOID UpdateRadioData( WAN_RX_STRUCT *wrxp )
{
        SetWanRssiMax_M( max(WanRssiMax_M, wrxp->rssi) ) ;
        SetWanRssiMin_M( min(WanRssiMin_M, wrxp->rssi) ) ;

if( WanRssiSmoothed_M < WanRssiMin_M )
        {
                SetWanRssiSmoothed_M( wrxp->rssi ) ;
        }
        else
        {
                SetWanRssiSmoothed_M( (BYTES) smooth( (ARG)WanRssiSmoothed_M, (ARG)wrxp-
>rssi) ) ;
        }

SetDiscMax_M( max(DiscMax_M, wrxp->discriminator) ) ;
        SetDiscMin_M( min(DiscMin_M, wrxp->discriminator) ) ;

/* come up with a valid value fast */
        if( DiscSmoothed_M == 0 )
        {
                SetDiscSmoothed_M(wrxp->discriminator) ;
        }
        else
        {
                SetDiscSmoothed_M( (BYTES) smooth( (ARG)DiscSmoothed_M, (ARG)wrxp-
>discriminator) ) ;
        }
}

/* [TASK] */
```

```c
VOID WAN_Receiver(VOID)
{
    PLATFORM *pp ;

while(TRUE)
    {
        if( (pp = (PLATFORM *)sys_get_queue(FreePlatform_Q)) != NULLPP )
        {
            NODE            *np ;
            WAN_RX_STRUCT   wrx ;
#if !(CONSTLengthL2Header())
            UCOUNT          l2_header_len ;
endif SetSubnet(pp,MSUBNET_WAN) ;
            SetPort(pp,RF) ;
            SetL1DataPtr(pp,Export(pp)) ;
            sys_wan_receive(L1DataPtr(pp), &wrx ) ;
            UpdateRadioData( &wrx ) ;

SetL1DataLen(pp,wrx.buffer_len) ;

/* remember when we got this packet */
            GetMclockTimer(PPTimerPtr(pp)) ;

/* import L2 Header */
            SetL2DataPtr( pp, ImportL2Header( L2HeaderPtr(pp), L1DataPtr(pp),
MSUBNET_WAN ) ) ;

#if CONSTLengthL2Header()
#define l2_header_len L2_HEADER_LEN
#else
            l2_header_len = (L2DataPtr(pp) - L1DataPtr(pp) ) ;
#endif
            if( L1DataLen(pp) >= l2_header_len )
            {
                SetL2DataLen( pp, L1DataLen(pp) - l2_header_len ) ;
            }
            else
``` l2wan.c - Metricom Proprietary - 891212

```c
            {
                FreePlatform(pp) ;
                continue ;
            }

SetL3DataPtr(pp, NULLUCHAR) ;

if(Gabby() == GABBY_WAN) printf( "\nWAN_rx-> CS:%u CT:%u ", Current.slot,
Current.tick ) ;
#ifdef DEBUG
sys_puts( "WAN_rx received a packet\n" ) ;
printf( "buffer_len:%u tx_tick:%u aosTick:%u RSSI:%u Disc:%u\n",
    wrx.buffer_len, wrx.tx_tick, wrx.aos_tick,
    wrx.rssi, wrx.discriminator ) ;
endif /* count this as a received packet */
IncrementWANRx() ;

/* if can't find it AND (it is invalid OR we cannot Make the Node) */
if( ((np = FindNodeGivenLinkPtr(LinkSrcPtr(pp), MSUBNET_WAN)) ==
NULLNP)
    && (!ValidateSourceLinkAddr(LinkSrcPtr(pp),MSUBNET_WAN)
        || (np = MakeNodeGivenLinkPtr(LinkSrcPtr(pp), MSUBNET_WAN)) ==
NULLNP) )
{
    FreePlatform(pp) ;
}
else if( NodeDoomed(np) ) { FreePlatform(pp) ; }
else
{
    WAN_ADDR    wan ;

/* update the NODE with DeltaTick, RSSI, and DISCriminator */
    SetInputNode(pp,np) ;
    UpdateNode( np, wrx.tx_tick - wrx.aos_tick, wrx.rssi,
        wrx.discriminator, wrx.rx_signal ) ;
```

```c
        /* if this packet is not for us */
        if( !IsMySourceLinkAddr(LinkDestPtr(pp), LinkSrcPtr(pp),
MSUBNET_WAN) )
        {
            /* do we have enough space for saving these packets? */
            if( FreePlatform_Q->audit > WAN_RECEIVER_TASK )
            {
                sys_add_queue( (QUE *)pp, WAN_DeferredRx_Q, FIFO ) ;
                sys_post( WAN_MGR_EVENT ) ;
            }
            else
            {
                PLATFORM  *wasted_pp ;

while( (wasted_pp = (PLATFORM
*)sys_get_queue(WAN_DeferredRx_Q)) != NULLPP )
                {
                    FreePlatform(wasted_pp) ;
                }
                FreePlatform(pp) ;
            }
        }
        else
        {
            if( L2FType(pp) == L2_FTYPE_ACK )
            {
                not_lonely(np) ;
                sys_add_queue( (QUE *)pp, WAN_Mgr_Rx_Q, FIFO ) ;
                sys_post( WAN_MGR_RX_EVENT ) ;
            }
            else if( data_cycling )
            {
                FreePlatform(pp) ;
                continue ;
            }
            else if( FreePlatform_Q->audit > (sys_task_id() +
MINIMUM_PLATFORMS) )
            {
``` l2wan.c - Metricom Proprietary - 891212 - page:8

```
                            if( L2FType(pp) == L2_FTYPE_ACK_ACK )     ( sys_add_queue( (QUE *)pp, WAN_Rx_Q, FIFO ) ;
                                sys_post( WAN_RX_EVENT ) ;
                            }
                            else
                            (
                                FreePlatform(pp) ;
                                continue ;
                            }
                        }
                    }
                    else
                    (
                        sys_pend( FREE_PLATFORM_EVENT, 0 ) ;
                    }
not_lonely(NULLNP) ; }

LOCAL PLATFORM *best_WAN_data_for_link( NODE *np )
(
        ARG             highest_priority ;
        PLATFORM        *next, *pp ;
        ANGLE           bearing ;
        DISTANCE        our_distance ;
        LAN_ADDR        dest_lan ;
        WAN_ADDR        wan_dest ;

/* get possible additions to the WAN_Tx_Q */
while( (pp = (PLATFORM *)sys_get_queue(WAN_Tx_Q)) != NULLPP )
(
        Tx_Q_to_WAN_data_to_go_Q(pp) ;
} highest_priority    = -2 ;       /* legal MIN is 0 */
pp                  = NULLPP ;
```

12wan.c - Metricom Proprietary - 891212 - page:9

```
        next = (PLATFORM *)WAN_DataToGo_Q ;
        while( (next = (PLATFORM *)sys_next_queue((QUE *)next, WAN_DataToGo_Q)) !=
NULLPP )
            {
            /* highest priority 'moving closer' packet */
            if( (Priority(next) > highest_priority) )
                {
                DevToWanLan( &wan_dest, &dest_lan, DevDestPtr(next) ) ;
                DeltaStationWanAddr( &bearing, &our_distance, &wan_dest,
&ourGlobalWanAddr ) ;

/* if this link would move this packet closer to its dest */
                if( CloserThan( NodeLinkAddressPtr(np), &wan_dest, our_distance) )
                    {
                    highest_priority = Priority(next) ;
                    pp = next ;
                    }
                }
            }
        return pp ;
    }

LOCAL PLATFORM *highest_priority(VOID)
    {
    ARG             highest_priority ;
    MCLOCK_TIMER    now ;
    PLATFORM        *next, *pp ;

highest_priority = -2 ;         /* legal MIN is '0' */
    pp                  = NULLPP ;
    GetMclockTimer(&now);

next = (PLATFORM *)WAN_DataToGo_Q ;
    while( (next = (PLATFORM *)sys_next_queue((QUE *)next, WAN_DataToGo_Q)) !=
NULLPP )
        {
```

```c
            if( UpdateOrDead(next, TRUE) == FALSE )
            (

/* generate RR if desired */
                if( (RRType(pp) & L3_RECEIPT_DATA_NRCV) )
                (
                    MakeRR( pp, FALSE, L3_RECEIPT_NRCV_COMM_ROUTE ) ;
                )

/* remove 'next' from the DataToGo_Q */
                sys_delete_queue((QUE *)next,WAN_DataToGo_Q) ;
                FreePlatform(next) ;
                next = (PLATFORM *)WAN_DataToGo_Q ;

/* count the 'packet death' */
                IncrementTO_M() ;

continue ;
            }

/* for each non-napping packet.... */
            if( (IsExpiredMclockTimer(&now,PacketNapAlarmPtr(next)))
             && (Priority(next) > highest_priority) )
            (
#ifdef DEBUG
if(Gabby() == GABBY_WAN) printf( "highest_priority found %d better than %d\n",
(ARG)Priority(next), highest_priority ) ;
#endif
                /* is current best choice */
                highest_priority  = Priority(next) ;
                pp = next ;
            }
        }
        return pp ;
    }

LOCAL VOID    WAN_data_send( NODE *tx_link, PLATFORM *pp )
```

```c
{
WaitTillRightTick( DATA_TICK ) ;
WAN_Output(pp, pseudo_sig2noise(NodeRssiLast_M(tx_link)) ) ;

/* count this as a 'sent' packet */
IncrementWANTx() ;
SetNodeLastDataGood_M(tx_link,FALSE) ;

/* wait for this slot plus enough to 'clear' possible ACKs */
data_send_quit_slot = CalcEndSlot( Current.slot, RamWANSlotWait_M + 1 ) ;

if(Gabby() == GABBY_WAN) printf( "%s(%u)-> @ CT:%u",
    NodeToTries(tx_link) ? "DR" : "D", (UCOUNT)Fid(pp), Current.tick ) ;

if( NodeToTries(tx_link) != 0 )
{
    /* count TOTAL retries for RadioData */
    IncrementWANDatRetries() ;
}

/* count the number of retries on THIS link */
IncrementTotalRetries(tx_link) ;

/* here is the 'exponential backoff' (+ randomization) algorithm */
IncrementNodeToTries(tx_link) ;
GetExpiredMclockTimer( &(tx_link)->retry_timer, (BETA << NodeToTries(tx_link)) +
(rand() & 0x7) ) ;
}

BOOL scan_for_link(VOID)
{
    FAST NODE *np ;
    BOOL    return_code = FALSE ;

LockWAN() ;
```

```c
    np = (NODE *)WAN_ActiveNodes_Q ;
    while( (np = (NODE *)sys_next_queue((QUE *)np, WAN_ActiveNodes_Q)) != NULLNP )
    {
        if( Tickle(np,L2_PRIORITY_MIN) >= 0 )
        {
            return_code = TRUE ;
            SetTraveling(0) ;
            break ;
        }
    }
    UnlockWAN() ;
    return return_code ;
}

VOID WAN_scan_if_lonely(VOID)
{
    MCLOCK_TIMER   now ;
    GetMclockTimer( &now ) ;

if( IsExpiredMclockTimer(&now, &lonely_alarm) )
    {
        if(Gabby() == GABBY_WAN )      sys_puts( "lonely scan\n" ) ;
        if( !scan_for_link() )
        {
            ULONG    lonely_time ;

lonely_time = (LONELY_TIME / ++lonely_count) ;

if( lonely_time < 15 /* sec */ )  ( Die( DEATH_FROM_LONLINESS ) ; )
            else
            (
                GetExpiredMclockTimer(&lonely_alarm, lonely_time) ;
            )
        }
    }
``` l2wan.c - Metricom Proprietary - 891212 - page:13

```
#define     MAX_TICKLE_PRIORITY                     (L2_PRIORITY_MAX)

UTINY     NumReservedPlatforms( L2_PRIORITY priority, MSUBNET net )
(
    ARG     num, threshold, temp ;

/* calculate the number of PLATFORMs available at this L2_PRIORITY */
    if( net == MSUBNET_LAN )
    (
        threshold = RamLANPlatformThreshold_M ;

if( NackAllWANTickles ) return 0 ;
    )
    else
    (
        threshold = RamWANPlatformThreshold_M ;
    )

temp = FreePlatform_Q->audit - MINIMUM_PLATFORMS ;
    num  = min( temp, threshold) ;

temp = MaxPlatformsAvailable - FreePlatform_Q->audit ;
    if( temp > 0 ) ( num   -= temp ; )

num   -= (MAX_TICKLE_PRIORITY - priority) * RamPriorityReservation_M ;

if( num < 0 )              ( num = 0 ; )
    else if( num > UCHAR_MAX ) ( num = UCHAR_MAX ; )

/*
if( Gabby() == GABBY_WAN ) printf( "num_reserved_platforms returning:%u\n", num) ;
*/
    return num ;
)
``` l2wan.c - Metricom Proprietary - 891212 - page:14

```c
#define     WAN_RETURN_TO_SLOT_LATENCY     (2)

LOCAL VOID  ack_cycle(VOID)
{
    L2_PRIORITY  tickle_priority ;
    NODE         *data_np ;
    PLATFORM     *pp ;

if( (pp = (PLATFORM *)sys_get_queue(WAN_Rx_Q)) != NULLPP )
    {
        if( (L2Protocol(pp) == L2_PROTOCOL_TICKLE)
            && (L2FType(pp) == L2_FTYPE_DATA_ACK) )
        {
            UCOUNT   num_platforms ;

tickle_priority = (L2_PRIORITY)(*(L2DataPtr(pp))) ;
            if(Gabby() == GABBY_WAN) printf("tickled(%u)\n", (UCOUNT)tickle_priority ) ;
            num_platforms = NumReservedPlatforms( tickle_priority, MSUBNET_WAN ) ;

WAN_ack_send(pp, num_platforms ) ;

/* if we NACKed, FreePlatform and return */
            if( num_platforms == 0 )
            {
                FreePlatform(pp) ;
                sys_post(WAN_MGR_EVENT) ;
                return ;
            }

/* we are looking for more DATA from 'data_np' */
            data_np         = InputNode(pp) ;

/* Free the tickle and wait for the DATA */
            FreePlatform(pp) ;
        }
        else
        {
``` l2wan.c - Metricom Proprietary - 891212 - page:15

```c
        /* route the SYNC */
        if( L2Protocol(pp) == L2_PROTOCOL_SYNC )
        {
            AddToRouterQueue(pp) ;
        }
        else
        {
            /* bogus RX event -- all MUST start with a Tickle */
            FreePlatform(pp) ;
        }
        sys_post(WAN_MGR_EVENT) ;
        return ;
    }
    else
    {
        /* got RX_EVENT without receipt of a packet */
        sys_post(WAN_MGR_EVENT) ;
        return ;
    }
    /* wait here for the Data packet that should follow */
    if( sys_pend(WAN_RX_EVENT,
        ((TICKS_PER_SLOT - Current.tick) + FIRST_ACK_TICK) )
    )
go:
    while( (pp = (PLATFORM *)sys_get_queue(WAN_Rx_Q)) != NULLPP )
    {
        /* if not from NODE that sent Tickle */
        if( InputNode(pp).!= data_np )
        {
            /* NACK the guy */
            WAN_ack_send(pp,0) ;
            FreePlatform(pp) ;
            goto go ;
        } else if( L2FType(pp) == L2_FTYPE_DATA_NOACK )
``` l2wan.c - Metricom Proprietary - 891212 - page:16

```
            {
                            /* assume that the other guy is waiting the SAME number of
slots...
                               and allow time the THIS slot to expire */
                            GetExpiredMclockTimer(
                                NodeDataRetryTimerPtr(data_np),
                                (RamWANSlotWait_M + WAN_RETURN_TO_SLOT_LATENCY)
                               ) ;
                            AddToRouterQueue(pp) ;       /* we're done */
                        }
                        else if( L2FType(pp) == L2_FTYPE_DATA_ACK )
                        {
                            BOOL actively_acking = TRUE ;
                            UCOUNT    quit_slot, listen_slot, current ;
                            UCOUNT    num_platforms ;

num_platforms = NumReservedPlatforms( tickle_priority,
MSUBNET_WAN ) ;
                            WAN_ack_send(pp, num_platforms ) ;

/* if NACKed, PseudoARO packet,
                               update NODE machinery,
                                  tell MGR and return */
                            if( num_platforms == 0 )
                            {
                                AddToRouterQueue(pp) ;
                                SetNodeActiveState( data_np ) ;
                                sys_post(WAN_MGR_EVENT) ;
                                return ;
                            } current     = Home.slot ;
                            quit_slot   = CalcEndSlot(current, (RamWANSlotWait_M + 1)) ;
                            listen_slot = CalcEndSlot(current, (RamWANSlotWait_M) ) ;

if(Gabby() == GABBY_WAN)printf( "AC+DATA(%d) -- ", (UCOUNT)Fid(pp) ) ;

while( actively_acking )
                            {
```

```
               if( sys_pend(WAN_RX_EVENT, TicksTillNextAck( quit_slot,
listen_slot)) )
                   {
                   PLATFORM *rx ;

if( (rx = (PLATFORM *)sys_get_queue(WAN_Rx_Q)) !=
NULLPP )
                       {
                       NODE *np ;

np = InputNode(rx) ;

if( data_np != np )
                           {
                           /* got DATA packet from a NODE we didn't
expect */
                           NapNode(np) ;
                           FreePlatform(rx) ;
                           }
                       else if( (L2FType(rx) == L2_FTYPE_ACK_ACK)
                           && (Fid(rx) == Fid(pp))
                           && L2Protocol(rx) == L2Protocol(pp) )
                           {
                           actively_acking = FALSE ;
                           FreePlatform(rx) ;
                           AddToRouterQueue(pp) ;
                           IncrementTotalDataRcvd(np) ;
                           SetNodeLastAckGood_M(np,TRUE) ;
                           }
                       else if( (L2FType(rx) == L2_FTYPE_DATA_ACK)
                           && (Fid(rx) != Fid(pp))
                           && L2Protocol(rx) == L2Protocol(pp) )
                           {
if(Gabby() == GABBY_WAN)sys_puts( "AC+ACK_ACK " ) ;
                           /* received a piggyback packet */
                           AddToRouterQueue(pp) ;
                           IncrementTotalDataRcvd(np) ;
                           SetNodeLastAckGood_M(np,TRUE) ;
if(Gabby() == GABBY_WAN)sys_puts( "AC+piggy " ) ;
```

```c
                            /* catch the PiggyBack on the next iteration */
                            sys_add_queue( (QUE *)rx, WAN_Rx_Q, LIFO ) ;
                            actively_acking = FALSE ;
                        }
                        else
                        {
                            /* if not *the* packet, ignore */
                            FreePlatform(rx) ;
                        }
                    }
                    else
                    {
                        /* where did the packet go? */
                    }
                }
                else /* timed out... should we send another ACK? */
                {
                    if( Home.slot == quit_slot )
                    {
                        actively_acking = FALSE ;
                        AddToRouterQueue(pp) ;
                        IncrementPseudoARO() ;
                    }
                    else if( Home.slot != listen_slot )
                    {
                        /* ACK at the tickle priority level...
                           L3 Header is NOT imported *yet* */
                        WAN_ack_send(pp,
                                     NumReservedPlatforms(
                                         tickle_priority,
                                         MSUBNET_WAN)
                                    ) ;
                    }
                }
            }
        }
        else
```

```c
            {
                            /* error condx */
                            FreePlatform(pp) ;
            }
        ) /* end of 'while(packets on WAN_rx_Q)' */
    }
    else
    {
                /* timed out... the DATA packet never followed */
    }

/* again, assume that the other guy is waiting the SAME number of
        slots that we are and allow for THIS slot to expire */
    GetExpiredMclockTimer(NodeDataRetryTimerPtr(data_np), RamWANSlotWait_M) ;

/* update NODE machinery */
    SetNodeActiveState( data_np ) ;

sys_post(WAN_MGR_EVENT) ;
}

/* [TASK] */
VOID WAN_Rx(VOID)
{
    /* initialize the 'Idle Upon Failure' machinery */
    InitIdle() ;

/* init the TXPower */
    sys_wan_gain( PowerLevel, PowerLevel ) ;

while( TRUE )
    {
        /* await a DATA packet to acknowledge */
        sys_pend( WAN_RX_EVENT, 0 ) ;

sys_suspend(WAN_MANAGER_TASK) ;
        ack_cycle() ;
```

```
        sys_resume(WAN_MANAGER_TASK) ;

} /* end of 'while(TRUE)' */
}

LOCAL VOID    remake_l2_header( NODE *np, PLATFORM *pp )
{
   /* remake the L2 part of the packet */
   MkL2Pkt( pp, L2DataLen(pp), L2Protocol(pp), L2FType(pp), GetNewFid(np),
           NodeLinkAddressPtr(np), LinkSrcPtr(pp), /* ONLY HERE is this OK --
                              I do it to save the table lookup
                              of GetPrimeSourceLinkAddr(MSUBNET_WAN) */

MSUBNET_WAN ) ;
}

LOCAL BOOL    data_cycle( NODE *active_node, PLATFORM *tx )
{
   L2_PRIORITY    last_tx_priority ;
   PLATFORM  *new_pp ;
   ARG            data_chain_max ;
   BOOL           got_our_ack_for_first_data = FALSE ;

data_cycling = TRUE ;

/* used to limit the number of 'piggyback' packets we can send */
   data_chain_max = RamDataChainMax_M ;

SetNodeTxPacket(active_node,tx) ;
   WaitForAck(active_node) ;
   WAN_data_send(active_node,tx) ;

/* priority is MAX for Maintenance packets */
   if( L2Protocol(tx) == L2_PROTOCOL_DATA
       || L2Protocol(tx) == L2_PROTOCOL_TRACER )
```

```c
        }
        last_tx_priority = Priority(tx) ;
    }
    else
    {
        last_tx_priority = L2_PRIORITY_MAX ;
    }
    while( Current.slot != data_send_quit_slot )
    {
        if( sys_pend( WAN_MGR_RX_EVENT, TicksTillSlot(data_send_quit_slot)) )
        {
            PLATFORM *rx ;

if( (rx = (PLATFORM *)sys_get_queue(WAN_Mgr_Rx_Q)) != NULLPP )
            {
                /* if an ACK from the target link */
                if( active_node == InputNode(rx) )
                {
                    /* Note: no check for L2Protocol is necessary here...
                       if the other guy follows the rules. */
                    if( L2FType(rx) == L2_FTYPE_ACK )
                    {
                        ClearNodeToTries(active_node) ;
                        SetNodeLastDataGood_M(active_node, TRUE) ;

/* unsolicited ACK */
                        if( !WaitingForAck(active_node) )   { else if( Fid(rx) == Fid(NodeTxPacket(active_node))
                                 && L2Protocol(rx) ==

WAN_ack_ack_send(rx) ; ) )

L2Protocol(NodeTxPacket(active_node))
        {
                            UTINY       num_platforms ;
                            L2_PROTOCOL protocol ;
                            PLATFORM *successfully_sent_data ;
```

```c
                                        /* latch this info for ALL successful DATA packets
                                        */
                                        got_our_ack_for_first_data = TRUE ;
                                        successfully_sent_data = NodeTxPacket(active_node)
                                        ;

/* delete from DataToGo_Q iff
                                           it came from the DataToGo_Q */
                                        protocol = L2Protocol(successfully_sent_data) ;
                                        if( (protocol == L2_PROTOCOL_DATA)
                                            || (protocol == L2_PROTOCOL_TRACER) )
                                        (
                                            sys_delete_queue( (QUE
*)successfully_sent_data, WAN_DataToGo_Q) ;
                                            FreePlatform(successfully_sent_data) ;
                                        )

IncrementTotalDataSent(active_node) ;

/* remember this success */
                                        GetMclockTimer(
NodeLastExchangeTimerPtr(active_node) ) ;

if( L2DataLen(rx) != 0 )
                                        (
                                            num_platforms = (UTINY)*(L2DataPtr(rx)) ;
                                        )
                                        else
                                        (
                                            num_platforms = (UTINY)(UCHAR_MAX) ;
                                        )

/* if there is MORE data to be sent */
                                        if( (num_platforms != 0)
                                            && (--data_chain_max > 0)
if(Gabby() == GABBY_WAN) printf( "DC+ACK(%u,%u) ", (UCOUNT)Fid(rx),
(UCOUNT)num_platforms ) ;
```

```
     best_WAN_data_for_link(active_node))  != NULLPP
                                             && (new_pp =
                                             && Priority(new_pp) >= last_tx_priority )
         (
              PLATFORM *doomed_pp ;

/* send the piggybacked Data out */
              SetNodeTxPacket(active_node,new_pp) ;

remake_l2_header( active_node, new_pp ) ;
              WAN_data_send(active_node,new_pp) ;

/* delete packets received before latest Data
packet was sent */
              while( (doomed_pp = (PLATFORM
*)sys_get_queue(WAN_Mgr_Rx_Q)) != NULLPP )
                   (
                        FreePlatform( doomed_pp ) ;
                   )
         )
         else /* no more to go */
         (
              StopWaitingForAck(active_node) ;
              WAN_ack_send(rx) ;

/* the guy got the packet, but NACKed us */
              if( num_platforms == 0 ) ( NapNode(active_node) ; )
              )
         )
         else /* is ACK for other than most recently
                     transmitted Data packet */
         (
              PLATFORM *doomed_pp ;

/* retry previous piggybacked data */
              WAN_data_send(active_node,NodeTxPacket(active_node
)) ;
``` l2wan.c - Metricom Proprietary - 891212 - page:24

```
               && (new_pp =
best_WAN_data_for_link(active_node)) != NULLPP
                              && Priority(new_pp) >= last_tx_priority )
                (
                   PLATFORM *doomed_pp ;

/* send the piggybacked Data out */
                   SetNodeTxPacket(active_node,new_pp) ;

remake_l2_header( active_node, new_pp ) ;
                   WAN_data_send(active_node,new_pp) ;

/* delete packets received before latest Data
packet was sent */
                   while( (doomed_pp = (PLATFORM
*)sys_get_queue(WAN_Mgr_Rx_Q)) != NULLPP )
                          FreePlatform( doomed_pp ) ;
                }
                else /* no more to go */
                {
                   StopWaitingForAck(active_node) ;
                   WAN_ack_send(rx) ;

/* the guy got the packet, but NACKed us */
                   if( num_platforms == 0 ) {

PLATFORM *doomed_pp ;

/* retry previous piggybacked data */
                       WAN_data_send(active_node,NodeTxPacket(active_node
             }
             else /* is ACK for other than most recently
                     transmitted Data packet */
             {

NapNode(active_node) ; }

)) ;

l2wan.c - Metricom Proprietary - 891212 - page:24
```

```c
                                            /* clear all packets received before we
transmitted */
*)sys_get_queue(WAN_Mgr_Rx_Q)) != NULLPP )
                                    while( (doomed_pp = (PLATFORM
                                    (
                                            FreePlatform( doomed_pp ) ;
                                    )
                            }
                    else
                    (
                            /* received a NON-ACK packet from the 'active_node'! */

}
            else
            (
                    /* heard packet from link other than the 'active_node' */

)
            /* in any case, free the packet we got */
            FreePlatform(rx) ;

}

/* get back home */
    SetTraveling(0) ;

/* Update node machinery */
    SetNodeActiveState( active_node ) ;
    StopWaitingForAck( active_node ) ;

/* update the IdlePeriod machinery */
    UpdateIdle( (RamDataChainMax_M - data_chain_max), (got_our_ack_for_first_data ?
0 : 1) ) ;

data_cycling = FALSE ;
```

```
    /* 'data_cycle()' didn't fail if just ONE packet got through */
    return got_our_ack_for_first_data ;
}

/*
    returns NOTOK if tickle succeeded and 'data_cycle()' failed
    returns    OK if tickle failed - or reports a NACK
    returns  TRUE if success
*/
ARG     WANLinkMaintenanceSend( NODE *np, PLATFORM *pp )
{
    ARG  return_code ;

if(Gabby() == GABBY_WAN) sys_puts("WANMaint\n") ;

/* tickle at minimum priority */
    if( Tickle(np,L2_PRIORITY_MAX) > 0 )
    {
        UpdateMaint(pp) ;
        if( data_cycle(np, pp) ) ( return_code = TRUE ; )
        else                     ( return_code = NOTOK ; )
    }
    else
    {
        SetTraveling(0) ;
        return_code = OK ;
    }

/* we delete the platform here */
    FreePlatform(pp) ;

return return_code ;
}

LOCAL MCLOCK_TIMER   send_alarm = 0 ;

/* returns the transmit time for the next available packet */
LOCAL UCOUNT    next_tick_to_try_sending(VOID)
```

```c
    PLATFORM    *next ;
    MCLOCK_TIMER    now ;
    MCLOCK_TIMER    seconds_till_next_alarm = UCOUNT_MAX ;

GetMclockTimer(&now) ;
    next = (PLATFORM *)WAN_DataToGo_Q ;
    while( (next = (PLATFORM *)sys_next_queue((QUE *)next, WAN_DataToGo_Q)) != NULLPP )
    {
        /* if this packet is still napping */
        if( !IsExpiredMclockTimer( &now, PacketNapAlarmPtr(next)) )
        {
            if( DeltaMclockTimer(PacketNapAlarmPtr(next), &now) <
                seconds_till_next_alarm )
            {
                seconds_till_next_alarm =
                    DeltaMclockTimer( PacketNapAlarmPtr(next), &now ) ;
            }
        }
        else
        {
            /* we found one that is Ready to go! */
            seconds_till_next_alarm = 0 ;
            break ;
        }
    }

/* figure in the IDLE period */
    if( seconds_till_next_alarm < IdlePeriod() )
    {
        seconds_till_next_alarm = IdlePeriod() ;
    }

/* set the alarm to expire at the right time */
    GetExpiredMclockTimer( &send_alarm, seconds_till_next_alarm ) ;

/* and return the number of ticks till then from NOW. */
    GetMclockTimer(&now) ;
``` l2wan.c - Metricom Proprietary - 891212 - page:27

```c
/*
if(Gabby() == GABBY_WAN )printf( "next_tick_to_try-> seconds:%lu\n",
seconds_till_next_alarm ) ;
*/
    return( TicksToAlarm(&now, &send_alarm) ) ;
}

LOCAL_VOID    nap_all_packets_destined_to( MCLOCK_TIMER nap_alarm, WAN_ADDR
*dest_wan )
{
    UCOUNT      num_napped ;
    PLATFORM    *next ;

num_napped = 0 ;
    nap_alarm += 2 ;
    next = (PLATFORM *)WAN_DataToGo_Q ;
    while( (next = (PLATFORM *)sys_next_queue((QUE *)next, WAN_DataToGo_Q)) !=
NULLPP )
    {
        LAN_ADDR    lan ;
        WAN_ADDR    wan ;

/* get the WAN address of the Packet on the Queue */
        DevToWanLan( &wan, &lan, DevDestPtr(next) ) ;

/* for each packet headed to the same WAN.... */
        if( CmpEqualWanAddr(dest_wan, &wan) )
        {
            SetPacketNapAlarm_M(next,nap_alarm) ;
        }
    }
    if(Gabby() == GABBY_WAN && (num_napped != 0)) printf("napped %u DATA to %lu\n",
num_napped, nap_alarm) ;
}
```

```
LOCAL VOID    put_data_at_end( PLATFORM *pp )
{
    /* move the poor packet to the end of the Data To Go Queue for fairness
       if we did not get our ACK for first DATA packet -- and the DATA packet
       was NOT a link Maint packet */
    sys_delete_queue( (QUE *)pp, WAN_DataToGo_Q ) ;
    sys_add_queue( (QUE *)pp, WAN_DataToGo_Q, FIFO ) ;
}

LOCAL VOID    try_to_send_data(VOID)
{
    NODE       *active_node ;
    PLATFORM   *tx_pp ;

if( (tx_pp = highest_priority()) != NULLPP )
    {
        LAN_ADDR       lan ;
        WAN_ADDR       dest_wan ;
        BOOL           backtrack = FALSE ;
        MCLOCK_TIMER   first_nap_alarm = MCLOCK_TIMER_INFINITY ;

/* the the LAN_ADDR and the WAN_ADDR for later use */
        DevToWanLan( &dest_wan, &lan, DevDestPtr(tx_pp) ) ;

/* move the DATA packet we got to the END of the DATA_TO_GO queue...
           in preparation for failure (sigh) if the packet is successfully
           sent, it will be deleted from wherever it is on the Queue */
        put_data_at_end( tx_pp ) ;

if( (active_node = ScanForLink(DevDestPtr(tx_pp), &backtrack,
             Priority(tx_pp), InputNode(tx_pp), &first_nap_alarm, Mood(tx_pp))) != NULLNP )
        {
            remake_l2_header( active_node, tx_pp ) ;
            if( data_cycle(active_node, tx_pp) == FALSE )
            {
                nap_all_packets_destined_to( first_nap_alarm, &dest_wan ) ;
            }
        }
```

```
        /* toss if not direct connect to Mobile WAN address */
        else if( IsMobileWanAddr(&dest_wan) )
        {
            LINK_ADDR link ;

WanToLink(&link, &dest_wan) ;
            if( FindNodeGivenLinkPtr(&link, MSUBNET_WAN) == NULLNP )
            {
                sys_delete_queue( (QUE *)tx_pp, WAN_DataToGo_Q ) ;
                FreePlatform(tx_pp) ;
            }
        }
        else if( first_nap_alarm != MCLOCK_TIMER_INFINITY )
        {
            nap_all_packets_destined_to( first_nap_alarm, &dest_wan ) ;
        }
        else /* try again in RamNapStartDelay_M seconds */
        {
            MCLOCK_TIMER    now ;

GetMclockTimer(&now) ;
            nap_all_packets_destined_to( (now + RamNapStartDelay_M), &dest_wan ) ;
        }
    }
}

LOCAL ARG WAN_schedule_and_sweep(VOID)
{
    UCOUNT          send_tick, next_tick_to_maintain ;
    MCLOCK_TIMER    now ;
    UCOUNT          next_tick = UCOUNT_MAX ;

if( !(TimeToMaintain(MSUBNET_WAN) && PerformMaintenance(MSUBNET_WAN) ) )
    {
        GetMclockTimer( &now ) ;
        if( IsExpiredMclockTimer(&now, &send_alarm) ) ( try_to_send_data() ; )
```

```
        send_tick              = next_tick_to_try_sending() ;
        next_tick_to_maintain  = TicksTillNextMaintenance(MSUBNET_WAN) ;
        next_tick              = min( send_tick, next_tick_to_maintain ) ;

if(Gabby() == GABBY_WAN && next_tick > MINIMUM_PEND_TIME )
        ( printf( "WAN_S&S returning %u\n", next_tick ) ; )

/* scan if lonely and not busy */
        if( next_tick >= (TICKS_PER_SLOT * RamWANMaintGateInterval_M) )
        {
            WAN_scan_if_lonely() ;
        } return( (next_tick < MINIMUM_PEND_TIME) ? MINIMUM_PEND_TIME : next_tick ) ;
}

LOCAL  VOID   process_wan_doomed_nodes(VOID)
{
    if( Gabby() == GABBY_WAN ) sys_puts( "DOOMED WAN node\n" ) ;
    sys_pend( WAN_NODELIST_FREE_EVENT, 0 ) ;

while( WAN_NodelistLock != 0 ) ( sys_pend( 0, 10 ) ; )

DeleteDoomedNodes( MSUBNET_WAN ) ;
    WAN_FailedNode = FALSE ;
    sys_post( WAN_NODELIST_FREE_EVENT ) ;
}

LOCAL  VOID   process_wan_newborn_nodes(VOID)
{
    NODE *baby_np ;

sys_pend( WAN_NODELIST_FREE_EVENT, 0 ) ;
    while( WAN_NodelistLock != 0 )    ( sys_pend( 0, 10 ) ; )

while( (baby_np = (NODE *)sys_get_queue(WAN_NewbornNodes_Q)) != NULLNP )
```

```
        sys_add_queue( (QUE *)baby_np, WAN_ActiveNodes_Q, FIFO ) ;
    }
    sys_post( WAN_NODELIST_FREE_EVENT ) ;

/* [TASK] */
VOID WAN_link_manager(VOID)
{
    PLATFORM  *pp ;

/* start sending Syncs right away
            (after console has had time to come up) */
    sys_pend(0,100) ;
    MaybeSendSync( 0L ) ;

while(TRUE)
    {
        if( sys_pend( WAN_MGR_EVENT, WAN_schedule_and_sweep()) )
        {
            if( WAN_FailedNode )    ( process_wan_doomed_nodes() ; )

if( (NODE *)sys_next_queue (WAN_NewbornNodes_Q, WAN_NewbornNodes_Q) != 
NULLNP )
            {
                process_wan_newborn_nodes() ;
            }

/* this is a higher priority TASK than the tasks feeding this
                    queue, so the queue will be emptied here */
            while( (pp = (PLATFORM *)sys_get_queue(WAN_Tx_Q)) != NULLPP )
            {
                Tx_Q_to_WAN_data_to_go_Q(pp) ;

/* start the WAN sending engine */
                GetMclockTimer( &send_alarm ) ;
            }
```

```
while( (pp = (PLATFORM *)sys_get_queue(WAN_DeferredRx_Q)) != NULLPP )
{
    /* only look at SYNCs that are NOT for US */
    if( L2Protocol(pp) == L2_PROTOCOL_SYNC )
    {
        AddToRouterQueue(pp) ;
    }
    else
    {
        FreePlatform(pp) ;
    }
}

} /* end of 'while(TRUE)' */
```

I claim:

1. In a packet communication network having a plurality of communication nodes, each node having a terminal node controller incorporating a central processing unit (CPU) and memory means and a clock, a method for maintaining frequency and time synchronization within said network comprising the steps of:

generating at each node an age value by means of the clock, said age value being representative of an age of said node, and the rate of the clock being communicated within said network;

at each node, supplying a representation of said age value to any other node as part of transmission of a packet;

at each node, collecting said representation of said age value for other nodes within said network;

at each node, changing, according to a known pattern and independently of each other node of said network, slots of transmission and reception of signals, a slot being a frequency channel during a preselected time period, said known pattern being known to each other node in said network; and transmitting packets of information from a source node to an addressed node at a frequency and for a duration synchronous with the slot of said addressed node, such that the source node tracks changing frequency of the receiving node.

2. In a packet communication network having a plurality of communication nodes, each node having a terminal node controller incorporated a central processing unit (CPU) and memory means and a clock, a method for maintaining frequency and time synchronization within said network comprising the steps of:

generating at each node an age value by means of the clock, said age value being representative of an age of said node, and the rate of the clock being communicated within said network;

at each node, supplying a representation of said age value to any other node as part of transmission of a packet;

at each node, collecting said representation of said age value for other nodes within said network;

at each node, changing, according to a known pattern and independently of each other node of said network, slots of transmission and reception of signals, a slot being a frequency channel during a preselected time period, said known pattern being known to each other node in said network;

transmitting packets of information from a source node to an addressed node at a frequency and for a duration synchronous with the slot of said addressed node, such that the source node tracks changing frequency of the receiving node;

at each node, determining from said age value of each said other node and said age value of said node a difference in age value; and storing said difference in age value for each other node.

3. The method according to claim 2 wherein said difference in age value is within a fractional value of duration of a slot such that the transmission of said packets of information is synchronized with step of changing said slots of transmission and reception of signals.

4. The method according to claim 2 wherein said age value for each node is a modulo value based on a repetition of said known pattern.

5. The method according to claim 2 wherein said age value is based on geographic location of said node, in order to assure uniqueness.

6. The method according to claim 2 further including the step of:

at each node, selecting a random slot in said known pattern to serve as a home slot in order to minimize the number of nodes simultaneously occupying identical slots.

7. A node apparatus for a wide area packet communication network, said node apparatus comprising:

a frequency agile transceiver means for transmitting and receiving packet signals on a plurality of frequencies; and a terminal node controller means for controlling frequency of transmission and reception of said frequency agile transceiver and for tracking changing frequencies of other nodes within said packet communication network, wherein said terminal node controller means in each local node includes means for processing and storing age information specifying age of remote nodes within said network, for assembling packets containing age information specifying age of said local node, and for selecting frequency and time of transmission of packets to an addressed remote node based on said age information of said addressed remote node.

* * * * *